(12) United States Patent
Mitsunaga

(10) Patent No.: US 8,116,563 B2
(45) Date of Patent: Feb. 14, 2012

(54) IMAGE PROCESSING DEVICE AND METHOD, RECORDING MEDIUM, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1045 days.

(21) Appl. No.: 12/026,311

(22) Filed: Feb. 5, 2008

(65) Prior Publication Data
US 2008/0199074 A1  Aug. 21, 2008

(30) Foreign Application Priority Data

Feb. 19, 2007  (JP) ................ P2007-037792

(51) Int. Cl.
G06K 9/00  (2006.01)
(52) U.S. Cl. ........ 382/169; 382/162; 382/167; 382/274; 348/234; 348/453
(58) Field of Classification Search .......... 382/162, 382/164, 165, 166, 167, 168, 169.274; 348/234, 348/453, 673, 678; 358/1.9, 3.23, 518; 345/589, 345/590, 594, 619, 604, 605, 690, 204
See application file for complete search history.

(56) References Cited

U.S. PATENT DOCUMENTS

| | | | | |
|---|---|---|---|---|
| 4,984,072 A | * | 1/1991 | Sandrew | 348/34 |
| 6,031,565 A | * | 2/2000 | Getty et al. | 348/56 |
| 6,579,239 B1 | * | 6/2003 | Avinash et al. | 600/443 |
| 2003/0151565 A1 | * | 8/2003 | Kim et al. | 345/60 |
| 2005/0226526 A1 | | 10/2005 | Mitsunaga | |
| 2005/0285822 A1 | * | 12/2005 | Reddy et al. | 345/76 |
| 2007/0053607 A1 | | 3/2007 | Mitsunaga | |

FOREIGN PATENT DOCUMENTS

| | | |
|---|---|---|
| EP | 1 494 462 A1 | 1/2005 |
| JP | 2004-221644 | 8/2004 |
| JP | 2004-221645 | 8/2004 |
| JP | 2007-49540 | 2/2007 |

OTHER PUBLICATIONS

European Search Report issued on Nov. 2, 2010, in The Hague in corresponding EP 08 25 0416.

* cited by examiner

Primary Examiner — Samir Ahmed
Assistant Examiner — Ali Bayat
(74) Attorney, Agent, or Firm — Finnegan, Henderson, Farabow, Garrett & Dunner, L.L.P.

(57) ABSTRACT

An image processing device for processing image data includes: a gray level transforming processing unit which receives input, of image data, performs gray level transforming, and outputs image data having all of multiple color information by each pixel being configured of one of the multiple color information; the gray level transforming processing unit further including a first gray value computing unit for computing a first gray value according to the brightness of a pixel of interest which exists in a pixel location of interest; a second gray value computing unit for computing a second gray value by gray value transforming as to the first gray value; and pixel value gray level transforming unit for computing a pixel value subjected to gray level transforming of the pixel of interest, based on the first gray value, the second gray value, and the pixel value of the pixel of interest.

26 Claims, 38 Drawing Sheets

FIG. 34
|   | 1 | 2 | 3 |
|---|---|---|---|
| 1 | $m_{11}$ | $m_{12}$ | $m_{13}$ |
| 2 | $m_{21}$ | $m_{22}$ | $m_{23}$ |
| 3 | $m_{31}$ | $m_{32}$ | $m_{33}$ |
FIG. 35
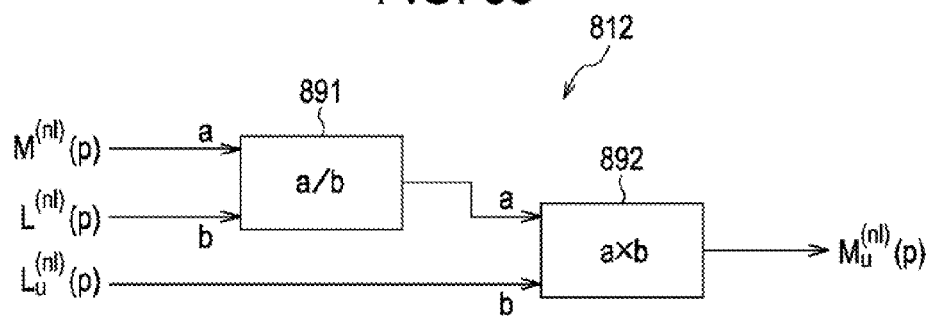
FIG. 36
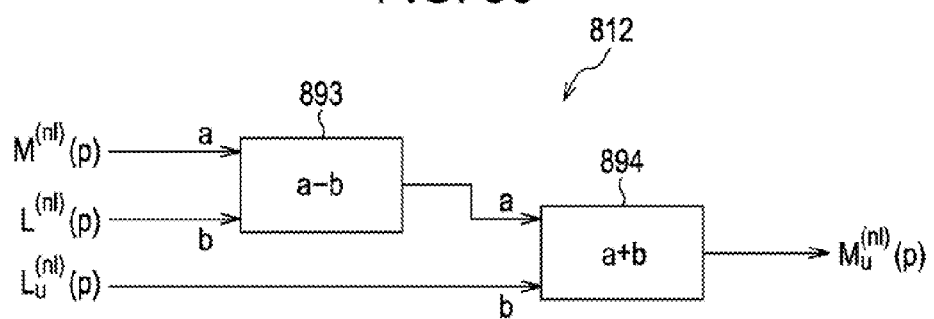

IMAGE PROCESSING DEVICE AND METHOD, RECORDING MEDIUM, AND PROGRAM

CROSS REFERENCES TO RELATED APPLICATIONS

The present invention contains subject matter related to Japanese Patent Application JP 2007-037792 filed in the Japanese Patent Office on Feb. 19, 2007, the entire contents of which are incorporated herein by reference.

BACKGROUND OF THE INVENTION

1. Field of the Invention

The present invention relates to an image processing device and method, recording medium, and program, and in particular relates to an image processing device and method, recording medium, and program suitable for employing in the case of transforming an image dynamic range into a narrower dynamic range.

2. Description of the Related Art

In recent, years, the dynamic range for images which can be shot with a video camera has widened with improvements in image sensor performance. However, there are cases wherein the dynamic range which the display device can display is narrower than the dynamic range of the image shot with a video camera corresponding to such wide dynamic range image shooting. Accordingly, a gray level compression technique has been proposed to narrow the dynamic range of the image while suppressing deterioration in the image contrast. (For example, see Japanese Unexamined Patent Application Publication No. 2004-221644 or Japanese Unexamined Patent Application Publication No. 2004-221645.)

FIG. 1 is a block diagram showing a configuration example of a DSP (Digital Signal Processor) function to perform compression of the gray level of a pixel value in an image, according to the invention disclosed in Japanese Unexamined Patent Application Publication No. 2004-221645.

A logarithm transformer 11 logarithmically transforms the brightness value L(p) of the input image, and outputs the obtained logarithmic brightness value logL(p) to a tone curve correcting unit 12. The tone curve correcting unit 12 employs a tone curve prepared beforehand to transform the logarithmic brightness value logL(p) in the direction of compressing the gray level, and outputs the obtained logarithmic brightness value logLc(p) to a reduced image generating unit 13 and contrast correcting unit 15. Also, the tone curve correcting unit 12 outputs a representative value γ indicating the slope of the employed tone curve to the contrast correcting unit 15.

The reduced image generating unit 13 generates a reduced image logLc1, based on the logarithmic brightness value logLc(p) of one frame worth input from the tone curve correcting unit 12, and saves this in reduced image memory 14.

The contrast correcting unit 15 corrects the contrast weakened by the tone curve correction of the logarithmic brightness value logLc(p) of the current frame input from a tone curve correcting unit 22, based on the representative value γ and the reduced image logLc1 before the one frame saved in the reduced image memory 14, and outputs the obtained logarithm brightness value logLu(p) to a logarithm inverse transformer 16. The logarithm inverse transformer 16 subjects the logarithm brightness value logLu(p) wherein the contrast is correct to logarithm inverse transforming, and outputs the obtained brightness value Lu(p) with a normal axis to a gamma correcting unit 17.

The gamma correcting unit 17 performs gamma correction as to the brightness value Lu(p) input from the logarithm inverse transformer 16, with consideration for the gamma properties of the display device, and outputs the obtained brightness value after gamma correction Y(p) to a brightness region information computing unit 13 and brightness region normalizing unit 20. The brightness region information computing unit 18 computes a brightness region information [Yd, Yb] made up of a brightness value Yd which is nearest to dark, and a brightness value Yb which is nearest to bright, as to the brightness value Y(p) of one frame worth input from the gamma correcting unit 17, and saves this in brightness region information memory 19.

The brightness region normalizing unit 20 transforms the brightness value Y(p) of the current frame input from the gamma correcting unit 17 so that the distribution range matches a range capable of display by the display device, based on the brightness region information [Yd, Yb] before the one frame saved in the brightness region information memory 19, and outputs the obtained brightness value Yn(p) downstream as a pixel value of a narrow dynamic range image.

SUMMARY OF THE INVENTION

However, with the inventions disclosed in Japanese Unexamined Patent Application Publication No. 2004-221644 and Japanese Unexamined Patent Application Publication No. 2004-221645, since the shape of the tone curve employed for gray level compression is fixed, there may be cases wherein suitable gray level compression cannot be made such as a case of image data with a wider than anticipated dynamic range or image data, shot with insufficient exposure, being input.

Also, with the invention disclosed in Japanese Unexamined Patent Application Publication No. 2004-221645, the logarithm transformer 11, tone curve correcting unit 12, contrast correcting unit 15, gamma correcting unit 17, and brightness region normalizing unit 20 complete processing for each pixel, but generating a reduced image with the reduced image generating unit 13 and computing the brightness region information with the brightness region information computing unit 18 must foe completed after scanning all pixels within the image. Also, generating the reduced image and computing the brightness region information must be performed in sequence, and cannot be performed concurrently.

Accordingly, with the invention disclosed in Japanese Unexamined Patent Application Publication No. 2004-221645, in the case that the reduced image and brightness region information generated or computed within the same frame is employed to transform the gray level, the processing of the contrast correcting unit 15 must wait until the generating of the reduced image is ended, and the processing of the brightness region normalizing unit 20 must wait until the computing of brightness region information is ended, thereby lengthening the processing time. Also, even if gray level transform is performed by employing the reduced image and brightness region information generated or computed with the processing of one frame prior, if the generating of the reduced image is not ended, the brightness region information cannot be computed, whereby there is a need for the processing of the contrast correcting unit 15 to wait until the generating of the reduced image is ended, thereby lengthening the processing time.

There has been recognized the need to enable executing gray level compression of suitable brightness or color value according to each pixel at a high speed without losing image contrast.

An image processing device according to an embodiment of the present invention is an image processing device to processing image data configured of multiple pixels which are imaged by a color image sensor to measure one color from multiple color information for configuring compounded color information including: a gray level transforming processing unit to receive input of the image data, perform gray level transforming, and output image data having all the multiple color information by each pixel being configured by one of the multiple color information for configuring compounded color information; the gray level transforming processing unit further including a first gray value computing unit to compute a first gray value according to the brightness of a pixel of interest which exists in a pixel location of interest; a second gray value computing unit to compute a second gray value by performing gray value transforming as to the first gray value which is computed with the first gray value computing unit; and a pixel value gray level transforming unit to compute a pixel value subjected to gray level transforming of the pixel or interest, based on the first gray value computed by the first gray value computing unit, the second gray value computed by the second gray value computing unit, and the pixel value of the pixel of interest.

The first, gray value computing unit may include a brightness computing unit to compute a value equivalent to the brightness of the pixel of interest employing the pixel values of multiple pixels neighboring the pixel of interest.

The first gray value computing unit may further have a first nonlinear transforming unit to subject a value equivalent to the brightness of the pixel of interest computed by the brightness computing unit to nonlinear transforming, and the pixel value gray level transforming unit hats a second nonlinear transforming unit to subject the pixel value of the pixel of interest to nonlinear transforming.

The first nonlinear transforming unit and the second nonlinear transforming unit may both execute nonlinear transforming with logarithmic transformation. The nonlinear transforming unit and the second nonlinear transforming unit may both execute nonlinear transforming with gamma correction.

The pixel value gray level transforming unit may further have a ratio computing unit to compute the ratio of the pixel value of the pixel of interest as to the first gray value; and a multiplying unit to multiply the ratio computed with the ratio computing unit by the second gray value.

The pixel value gray level transforming unit may have a difference computing unit to compute the difference of the pixel value of the pixel of interest as to the first gray value; and an adding unit to add the difference computed with the difference computing unit to the second gray value.

The second gray value computing unit may have a first tone curve correcting unit to transform the gray level of the first gray value with a tone curve.

The second gray value computing unit may further have a tone curve computing unit to compute the tone curve which is employed with the first tone curve correcting unit based on the distribution of the first gray value with all pixels configuring the image data.

The second gray value computing unit may further include an overall brightness computing unit to compute overall brightness value which is the brightness value of the overall brightness image made up of low-frequency components of the first gray level; a second tone curve correcting unit to correct the gray level of the overall brightness value based on the tone curve; and a contrast-correcting unit to correct the contrast of the first gray value wherein gray level is subjected to correction, based on the slope of the tone curve and on the overall brightness value wherein the gray level is subjected to correction.

The tone curve computing unit may compute the tone curve based on an average brightness value which is an average value of the first gray value, a first, boundary value wherein the ratio of the number of pixels of a brightness at or below the first boundary value within the number of pixels in the image data is roughly a predetermined first value, and a second boundary value wherein the ratio of the number of pixels of a brightness at or below the second boundary value within the number of pixels in the image data is roughly a predetermined second value.

The tone curve computing unit may compute the monotonically increasing tone curve as the tone curve slope becomes shallow as the first gray value approaches the average brightness value, and the tone curve slope tears almost 1 as the first gray value approaches the first-boundary value and the second boundary. The average brightness value may be an average brightness value of the brightness of the region specified by a user within a frame configuring the image data.

The tone curve computing unit may further include a time smoothing unit to subject the average brightness value, the first boundary value, and the second boundary value to time smoothing between the current frame of the image data and the previous frame; and compute the tone curve based on the average brightness value subjected to time smoothing, the first boundary subjected, to time smoothing, and the second boundary value subjected to time smoothing by the time smoothing unit.

The overall brightness computing unit may includes: a reduced image generating unit to generate a reduced image wherein a predetermined frame configuring the image data is reduced; and an interpolating unit to compute the overall brightness value by interpolating the reduced image so that the overall brightness image has the same number of pixels as the image data of the predetermined frame.

The reduced image generating unit may divide the frame into a predetermined number of blocks, and generate the reduced image by arraying the block average brightness values which are average values of the brightness of pixels included in each of the blocks in sequence of the blocks.

The interpolating unit may compute the overall brightness value by interpolating the reduced image corresponding to the frame which is one frame before the frame currently in process.

The first tone curve correcting unit may correct the gray level of the brightness of the pixel of interest, based on the tone curve according to the distribution of the first gray value of one frame prior; with the second tone curve correcting unit correcting the gray level of the overall brightness value, based on the tone curve according to the distribution of the first gray value of one frame prior.

The contrast correcting unit may correct the contrast of the first gray value wherein the gray level is corrected, based on the tone curve slope wherein the first gray value is approaching the average brightness value.

The contrast correcting unit may correct the contrast of the first gray value wherein the gray level is corrected, such that the contrast near the brightness value of a predetermined intermediate level of the first gray value wherein the gray level is corrected is emphasized as compared to the contrast near the minimum value and maximum value of the brightness that the first gray value wherein the gray level is corrected can be taken.

The contrast correcting unit may correct the contrast of the frequency components excluding the frequency components included in the overall brightness image wherein the gray level is corrected, out of the frequency components of the first gray value wherein the gray level is corrected.

The image processing device may include a white balance adjusting unit to receive input of the image data and adjust the white balance; and an output unit to output information externally; wherein the gray level transforming processing unit performs gray level transforming of the image data where the white balance is adjusted by the white balance adjusting unit; and wherein the output unit outputs the image data externally which is generated by the gray level transforming processing unit whereby each pixel is made up of multiple color information to configure compounded color information.

The image processing device may include a white balance adjusting unit to receive input of the image data and adjust the white balance; and image data transforming unit to transform image data having all of the multiple color information whereby each pixel is configured by one of the multiple color information making up compounded color information into multiple single color image data wherein all pixels are configured with the same the color information; wherein the gray level transforming processing unit, performs gray level transforming of the image data where the white balance is adjusted by the white balance adjusting unit; and wherein the data transforming unit transforms the image data which is generated by the gray level transforming processing unit and which has all of the multiple color information whereby each pixel is configured with one of the multiple color information making up compounded color information into multiple single color image data wherein all pixels are configured of the same the color information.

An image processing method according to an embodiment of the present invention, to process image data is configured of multiple pixels imaged by a color image sensor which measures one color out of multiple color information to configure compounded color information, includes the steps of: receiving input of the image data; performing gray level transforming; and outputting image data having multiple color information wherein each, pixel is configured by one of multiple color information to configure compounded color information; at which time a first gray value according to the brightness of a pixel of interest existing in a pixel location of interest is computed; a second gray value is computed by performing gray level transforming as to the computed first gray value; and a pixel value is computed wherein the pixel of interest is subjected to gray level transforming, based on the first gray value, the second gray value, and the pixel value of the pixel of interest.

A program according to an embodiment of the present invention, or a program recorded on a recording medium, is a program configured to cause a computer to execute image processing of image data configured of multiple pixels imaged by a color image sensor which measures one color out of multiple color information to configure compounded color information, including the steps of: receiving input of the image data; performing gray level trans forming; and outputting image data having multiple color information wherein each pixel is configured, by one of multiple color information to configure compounded color information; at which time a first gray value according to the brightness of a pixel of interest existing in a pixel location of interest is computed; a second gray value is computed by performing gray level transforming as to the computed first gray value; and a pixel value is computed wherein the pixel of interest is subjected to gray level transforming, based on the first gray value, the second gray value, and the pixel value of the pixel of interest.

According to an embodiment of the present invention, in response to input of image data configured of multiple pixels imaged by a color image sensor which measures one color out of multiple color information to configure compounded color information, gray level transforming is performed, and with such gray level transforming, a first gray value according to the brightness of a pixel of interest existing in a pixel location of interest is computed; a second gray value is computed by performing gray level transforming as to the computed first gray value; and a pixel value is computed, wherein the pixel of interest is subjected to gray level transforming, based on the first gray value, the second gray value, and the pixel value of the pixel of interest.

A network is an arrangement wherein at least two devices are connected, whereby information can foe transmitted from one device to another device. The devices to communicate via the network may both be independent devices, or may be within a block making up one device.

Also, it goes without saying that communication may be wireless communication or cable communication, but also communication may be a combination of wireless communication and cable communication, i.e. in one segment wireless communication is performed and in another segment cable communication is performed. Further, an arrangement may be made wherein communication from a certain device to another device is performed with cable communication, and communication from the other device to the certain device is performed with wireless communication.

An image processing device may be an independent device, and for example, may be a block to perform image processing for an information processing device, recording/playback device, image display device, or a digital video camera or digital still camera or the like.

Thus, according to an embodiment of the present invention, the gray level of an image can foe transformed, and in particular, gray level transforming can be executed with a compact circuit without losing image contrast.

BRIEF DESCRIPTION OF THE DRAWINGS

FIG. 34 is a diagram to describe nine peripheral pixels of a pixel of interest;

FIG. 35 is a block diagram illustrating an example of the configuration of the gray level correcting unit in FIG. 33;

FIG. 36 is a block diagram illustrating another example of the configuration of the gray level correcting unit in FIG. 33;

DESCRIPTION OF THE PREFERRED EMBODIMENTS

Figure 1:
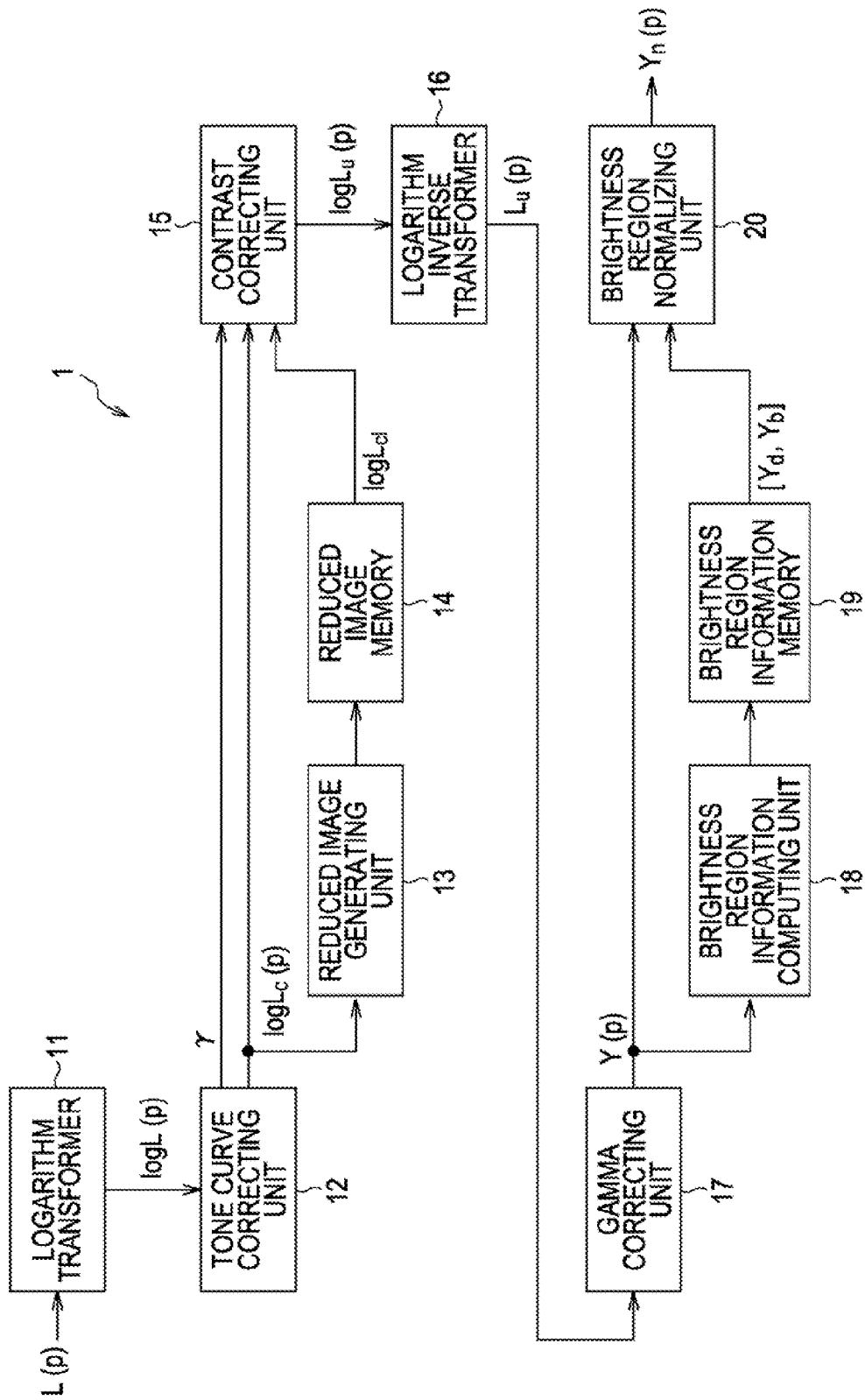
FIG. 1 is a block diagram illustrating a configuration example of a traditional DSP function.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

An image processing device according to an embodiment of the present invention (e.g. the digital video camera 701 in FIG. 30) is an image processing device to process image data (e.g. RAW data) configured of multiple pixels which are imaged by a color image sensor to measure one color from multiple color information for configuring compounded color information including; a gray level transforming processing unit (e.g. gray level transformer 732 in FIG. 31) to receive input of the image data, perform gray level transforming, and output image data (e.g. mosaic image) having all the multiple color information by each pixel being configured by one of the multiple color information for configuring compounded color information; the gray level transforming processing unit further including a first gray value computing unit (e.g. gray level computing unit 761 in FIG. 33) to compute a first gray value according to the brightness of a pixel of interest which exists in a pixel location of interest; a second gray value computing unit (gray value gray level transformer 762 in FIG. 33) to compute a second gray value by performing gray value transforming as to the first gray value which is computed with the first gray value computing unit; and a pixel value gray level transforming unit (e.g. mosaic pixel value gray level transformer 763) to compute a pixel value subjected to gray level transforming of the pixel of interest, based on the first gray value computed by the first gray value computing unit, the second gray value computed by the second gray value computing unit, and the pixel value of the pixel of interest.

An arrangement may be made wherein the first gray value computing unit includes a brightness computing unit (e.g. the brightness computing unit 771 in FIG. 33) to compute a value equivalent to the brightness of the pixel of interest employing the pixel values of multiple pixels neighboring the pixel of interest.

An arrangement may be made wherein the first gray value computing unit further has a first nonlinear transforming unit (e.g. nonlinear transformer 772 in FIG. 33) to subject a value equivalent to the brightness of the pixel of interest computed by the brightness computing unit to nonlinear transforming, and the pixel value gray level transforming unit has a second nonlinear transforming unit (e.g. nonlinear transformer 811 in FIG. 33) to subject the pixel value of the pixel of interest to nonlinear transforming.

An arrangement may be made wherein the pixel value gray level transforming unit further has a ratio computing unit (e.g. dividing unit 891 in FIG. 35) to compute the ratio of the pixel value of the pixel of interest as to the first gray value; and a multiplying unit (e.g. multiplying unit 892 in FIG. 35) to multiply the ratio computed with the ratio computing unit by the second gray value.

An arrangement may be made wherein the pixel value gray level transforming unit has a difference computing unit (e.g. subtracting unit 893 in FIG. 36) to compute the difference of the pixel value of the pixel of interest as to the first gray value;

and an adding unit (e.g. adding unit 894 in FIG. 36) to add the difference computed with the difference computing unit to the second gray value.

An arrangement may be made wherein the second gray value computing unit has a first tone curve correcting unit (e.g. mapping unit 801 in FIG. 33) to transform the gray level of the first gray value with a tone curve.

An arrangement may be made wherein the second gray value computing unit further has a tone curve computing unit (e.g. tone curve computing unit 781 in FIG. 33) to compute the tone curve which is employed, with the first tone curve correcting unit based on the distribution of the first gray value with ail pixels configuring the image data.

An arrangement may be made wherein the second gray value computing unit further includes an overall brightness computing unit (e.g. overall brightness computing unit 784 in FIG. 33) to compute overall brightness value which is the brightness value of the overall brightness image made up of low-frequency components of the first gray level; a second tone curve correcting unit (e.g. mapping unit SOI in FIG. 33) to correct the gray level of the overall brightness value based on the tone curve; and a contrast correcting unit (e.g. contrast correcting unit 786 in FIG. 33) to correct, the contrast of the first gray value wherein gray level is subjected to correction, based on the slope of the tone curve and on the overall brightness value wherein the gray level is subjected to correction.

An arrangement may be made wherein the tone curve computing unit compute the tone curve based on an average brightness value (e.g. average level Laverage(nl)) which is an average value of the first gray value, a first boundary value (e.g., base value Ldark(nl)) wherein the ratio of the number of pixels of a brightness at or below the first boundary value within the number of pixels in the image data is roughly a predetermined, first value, and a second boundary value (e.g. base value Lbright(nl)) wherein the ratio of the number of pixels of a brightness at or below the second boundary value within the number of pixels in the image data is roughly a predetermined second value.

An arrangement may be made wherein the tone curve computing unit further includes a time smoothing unit (e.g. time smoothing unit 223 in FIG. 6) to subject the average brightness value, the first boundary value, and the second boundary value to time smoothing between the current frame of the image data and the previous frame; and computes the tone curve based on the average brightness value (e.g. average level Laverage-ts(nl) subjected to time smoothing, the first boundary value (e.g. base value Ldark-ts(nl)) subjected to time smoothing, and the second boundary value (e.g. base value Lbright-ts(nl)) subjected to time smoothing by the time smoothing unit.

An arrangement may be made wherein the overall brightness computing unit includes: a reduced image generating unit (e.g. reduced image generating unit 791 in FIG. 33) to generate a reduced image wherein a predetermined frame configuring the image data is reduced; and an interpolating unit (e.g. interpolating unit 793 in FIG. 33) to compute the overall brightness value by interpolating the reduced image so that the overall brightness image has the same number of pixels as the image data of the predetermined frame.

An arrangement may be made wherein an image processing device includes a white balance adjusting unit (e.g. white balance unit 731 in FIG. 31) to receive input of the image data and adjust the white balance; and an output unit (e.g. interface 713 in FIG. 30) to output information externally; wherein the gray level transforming processing unit performs gray level transforming of the image data where the white balance is adjusted by the white balance adjusting unit; and wherein the output unit outputs the image data (e.g. mosaic image) externally which is generated by the gray level transforming processing unit whereby each pixel is made up of multiple color information to configure compounded color information.

An arrangement may be made wherein an image processing device further includes a white balance adjusting unit (e.g. white balance unit 731 in FIG. 31) to receive input of the image data and adjust the white balance; and an image data transforming unit (e.g. demosaic unit 733 in FIG. 31) to transform image data (e.g. mosaic image) having all of the multiple color information whereby each pixel is configured by one of the multiple color information making up compounded color information into multiple single color image data (e.g. demosaic image) wherein all pixels are configured with the same the color information; wherein the gray level transforming processing unit performs gray level transforming of the image data where the white balance is adjusted by the white balance adjusting unit; and wherein the data transforming unit transforms the image data (e.g. mosaic image) which is generated by the gray level transforming processing unit and which has all of the multiple color information whereby each pixel is configured of one of the multiple color information making up compounded color information into multiple single color image data (e.g. demosaic image) wherein all pixels are configured with the same the color information.

An image processing method according to an embodiment of the present invention is an image processing method of an image processing device (e.g. digital video camera 701 in FIG. 30) to process image data (e.g. RAW data) configured by multiple pixels imaged by a color image sensor to measure one of multiple color information to configure compounded color information, and includes the steps of: receiving input of the image data; performing gray level transforming; and outputting (the processing in step S203 in FIG. 32) image data (e.g. mosaic image) having all of multiple color information wherein each pixel is configured by one of multiple color information to configure compounded color information; at which time a first gray value according to the brightness of a pixel of interest existing in a pixel location of interest is computed, (e.g. processing in step S255 in FIG. 37); a second gray value is computed, by performing gray level transforming as to the computed first gray value (e.g. the processing in steps S258 through S260 in FIG. 37); and a pixel value is computed wherein the pixel of interest is subjected to gray level transforming(e.g. the processing in steps S261 through S264), based on the first gray value, the second gray value, and the pixel value of the pixel of interest.

A program, or a program recorded on a recording medium, according to an embodiment of the present invention, is a program configured to cause a computer to execute image processing of image data (e.g. PAW data) configured of multiple pixels imaged by a color image sensor which measures one color out of multiple color information to configure compounded color information, including the steps of: receiving input of the image data; performing gray level transforming; and outputting (e.g. processing in step S203 in FIG. 32) image data (e.g. mosaic image) having multiple color information wherein each pixel is configured by one of multiple color information to configure compounded color information; at which time a first gray value according to the brightness of a pixel of interest existing in a pixel location of interest is computed (e.g. processing in step S255 in FIG. 37); a second, gray value is computed by performing gray level transforming as to the computed, first gray value (e.g. processing in steps S258 through S260 in FIG. 37); and a pixel value is computed wherein the pixel of interest is subjected to gray level transforming (e.g. processing in steps 3261 through 3264 in FIG. 38), based on the first gray value, the second gray value, and the pixel value of the pixel of interest.

Embodiments of the present invention will now be described with reference to the appended diagrams.

Figure 2:
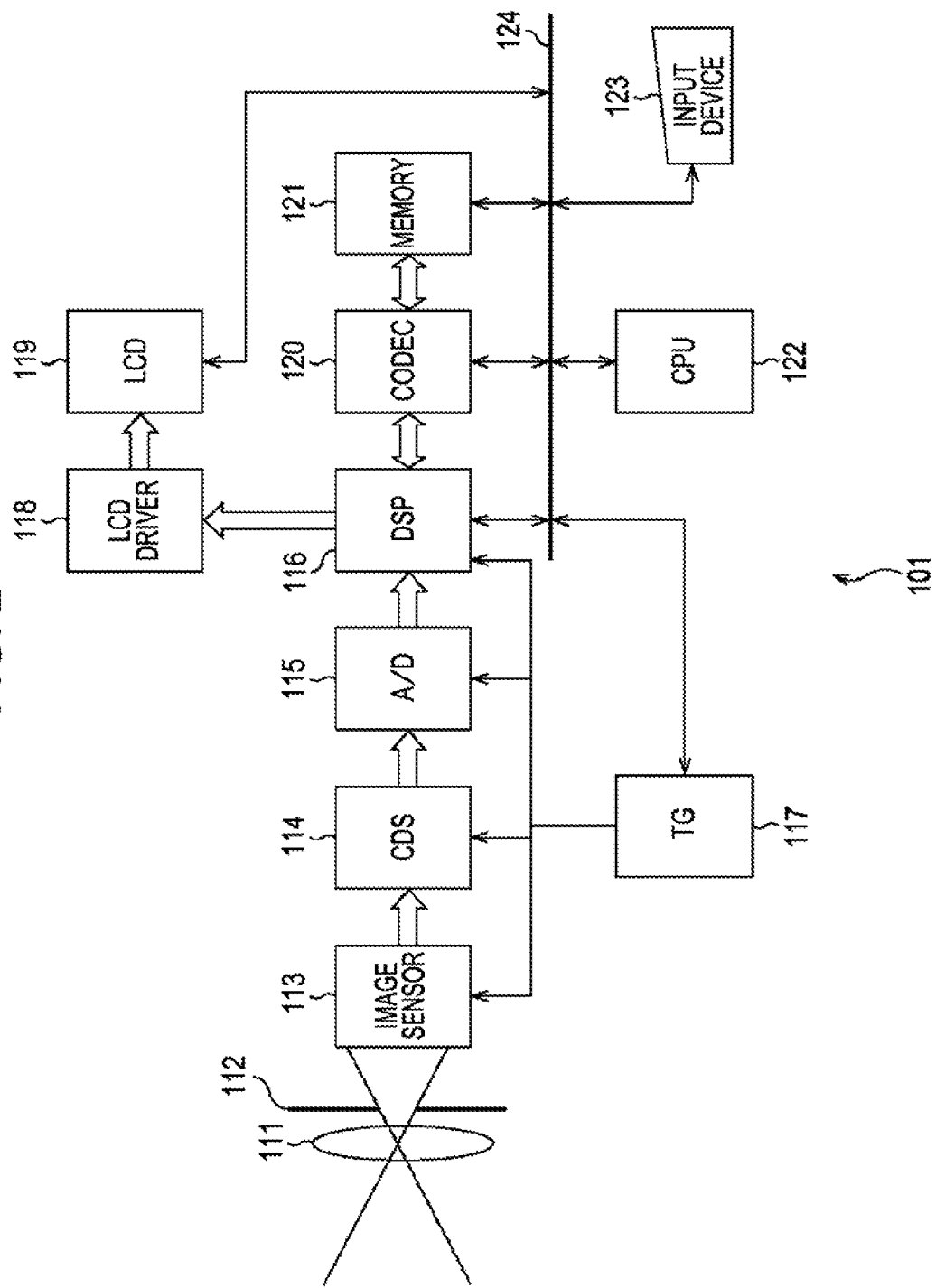
FIG. 2 is a block diagram illustrating an embodiment of a digital video camera to which an embodiment of the present invention has been applied.

FIG. 2 is a block diagram showing one embodiment of a digital video camera to which the present invention has been applied. A digital video camera 101 is configured to include a lens 111, aperture 112, image sensor 113, correlating double sampling circuit (CDS) 114, A/D converter 115, DSP (Digital Signal Processor) block 116, timing generator (TG) 117, LCD (Liquid Crystal Display) driver 118, LCD 119, CODEC (Compression/Decompression) 120, memory 121, CPU 122, and input device 123. Note that the DSP block 116 is a block configured of a processor for signal, processing (e.g. DSP), BAM (Random Access Memory) for saving image data, and the like, and performs image processing to be described later by the processor executing a predetermined program. Note that hereafter the DSP block 116 will be referred to simply as "DSP 116".

The incident light from the subject passing through an optical system made up of the lens 111 and aperture 112 and so forth first arrives at the photoreceptors on the imaging face of the image sensor 113, and is converted into electrical signals by photoelectric conversion at the photoreceptors. The electric signals output from the image sensor 113 have noise removed by the correlating double sampling circuit 114, and are digitised by the A/D converter 115, after which the digitised image data is temporarily stored in the memory in the DSP 116. A timing generator 117 controls a signal processing system configured by the correlating double sampling circuit (CDS) 114, A/D converter 115, and DSP 116, so that the image data is taken in at a fixed frame rate. That is to say, a stream of image data is supplied to the DSP 116 at a fixed, frame rate.

Note that, the image sensor 113 has a dynamic range wider than an image sensor such as a general CCD (Charge Coupled Device), is not saturated and does not generate noise, and can image dark portions to light portions of a subject. Accordingly, the A/D converter 115 converts the input electrical signals into image data with a higher gray level (e.g. gray level which can be expressed with data of approximately 14 to 16 bits) than the gray level (e.g. gray level which can be expressed with data of approximately 10 to 12 bits) of a normal digital video camera.

Upon performing the image processing to be described later for the image data, the DSP 116 supplies the image data subjected to image processing to an LCD driver 118 or CODEC 120 as needed, so that the dynamic range of the image data becomes a dynamic range which the LCD 119 for example can display.

The LCD driver 118 converts the image data supplied from the DSP 116 into analog image signals. The LCD driver 118 supplies the analog image signals to the LCD 119 which is a viewfinder for the digital video camera 101, and displays the image based on the image signal.

The CODEC 120 encodes the image data supplied from the DSP 116 with a predetermined method, and records the encoded image data in memory 121 such as a semiconductor, magnetic recording medium, magneto-optical recording medium, optical recording medium, or the like.

The CPU 122 control the overall processing of the digital video camera 101, based on instructions input by a user by operating an input device 123 configured with an operating button such as a shutter button or the like, for example.

Figure 3:
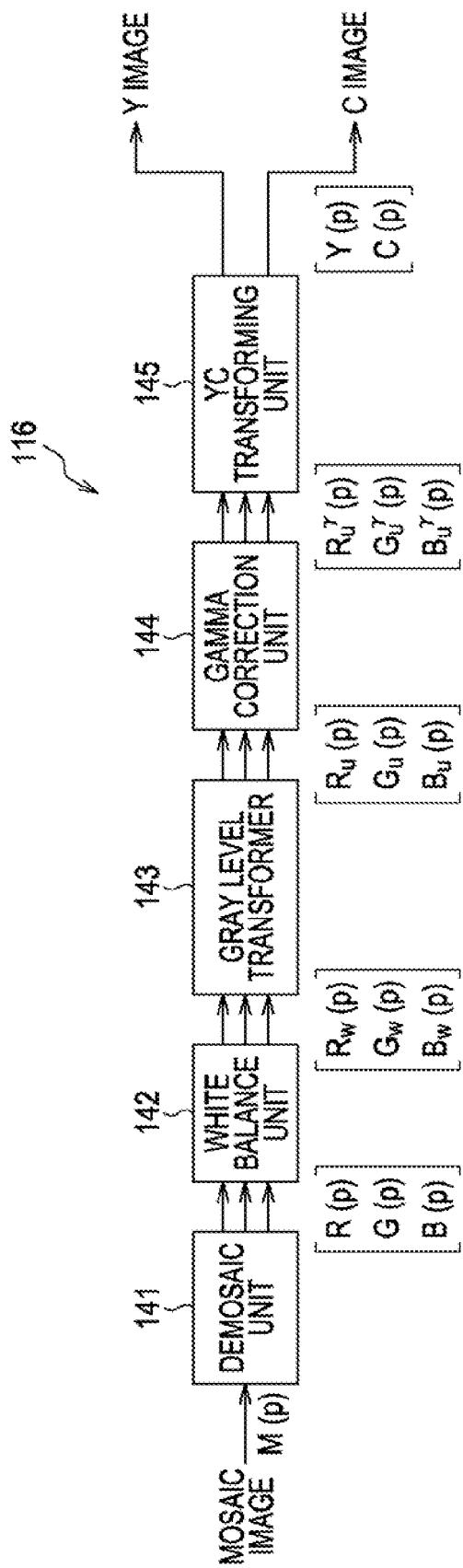
FIG. 3 is a block diagram illustrating a configuration example of a DSP block function in FIG. 2.

FIG. 3 is a block diagram illustrating a configuration example of a function which is realized by a processor (computing unit) within the DSP 116 executing a predetermined program. By the processor within the DSP 116 executing the predetermined program, functionality is realized which includes a demosaic unit 151, white balance unit 142, gray level transforming unit 143, gamma correcting unit 144, and YC transforming unit 145.

The demosaic unit 141 obtains the mosaic image which is the image data subjected to A/D conversion by the A/D converter 115. The mosaic image is an image wherein data corresponding to a color component of one of R, G, and B is stored in one pixel, and the various pixels are arrayed according to a color array called "Bayer array", for example. The demosaic unit 141 performs demosaic processing on the mosaic image so that one pixel has all of the R, G, and B components. Thus, three image data is generated of an R-image, G-image, and B-image each corresponding to the three color components R, G, and B. The demosaic unit 141 supplies the three generated, image data of an R-image, G-image, and B-image to the white balance unit 142.

Note that the three image data of the R-image, G-image, and B-image may also be together called an RGB image. Also, let us say that the pixel value at a pixel location p of the mosaic image is M(p). Further, let us say that the pixel values in the pixel value p of the image data subjected to demosaic processing is [R(p), G(p), B(p)]. Note that R(p) is a pixel value with an R component, G(p) is a pixel value with a G component, and B(p) is a pixel value with a B component.

By applying an appropriate coefficient to each pixel value of an RGB image, the white balance unit 142 adjusts the white balance of the RBG image such that the color balance of an achromatic portion of a subject actually becomes achromatic. The white balance unit 142 supplies the RGB image subjected to adjusted white balance to the gray level transformer 143. Hereafter let us say that the pixel values at a pixel location p of the image data subjected to adjusted white balance is [Rw(p), Gw(p), Bw(p)]. Note that Rw(p) is a pixel value with an R component, Gw(p) is a pixel value with a G component, and Bw(p) is a pixel value with a B component.

The gray level transformer 143 performs gray level transforming processing for the RGB image subjected, to adjusted white balance, as described, later with reference to FIG. 16 and so forth. The gray level transformer 143 supplies the RGB image subjected to gray level transforming to the gamma correcting unit 144. Hereafter let us say that the pixel values at a pixel location p of the image data subjected to gray level transforming is [Ru(p), Gu(p), Bu(p)]. Note that Ru(p) is a pixel value with an R component, Gu(p) is a pixel value with a G component, and Bu(p) is a pixel value with a B component.

The gamma correcting unit 144 performs gamma correction for the RBG image subjected to gray level transforming. The gamma correcting unit 144 supplies the RGB image subjected to gamma correction to a YC transforming unit 145. Hereafter let us say that the pixel values at a pixel location p of the image data subjected to gamma correction is [Ruγ (p), Guγ (p), Buγ (p)]. Note that Ruγ (p) is a pixel value with an R component, Guγ (p) is a pixel value with a G component, and Buγ (p) is a pixel value with a B component.

The YC transformer 145 generates a Y-image configured of a brightness component (Y component) and a C-image configured of a color component (Cb or Cr component), by performing YC matrix processing as to the RGB image subjected to gamma correction and bandwidth limiting as to a chromatic component. The YC transformer 145 supplies the generated Y-image and C-image to the LCD driver 118 or CODEC 120, as needed. Hereafter, let us say that the pixel value at a pixel location p of the image data output, from the YC transformer 145 is [Y(p), C(p)]. Note that Y(p) is a value of the brightness component in the Y-image, and C(p) is a value of the color difference component in the C-image.

Figure 4:
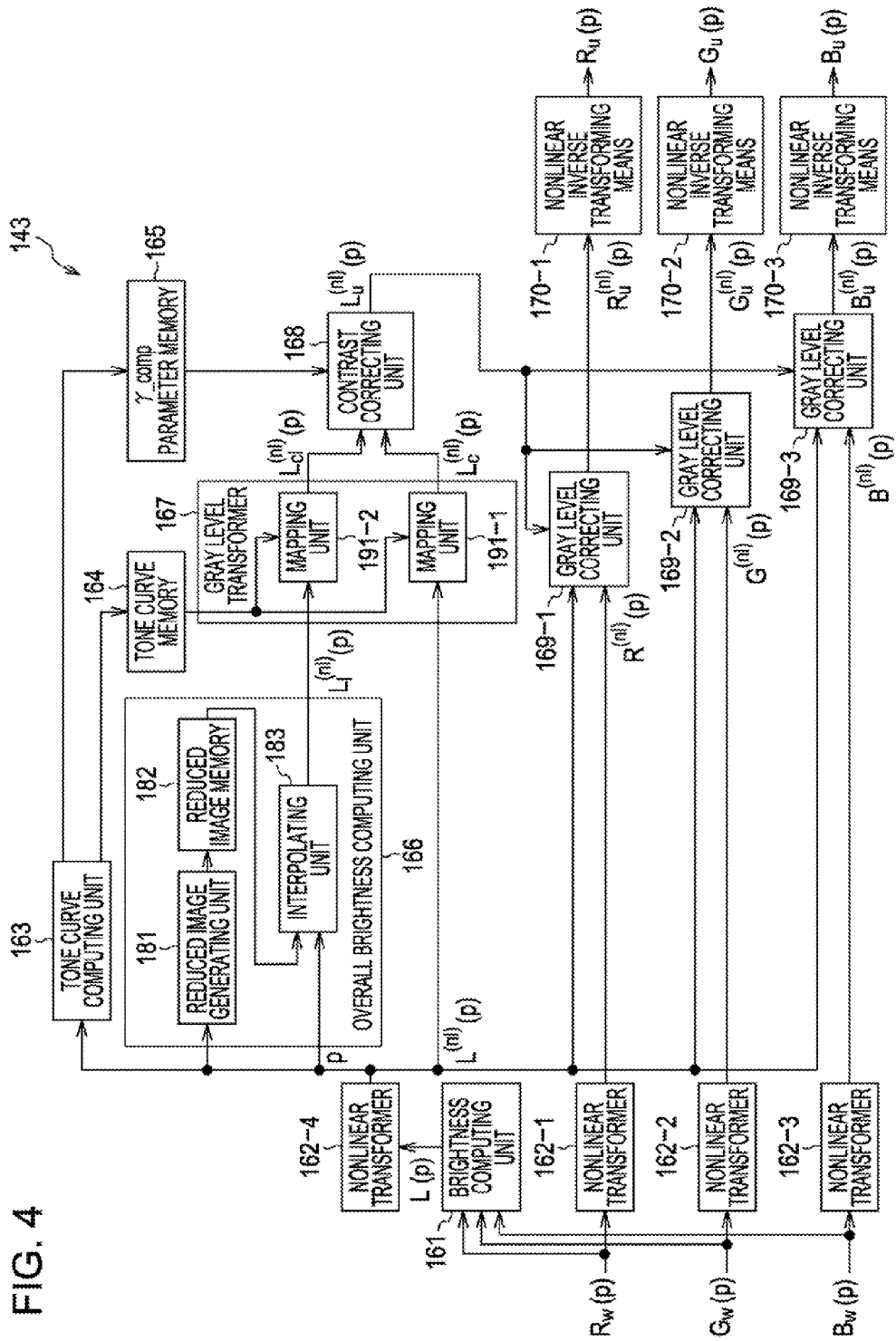
FIG. 4 is a block diagram illustrating a configuration example of a gray level transformer function in FIG. 3.

FIG. 4 is a block diagram illustrating a configuration example of the function of the gray level transformer 143. The gray level transformer 143 is configured so as to include a brightness computing unit 161, nonlinear transformers 162-1 through 162-4, tone curve computing unit 163, tone curve memory 164, γ_comp parameter memory 165, overall brightness computing unit 166, gray level transformer 167, contrast correcting unit 168, gray level correcting units 169-1 through 169-3, and nonlinear inverse transformers 170-1 through 170-3.

The brightness computing unit 161 computes the value (brightness value L(p)) of a brightness component, corresponding to the pixel, location from the pixel values Rw(p), Gw(p), Bw(p) of the RGB image subjected to white balance, as described later with reference to FIG. 16. The brightness computing unit 161 outputs the computed brightness value L(p) to the nonlinear transformer 162-4.

The nonlinear transformers 162-1 through 162-3 each subject the pixel values Rw(p), Gw(p), Bw(p) of the RGB image which are subjected to white balance to nonlinear transforming, as described later with reference to FIG. 16. The nonlinear transformers 162-1 through 162-3 output the pixel values R(nl)(p), G(nl)(p), or B(nl)(p) computed by nonlinear transformation to the gray level correcting units 169-1 through 169-3, respectively.

The nonlinear transformer 162-4 subjects the brightness value L(p) to nonlinear transforming, as described, later with reference to FIG. 16. The nonlinear transformer 162-4 outputs the brightness value L(nl)(p) computed by nonlinear transformation to the tone curve computing unit 163, gray level correcting units 169-1 through 169-3, reduced image generating unit 181, interpolating unit 183, and mapping unit 191-1.

Note that if there is no particular need to individually distinguish the nonlinear transformers 162-1 through 162-4, these will collectively referred to as "nonlinear transformer 162".

The tone curve computing unit 163 computes the tone curve suitable for compressing the gray level of the brightness value L(nl)(p) subjected to nonlinear transformation and the overall brightness value Ll(nl)(p) to be described later, as described later with reference to FIG. 24. The tone curve computing unit 163 stores a lookup table (brightness value transformation corresponding chart) expressing the computed tone curve in a tone curve memory 164. Also, the tone curve computing unit 163 computes a γ_comp parameter which is a representative value of the tone curve slope, as described later with reference to FIG. 24. The tone curve computing unit 163 stores the γ_comp parameter in the γ_comp parameter memory 165.

The overall brightness computing unit 166 computes an overall brightness value Ll(nl)(p) which is a brightness value of an image made up of extremely low frequency components made up of a brightness value L(nl)(p) (hereafter referred to as "overall brightness image"). The overall brightness computing unit 166 is configured so as to include the reduced image generating unit 181, reduced image memory 182, and interpolating unit 183.

The reduced image generating unit 181 generates a reduced image wherein an image made from the brightness value L(nl)(p) is reduced, as will be described later with reference to FIG. 26. Specifically, the reduced image generating unit 181 divides the image made from the brightness value Ld(nl)(p) into blocks of horizontal wr×vertical hr, and generates a reduced image of horizontal wr×vertical hr pixels wherein the average value of the brightness value L(nl)(p) for each divided block is arrayed in the same order as the corresponding block. The reduced image generating unit 181 stores the generated reduced image in reduced image memory 182.

Figure 20:
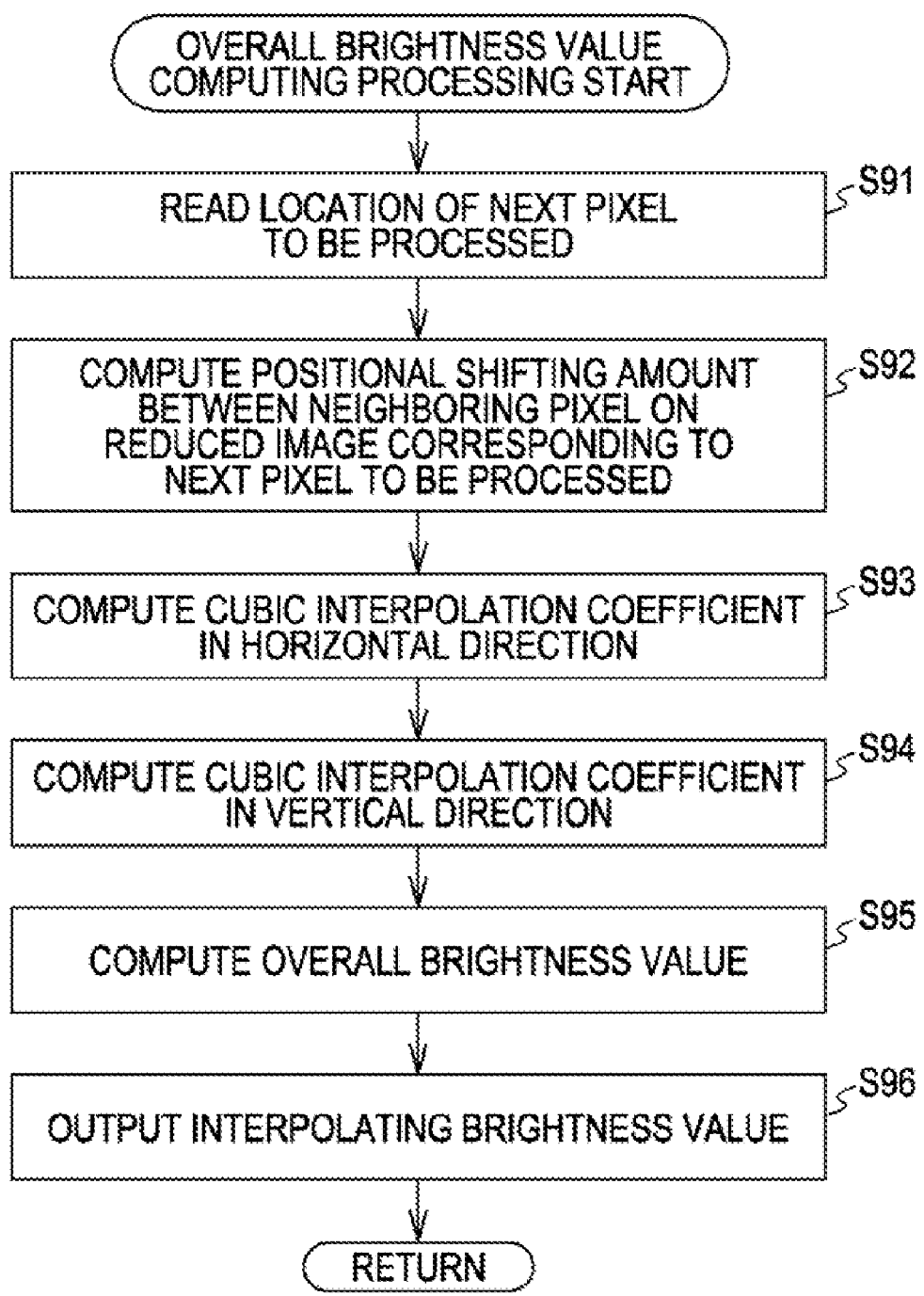
FIG. 20 is a flowchart to describe in detail the overall brightness computing processing in step S28 of FIG. 16.

The interpolating unit 183 computes an overall brightness value Ll(nl)(p) to configure an image expanded so that a reduced image has the same pixel value as the original image with cubic interpolation, as described later with reference to FIG. 20. The interpolating unit 133 outputs the computed overall brightness value Ll(nl)(p) to the mapping unit 191-2.

The gray level transformer 167 compresses the gray level of the brightness value L(nl)(p) and overall brightness value Ll(nl)(p). The gray level transformer 167 is configured so as to include the mapping units 191-1 and 191-2.

The mapping unit 191-1 reads a lookup table expressing a tone curve from the tone curve memory 164. The mapping unit 191-1 compresses the gray level of the brightness value L(nl)(p) based on the read out lookup table, i.e. the tone curve. The mapping unit 191-1 outputs the brightness value Lc(nl)(p) with compressed, gray value to the contrast correcting unit 168.

The mapping unit 191-2 reads a lookup table expressing a tone curve from the tone curve memory 164. The mapping unit 191-2 compresses the gray level of the overall brightness value Ll(nl)(p) based on the read out lookup table, i.e. the tone curve. The mapping unit 191-2 outputs the overall brightness value Lcl(nl)(p) with compressed gray value to the contrast correcting unit 168.

Figure 22:
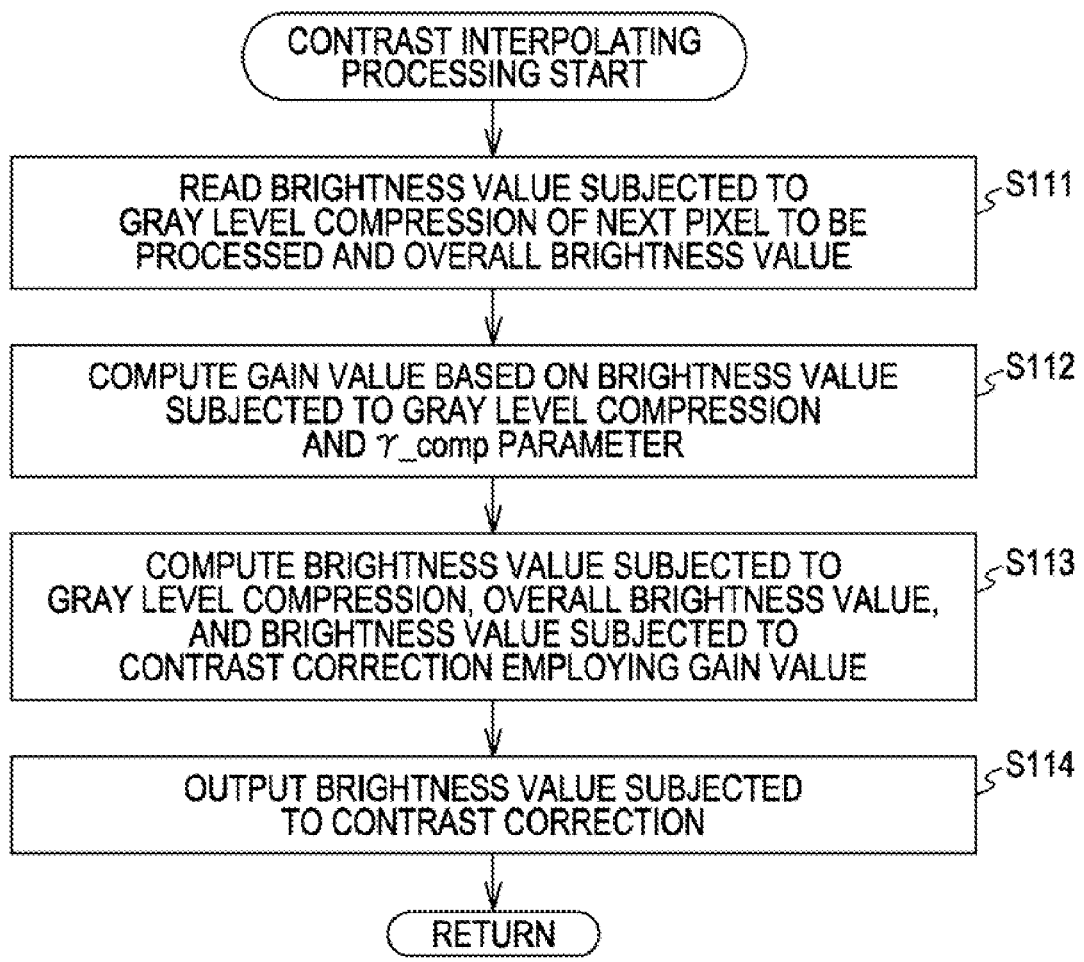
FIG. 22 is a flowchart to describe in detail the contrast correcting processing in step S30 of FIG. 16.

The contrast correcting unit 168 corrects the contrast of an image made from a brightness value Lc(nl)(p) wherein the gray level is compressed by the tone curve, based on a γ_comp parameter and an overall brightness value Lcl(nl)(p) wherein the gray level is compressed by the tone curve, as described later with reference to FIG. 22. The contrast correcting unit 168 outputs the brightness value Lu(nl)(p) with corrected contrast to the gray level correcting units 169-1 through 169-3.

Figure 17:
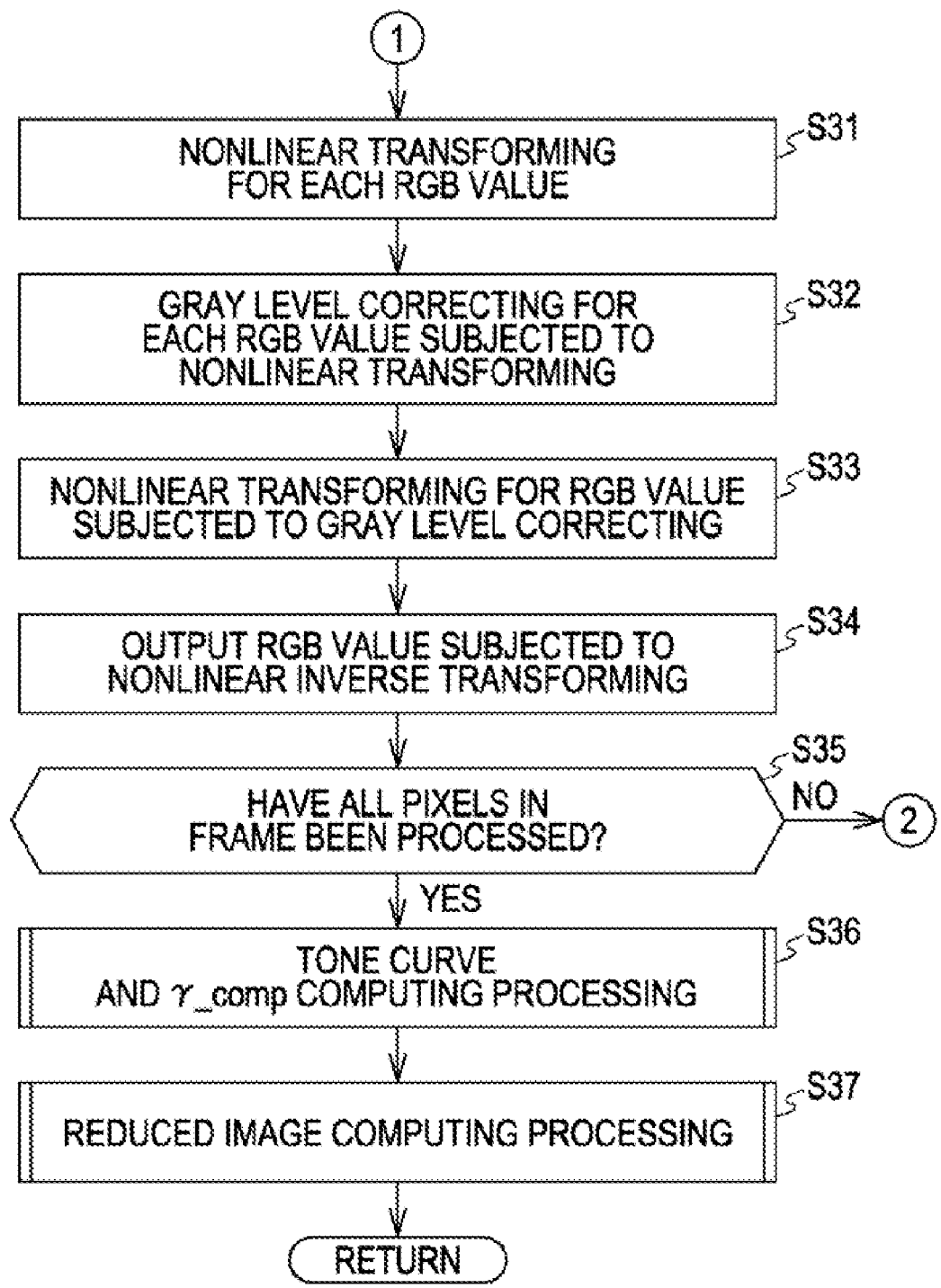
FIG. 17 is a flowchart to describe in detail a gray level transforming processing 1 in step S4 in FIG. 15.

The gray level correcting units 169-1 through 169-3 correct (transform) the gray level of the pixel values R(nl)(p), G(nl)(p), or B(nl)(p) subjected to nonlinear transformation respectively, as described later with reference to FIG. 17. The gray level correcting units 169-1 through 169-3 output the pixel values Ru(nl)(p), Gu(nl)(p), or Bu(nl)(p) subjected to gray level correction, respectively to the nonlinear inverse transformers 170-1 through 170-3.

The nonlinear inverse transformers 170-1 through 170-3 perform nonlinear inverse trans terming serving as inverse transforming of the nonlinear transforming by the nonlinear transformers 162-1 through 162-3, respectively, to the pixel values Ru(nl)(p), Gu(nl)(p), or Bu(nl)(p) subjected to gray level correction. The nonlinear inverse transformers 170-1 through 170-3 output the pixel values Ru(p), Gu(p), or Bu(p) subjected to nonlinear inverse transforming, respectively, to the gamma correction unit 144.

Note that the gray level converter 143 can be divided largely into three portions based on the content of the processing of each portion. The first portion is a portion made up of the brightness competing unit 161, nonlinear transformer 162-4, tone curve computing unit 163, and reduced image generating unit 181. That is to say, the first portion is a portion to generate the reduced image and compute the tone curve and γ_comp parameter. The second portion is a portion made up of the brightness computing unit 161, nonlinear transformer 162-4, and the tone curve computing unit 163 through contrast correcting unit 168. That is to say, the second portion is a portion to compress the gray level and correct the contrast as to the brightness values for each pixel of an input image employing the reduced image, the tone curve, and γ_comp parameter generated or computed by the first portion. The third portion is a portion made up of nonlinear transformers 162-1 through 162-3, gray level correcting units 169-1 through 169-3, and nonlinear inverse transformers 170-1 through 170-3. That is to say, the third portion is a portion to correct the gray level of the R, G, and B values of each pixel, employing the brightness value of each pixel subjected to gray level, transforming by the second portion.

Figure 5:
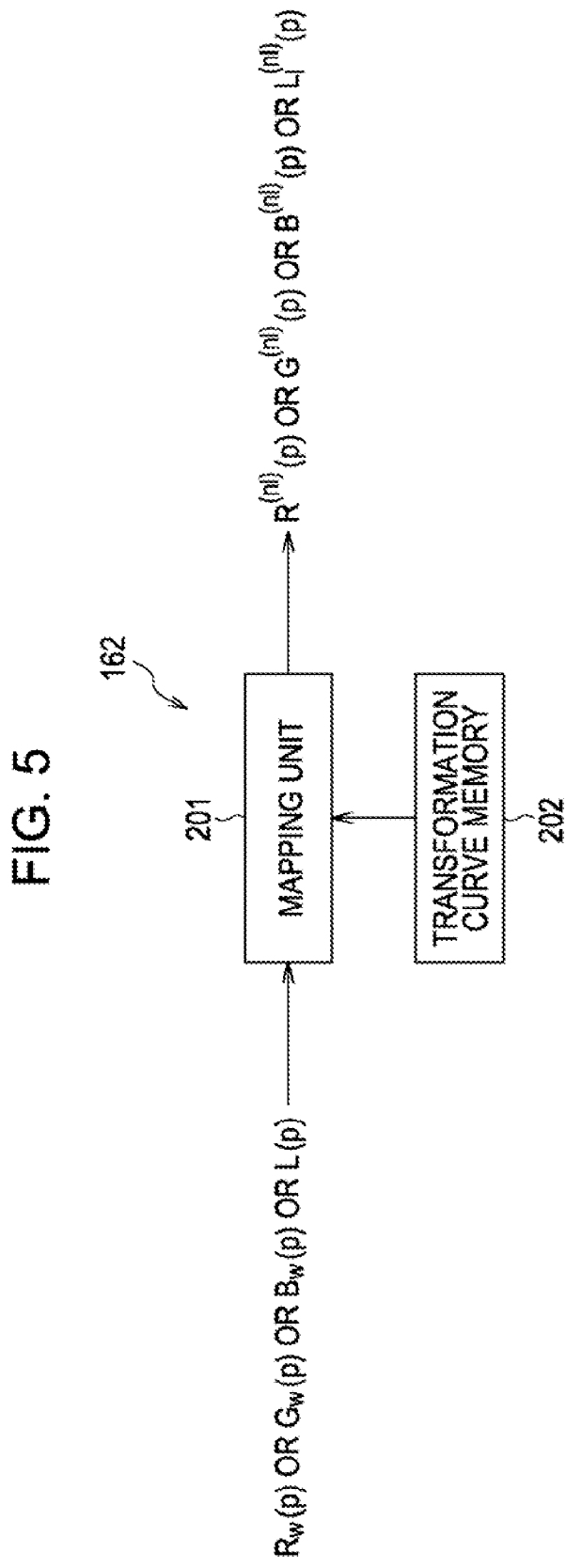
FIG. 5 is a block diagram illustrating a configuration example of a nonlinear transformer function in FIG. 4.

FIG. 5 is a block diagram showing a configuration example of the function of the nonlinear transformer 162 in FIG. 4. The nonlinear transformer 162 is configured so as to include a mapping unit 201 and transformation curve memory 202.

The mapping unit 201 subjects the externally input pixel value or brightness value to nonlinear transforming, based on the lookup table expressing the transformation curve stored in the transformation curve memory 202. The mapping unit 201 outputs the pixel value or brightness value externally which are subjected to nonlinear transforming.

Figure 6:
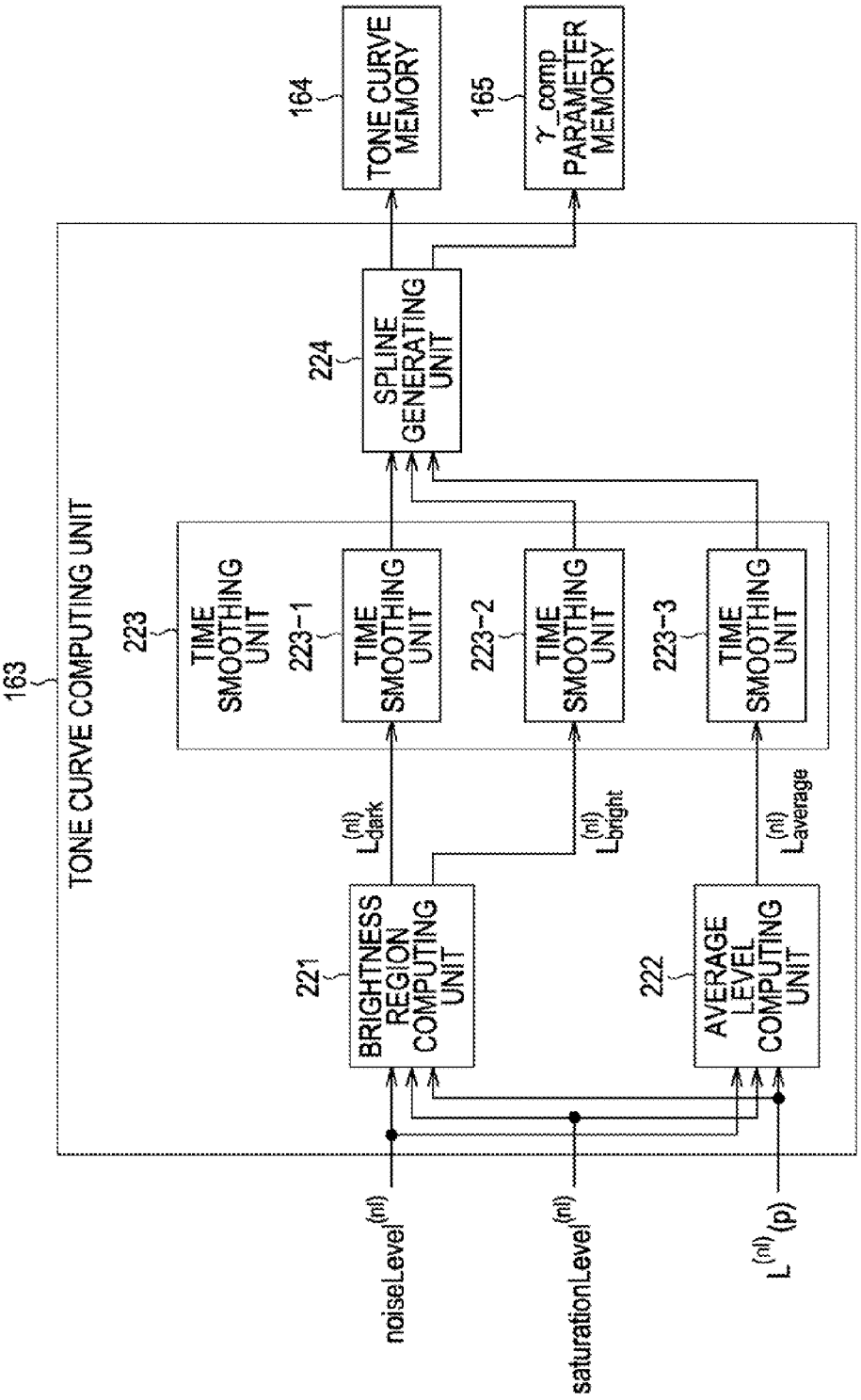
FIG. 6 is a block diagram illustrating a configuration example of a tone curve generating unit function in FIG. 4.

FIG. 6 is a block diagram showing a configuration example of the function of the tone curve computing unit 163 in FIG. 4. The tone curve computing unit 163 is configured so as to include the brightness region computing unit 221, average level computing unit 222, time smoothing unit 223, and spline generating unit 224. Also, the time smoothing unit 223 includes three time smoothing units which are the time smoothing units 223-1 through 223-3.

The brightness region computing unit 221 obtains the brightness value L(nl)(p) from the nonlinear transformer 162-4. Also, the brightness region computing unit 221 reads a noiseLevel(nl) showing the noise level of the brightness value and a saturationLevel(nl) showing the saturation level of the brightness value from an unshown internal memory of the DSP 116. The brightness region computing unit 221 computes a base value Ldark(nl) which is a boundary value wherein the ratio of the number of pixels of a brightness below a predetermined boundary value within the number of pixels overall is roughly a predetermined value (e.g. 0.5), and a base value Lbright(nl) which is a boundary value wherein the ratio of the number or pixels of a brightness at or above a predetermined boundary value within the number of pixels overall is roughly a predetermined value (e.g. 0.5), with a distribution of the brightness value L(nl)(p), to be described later with reference to FIG. 24. The brightness region computing unit 221 outputs the base value Ldark(nl) to the time smoothing unit 223-1, and outputs the base value Lbright(nl) to the time smoothing unit 223-2.

The average level computing unit 222 obtains the brightness value L(nl)(p) from the nonlinear transformer 162-4. The average level computing unit 222 reads the noiseLevel (nl) and saturationLevel(nl) from an unshown internal memory of the DSF 116. The average level computing unit 222 computes an average level Laverage(nl) of the brightness value L(nl)(p) as described later with reference to FIG. 24. The average level computing unit 222 outputs the average level Leverage(nl) to the time smoothing unit 223-3.

The time smoothing units 223-1 through 223-3 are configured with an IIR (Infinite Impulse Response) filter, for example. The time smoothing unit 223-1 subjects the base value Ldark(nl) to time smoothing, and outputs the base value Ldark-ts(nl) subjected to time smoothing to the spline generating unit 224. The time smoothing unit 223-2 subjects the base value Lbright(nl) to time smoothing, and outputs the base value Lbright-ts(nl) subjected to time smoothing to the spline generating unit 224. The time smoothing unit 223-3 subjects the base value Leverage(nl) to time smoothing, and outputs the base value Laverage-ts(nl) subjected to time smoothing to the spline generating unit 224.

The spline generating unit 224 generates (computes) a tone curve, based on the base value Ldark-ts(nl), base value Lbright-ts(nl), and Laverage-ts(nl), as described later with reference to FIG. 24. The spline generating unit 224 stores the lookup table expressing the generated tone curve in the tone curve memory 164. Also, the spline generating unit 224 computes the γ_comp parameter as described later with reference to FIG. 24. The spline generating unit 224 stores the γ_comp parameter to the γ_comp parameter memory 165.

Figure 7:
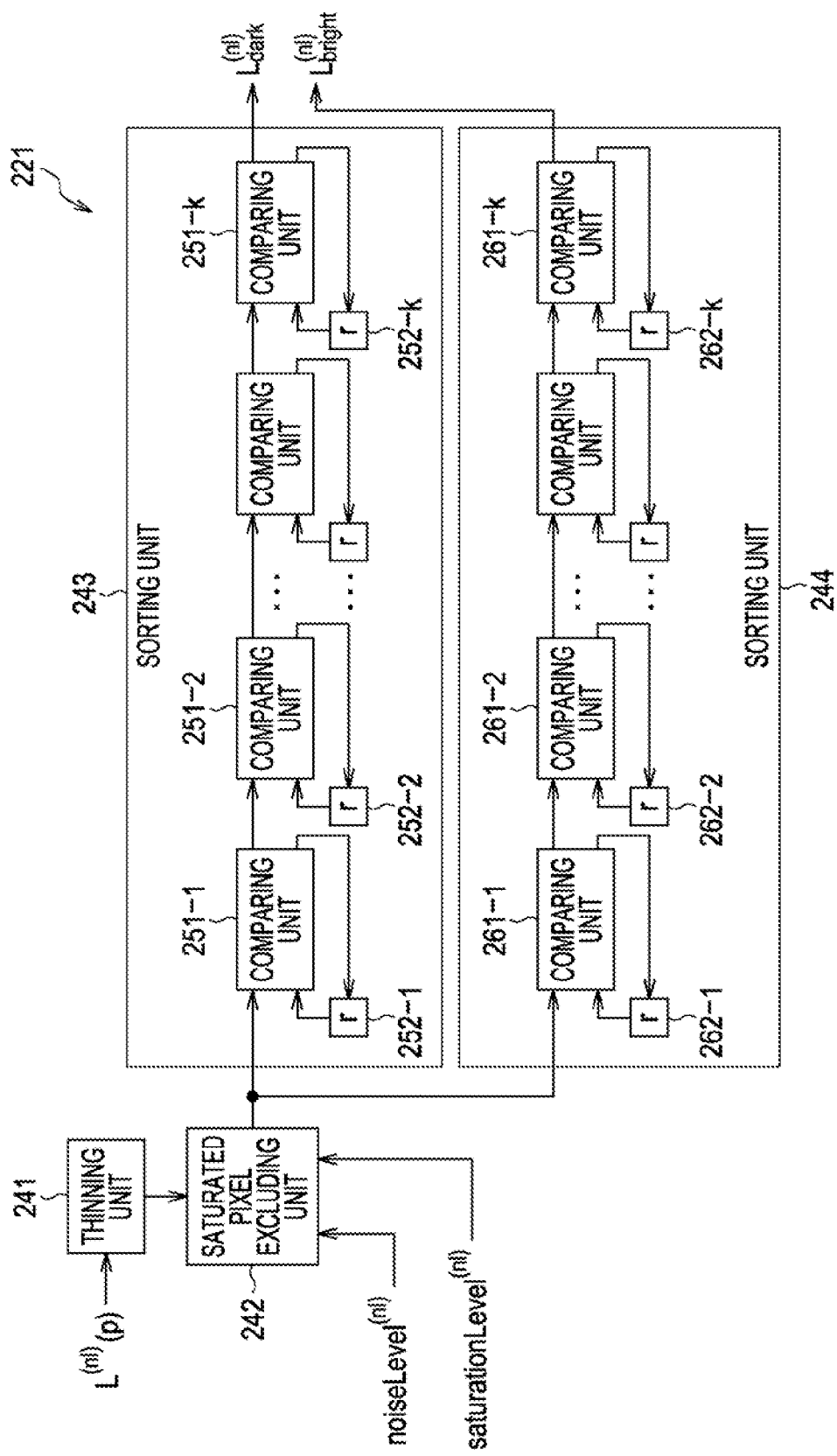
FIG. 7 is a block diagram illustrating a configuration example of a brightness region computing unit function in FIG. 6.

FIG. 7 is a diagram showing a configuration example of the function of the brightness region computing unit 221 in FIG. 6. The brightness region computing unit 221 is configured so as to include a thinning unit 241, saturation pixel excluding unit 242, sorting unit 243, and sorting unit 244.

The thinning unit 241 determines whether or not the pixel location p of the brightness value L(nl)(p) input from the nonlinear transformer 162-4 matches a sampling location provided every predetermined spacing amount, and in the case determination is made that the pixel location p matches the sampling location, the thinning unit 241 outputs the brightness value L(nl)(p) to the saturated pixel excluding unit 242.

The saturated pixel excluding unit 242 reads the noiseLevel(nl) and saturationLevel(nl) from the unshown internal memory of the DSP 116. In the case determination is made that the brightness value L(nl)(p) input from the thinning unit 241 is above a predetermined noiseLevel(nl) and below a saturationLevel(nl), the saturated pixel excluding unit 242 outputs the brightness value X(nl)(p) to the sorting units 243 and 244.

The sorting unit 243 is configured so as to include comparison units 251-1 through 251-$k$ and registers 252-1 through 252-$k$ to correspond to each comparison unit. Note that in the case there is no need to individually distinguish the comparison units 251-1 through 251-$k$, these will be collectively referred to as "comparison unit 251", and if no need to individually distinguish the registers 252-1 through 252-$k$, these will foe collectively referred to as "register 252".

The comparison unit 251-1 compares the brightness value L(nl)(p) input from the saturated pixel excluding unit 242 with the register 252-1. In the case that the brightness value L(nl)(p) is smaller than the value of the register 252-1, the comparison unit 251-1 outputs the current register 252-1 value to the comparison unit 251 downstream, and stores the brightness value L(nl)(p) in the register 252-1. In the case that the brightness value L(nl)(p) is equal to or greater than the register 252-1 value, the comparison unit 251-1 outputs the brightness value L(nl)(p) as is to the downstream comparison unit 251-2.

The comparison unit 251-2 compares the value input from the upstream comparison unit 251-1 with the value in the register 252-2. In the case that the value input from the comparison unit 251-1 is smaller than the register 252-2 value, the comparison unit 251-2 outputs the register 252-2 value to the comparison unit 251-3, and stores the value input from the comparison unit 251-1 in the register 252-2. In the case that the value input from the comparison unit 251-1 is greater than the register 252-2 value, the comparison unit 251-2 outputs the value input from the comparison unit 251-1 as is to the downstream comparison unit 251-3. The comparison units 251-3 through 251-$k$ also perform processing the same as that of the comparison unit. 251-2. Consequently, of the input brightness values L(nl)(p), the values from the smallest value to the k'th from the smallest value are stored in ascending order in the registers 252-1 through 252-k.

Upon sorting the brightness values L(nl)(p) of one frame worth of image, the sorting unit 243 outputs the value stored in the register 252-k as a base value Ldark(nl) to the time smoothing unit 223-1.

The sorting unit 244 is configured so as to include the comparison units 251-1 through 261-k and the registers 252-1 through 262-k corresponding to each comparison unit. Note that in the case there is no need to individually distinguish the comparison units 261-1 through 261-k, these will be collectively referred to as "comparison unit 261", and in the case there is no need to individually distinguish the registers 262-1 through 262-k, these will be collectively referred to as "register 262".

The comparison unit 261-1 compares the brightness value L(nl)(p) input from the saturated pixel excluding unit 242 and the register 262-1 value. In the case the brightness value L(nl)(p) is greater than the register 262-1 value, the comparison unit 261-1 outputs the current register 262-1 value to the downstream comparison unit 261 and stores the brightness value L(nl)(p) in the register 262-1. In the case that the brightness value L(nl)(p) is not greater than the register 262-1 value, the comparison unit 261-1 outputs the brightness value L(nl)(p) as is to the comparison unit 261-2 downstream.

The comparison unit 261-2 compares the value input from the upstream comparison unit 261-1 and the register 262-2 value. In the case that the value input from the comparison unit 261-1 is greater than the register 262-2 value, the comparison unit 261-2 outputs the register 262-2 value to the comparison unit 261-3, and stores the value input from the comparison unit 261-1 in the register 262-2. In the case that the value input from the comparison unit 261-1 is not greater than the register 262-2 value, the comparison unit 261-2 outputs the value input from the comparison unit 261-1 as is to the comparison unit 261-3. The comparison units 261-1 through 261-k also perform processing similar as the comparison unit 261-2. Consequently, of the input brightness values L(nl)(p), the values from the greatest value to the k'th from the greatest value are stored in descending order in the registers 262-1 through 262-k.

Upon sorting the brightness values L(nl)(p) of one frame worth of image, the sorting unit 244 outputs the value stored in the register 262-k as a base value Lbright(nl) to the time smoothing unit 223-2.

Figure 8:
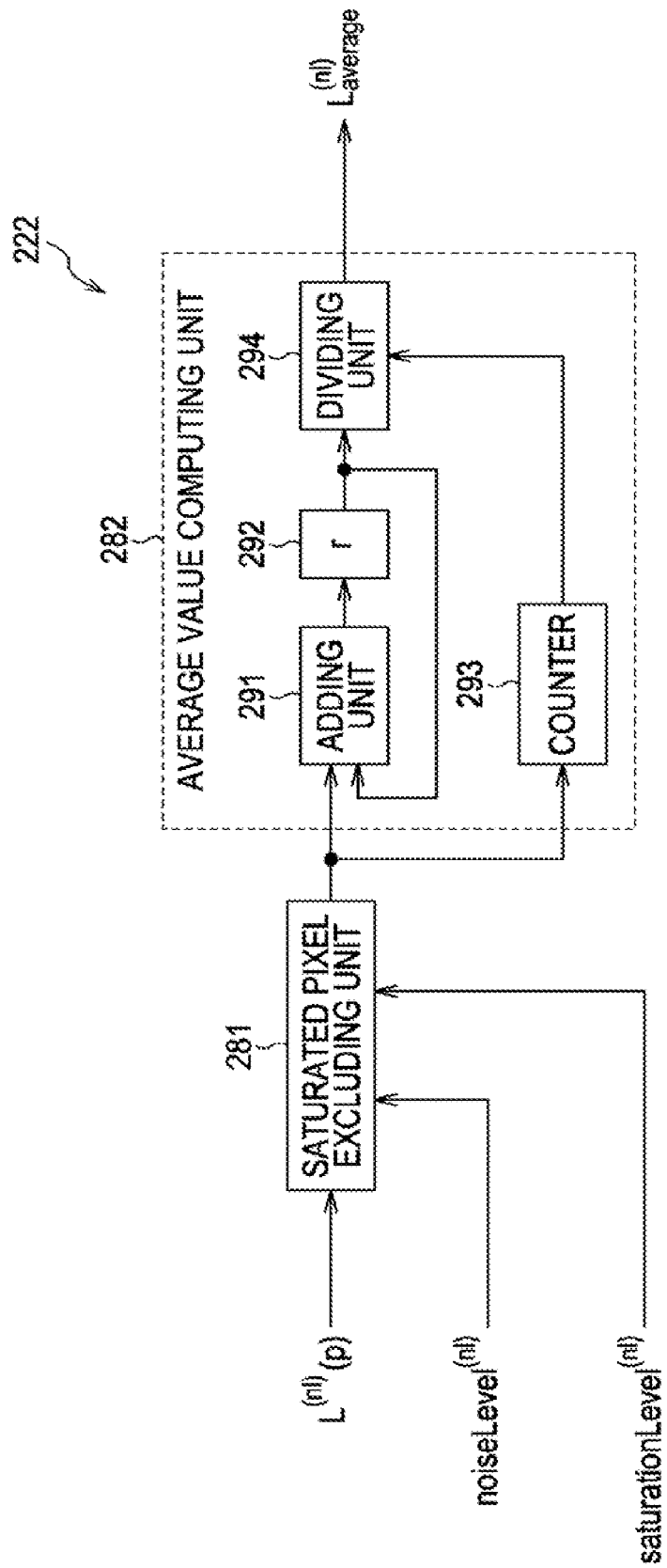
FIG. 8 is a block diagram illustrating a configuration example of an average level computing unit function in FIG. 6.

FIG. 8 is a block diagram illustrating a configuration example of the function of the average level computing unit 222 in FIG. 6. The average level computing unit 222 is configured so as to include a saturated pixel excluding unit 281 and average value computing unit 282.

The saturated pixel excluding unit 281 reads the noiseLevel(nl) and saturationLevel(nl) from the unshown infernal memory of the DSP 116. In the case the saturated pixel excluding unit 281 determines that the brightness value L(nl)(p) input from the nonlinear transformer 162-4 is at or above a predetermined noiseLevel(nl) and at or below the saturationLevel(nl), the brightness value L(nl)(p) is output to the adding unit 291 and counter 293 in the average value computing unit 282.

The average value computing unit 282 is configured so as to include an adding unit 291, register 292, counter 293, and dividing unit 294.

The adding unit 291 adds the brightness value L(nl)(p) input from the saturated pixel excluding unit 281 to the value stored in the register 292, and stores this in the register 292. That is to say, a brightness total value which is the total value of the brightness values L(nl)(p) is stored in the register 292.

The counter 293 increments the value of the counter by one every time a brightness value L(nl)(p) is input from the saturated pixel excluding unit 281, and counts the number of brightness values L(nl)(p) (number of pixels) which are added to the brightness total value stored in the register 292.

Upon adding the brightness value L(nl)(p) of one frame worth of pixels, the dividing unit 294 computes the average level Leverage(nl) of the brightness value L(nl)(p) by dividing the register 292 value by the counter value of the counter 293. The dividing unit 294 outputs the average level Laverage (nl) to the time smoothing unit 223-3.

Figure 9:
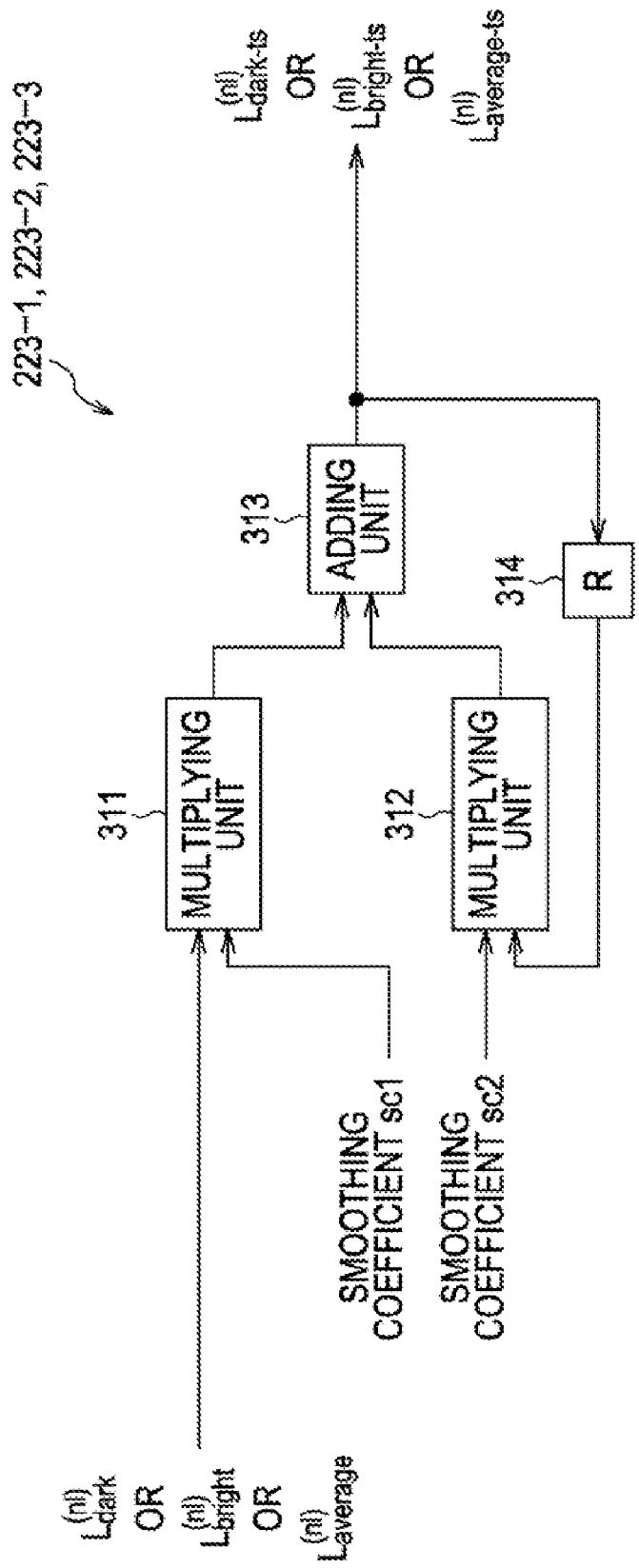
FIG. 9 is a block diagram illustrating a configuration example of a time smoothing unit in FIG. 6.

FIG. 9 is a block diagram showing a configuration example of the function of the time smoothing units 223-1 through 223-3 in FIG. 6. The time smoothing unit 223 is configured so as to include the multiplying unit 311, multiplying unit 312, adding unit 313, and register 314.

The multiplying unit 311 reads a predetermined smoothing coefficient sc1 from the unshown internal memory of the DSP 116. The multiplying unit 311 outputs the values input externally (e.g. the base value Ldark(nl), base value Lbright(nl), or average level Laverage (nl)) multiplied by a smoothing coefficient sc1, to the adding unit 313.

The multiplying unit 311 reads a predetermined smoothing coefficient sc2 from the unshown internal memory of the DSP 116. The multiplying unit 311 outputs the values stored in the register 314 (e.g. the base value Ldark-ts-pre(nl), base value Lbright-ts-pre(nl), or average level Laverate-ts-pre(nl) which is subjected to time smoothing corresponding to the previous frame, for example) multiplied by the smoothing coefficient sc2, to the adding unit 313.

The adding unit 313 outputs the sum of the values input from the multiplying units 311 and 312 (e.g. the time smoothing base value Ldark-ts(nl), base value Lbright-ts(nl), or average level Laverage-ts(nl)) externally, while storing this in the register 314.

Figure 10:
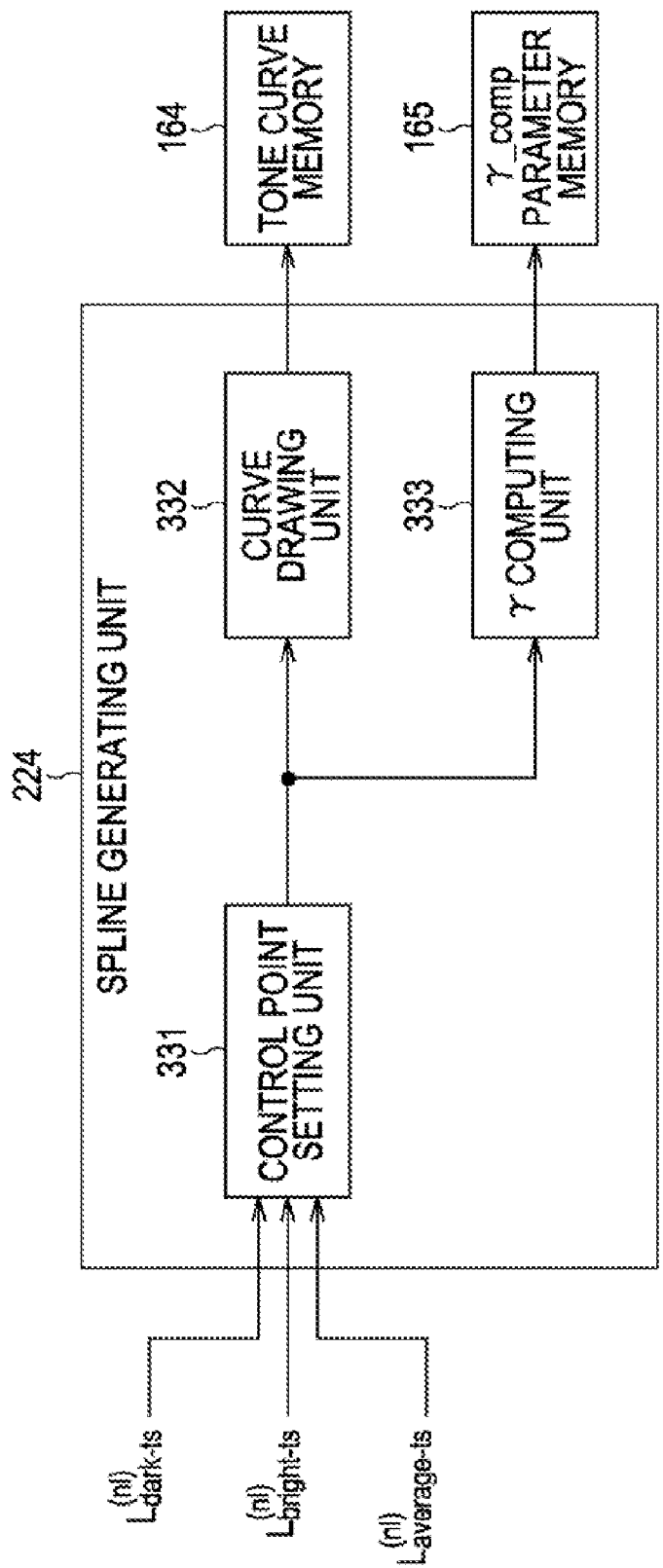
FIG. 10 is a block diagram illustrating a configuration example of a spline generating unit function in FIG. 6.

FIG. 10 is a block diagram showing a configuration example of the function of the spline generating unit 224 in FIG. 6. The spline generating unit 224 is configured so as to include a control point setting unit 331, curve drawing unit 332, and γ computing unit 333.

The control point setting unit 331 obtains the base value Ldark-ts(nl) from the time smoothing unit 223-1, obtains the base value Lbright-ts(nl) from the time smoothing unit 223-2, and obtains the average level Laverage-ts(nl) from the time smoothing unit 223-3. The control point setting unit 331 sets a control point to generate (compute) a tone curve, as described later with reference to FIG. 24, and outputs the control point set which indicates the location of the set control point to the curve drawing unit 332, and γ computing unit 333.

The curve drawing unit 332 draws (generates) the tone curve based on the control point set by the control point setting unit 331, as described, later with reference to FIG. 24. The curve drawing unit 332 stores a lookup table showing the generated tone curve in the tone curve memory 164.

The γ computing unit 333 computes the γ_comp parameter, as described later with reference to FIG. 24. The γ computing unit 333 stores the γ_comp parameter in the γ_comp parameter 165.

Figure 11:
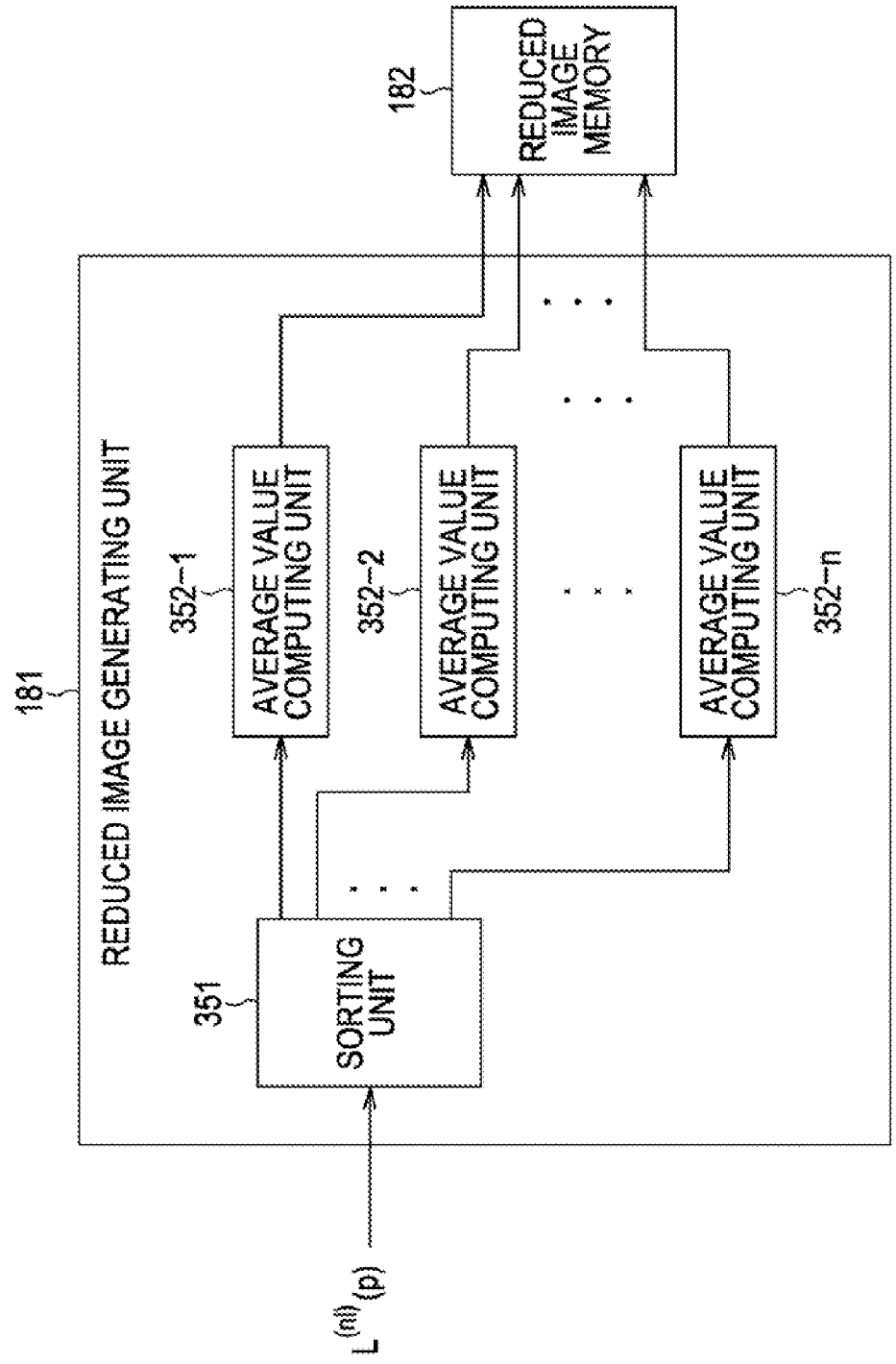
FIG. 11 is a block diagram illustrating a configuration example of a reduced image generating unit function in FIG. 4.

FIG. 11 is a diagram showing a configuration example of the function of the reduced image generating unit 181 in FIG. 4. The reduced image generating unit 181 is configured so as to include a sorting unit 351 and average value computing units 352-1 through 352-n.

The sorting unit 351 divides an image made up of brightness values L(nl)(p) into blocks of horizontal wr×vertical hr, and determines in which block the pixel location p of the brightness value L(nl)(p) input from the nonlinear transformer 162-4 is included. Of the average value computing units 352-1 through 352-n, the sorting unit 351 outputs the brightness value L(nl)(p) to the average value computing unit which computes the average value of the brightness value of the blocks wherein the pixel location p is included.

The average value computing units 352-1 through 352-n (n=wr×hr) have a configuration similar to that of the average value computing unit 282 in FIG. 8, and compute the average value of the brightness value L(nl)(p) included in the blocks to be subjected to the various average value computing units. The average value computing units 352-1 through 352-n store the average values of the computed block brightness so as to array in a similar sequence as the blocks corresponding to the reduced image memory 182. Thus, a reduced image with horizontal wr×vertical hr pixels made up of average value of the brightness values L(nl)(p) for each block is generated on the reduced image memory 182.

Figure 12:
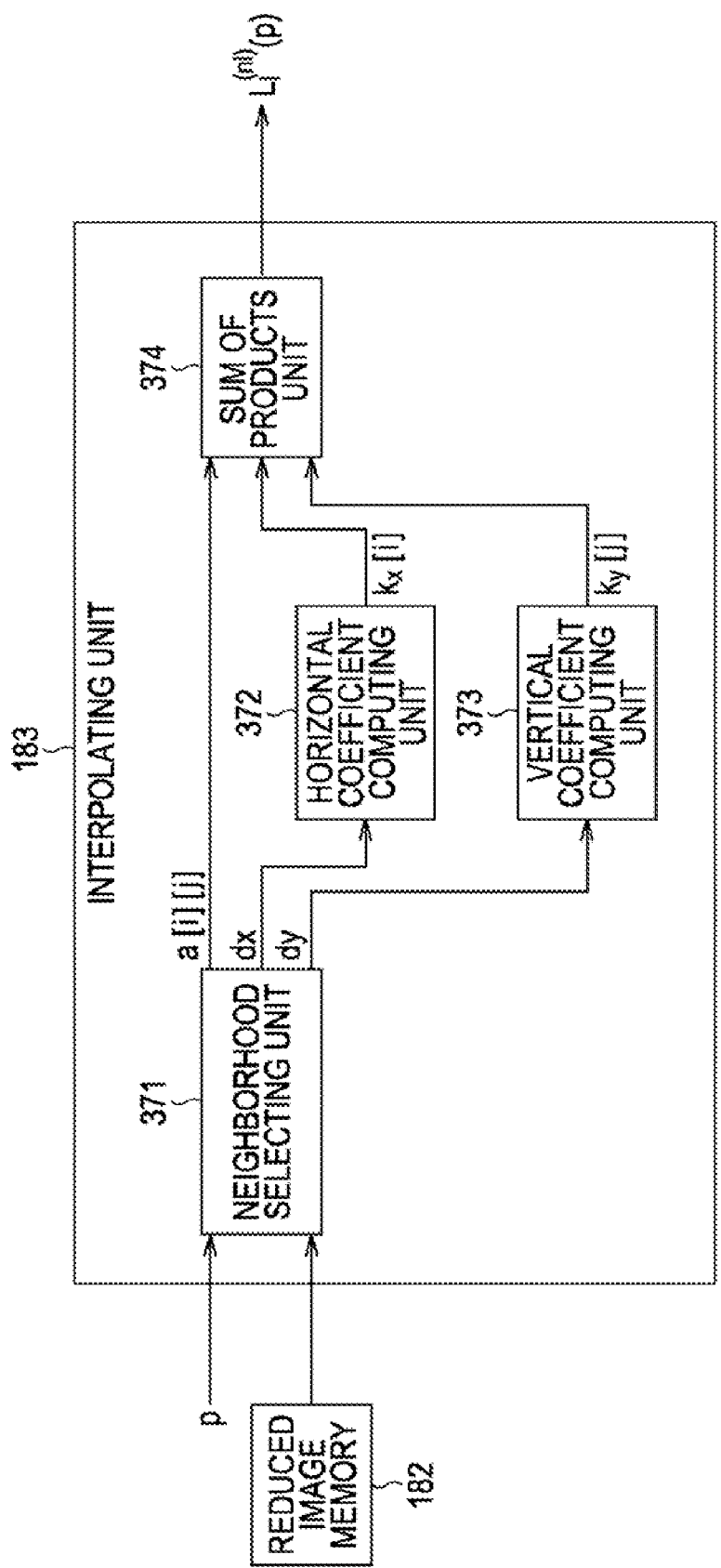
FIG. 12 is a block diagram illustrating a configuration example of an interpolating unit function in FIG. 4.

FIG. 12 is a block diagram showing a configuration example of the function of the interpolating unit 183. The interpolating unit 183 is configured so as to include a neighborhood selecting unit 371, horizontal coefficient computing unit 372, vertical coefficient computing unit 373, and sum of products unit 374.

The neighborhood selecting unit 371 obtains a pixel location p of a pixel subjected to nonlinear transforming by the nonlinear transporter 162-4 from the nonlinear transporter 162-4. The neighborhood selecting unit 371 computes a location q on the reduced image corresponding to the pixel location p, as described later with reference to FIG. 20. The neighborhood selecting unit 371 extracts a neighboring pixel which is a pixel within a range of horizontal 4×vertical 4 pixels in the neighborhood of the pixel q. The neighborhood selecting unit 371 outputs the pixel value a[i][j] (where $1 \leq i \leq 4$, $1 \leq j \leq 4$, where i, j are natural numbers) of the neighboring pixel, to the sum of products unit 374. The neighborhood selecting unit 371 computes a position shifting amount dx in the horizontal direction, and a position shifting amount dy in the vertical direction, of the neighboring pixel from the pixel location p. The neighborhood selecting unit 371 outputs the position shifting amount dx in the horizontal direction to the horizontal coefficient computing unit 372, and outputs the position shifting amount dy in the vertical direction to the vertical coefficient computing unit 373.

The horizontal coefficient computing unit 372 computes a cubic interpolating coefficient kx[i] ($1 \leq i \leq 4$, where i is a natural number) in the horizontal direction, based on the position shifting amount dx in the horizontal direction, as described later with reference to FIG. 20. The horizontal coefficient computing unit 372 outputs the interpolating coefficient kx[i] to the sum of products unit 374.

The vertical coefficient computing unit 373 computes a cubic interpolating coefficient ky[j] ($1 \leq j \leq 4$, where j is a natural number) in the vertical direction, based on the position shifting amount dy in the vertical direction, as described later with reference to FIG. 20. The vertical coefficient computing unit 373 outputs the interpolating coefficient ky[j] to the sum of products unit 374.

The sum of products unit 374 computes an overall brightness value Ll(nl)(p) which is a brightness value of an overall brightness image expanded to the original size thereof (number of pixels) by performing cubic interpolation of the reduced image, employing a pixel value a[i][j] of the neighboring pixel, the interpolating coefficient kx[i] in the horizontal direction, and an interpolating coefficient ky[j] in the vertical direction. The sum of products unit 374 outputs the overall, brightness value Ll(nl)(p) to the mapping unit 191-2.

Figure 13:
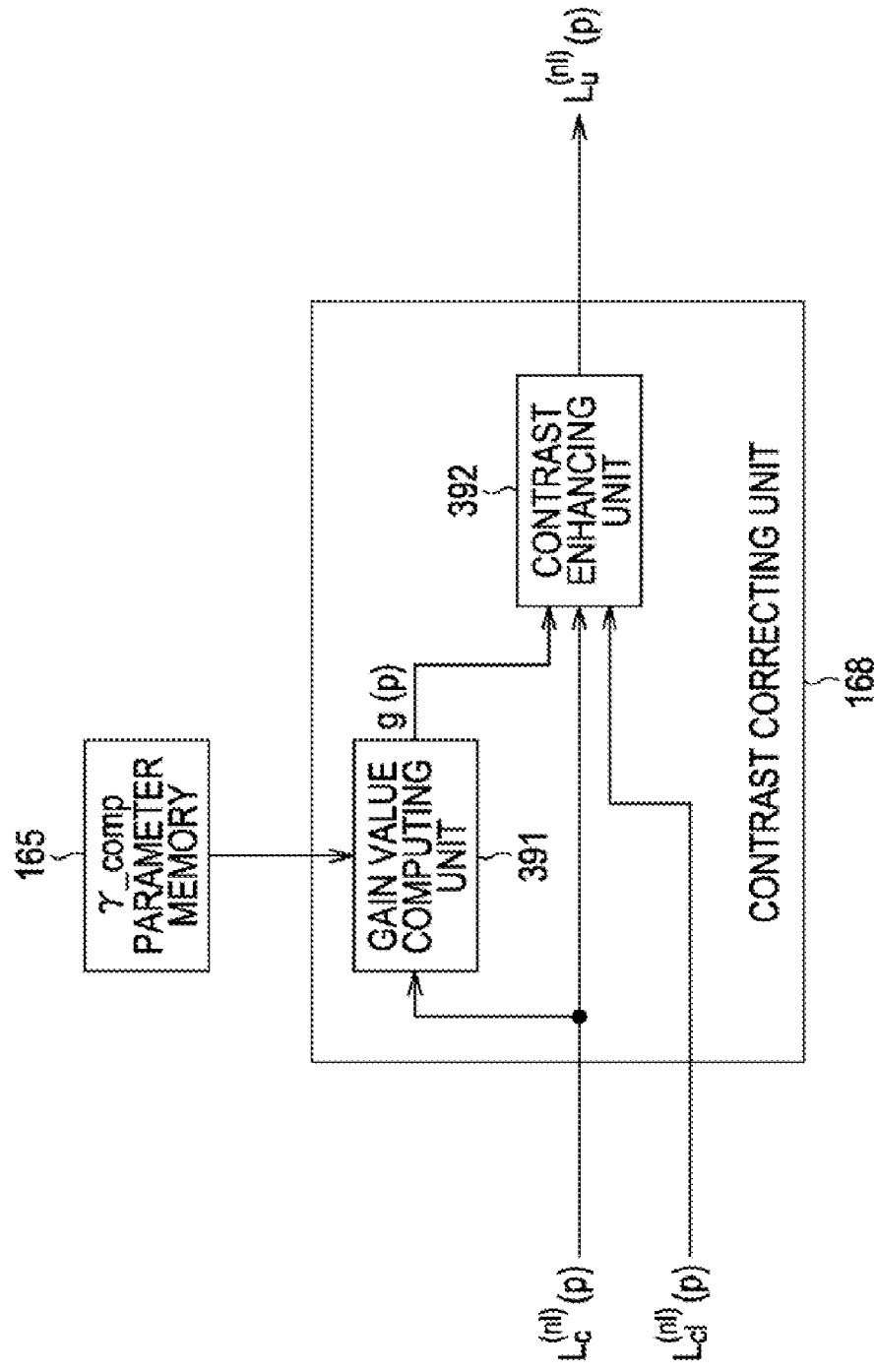
FIG. 13 is a block diagram illustrating a configuration example of a contrast correcting unit function in FIG. 4.

FIG. 13 is a block diagram showing a configuration example of the function of the contrast interpolating unit 168 in FIG. 4. The contrast interpolating unit 168 is configured so as to include a gain value computing unit 391 and contrast enhancing unit 392.

The gain value computing unit 391 obtains the brightness value Ld(nl)(p) from the mapping unit 191-1. The gain value computing unit 391 computes the gain value g(p) employed when performing contrast correction of a brightness value Lc(nl)(p) wherein the gray level is compressed with a tone curve, based on the γ_comp parameter stored in the γ_comp parameter memory 165, as described later with reference to FIG. 22. The gain computing unit 391 outputs the computed gain value g(p) to the contrast enhancing unit 392.

The contrast enhancing unit 392 obtains the brightness value Lc(nl)(p) from the mapping unit 191-1, and obtains the overall brightness value Lcl(nl)(p) from the mapping unit 191-2. The contrast enhancing unit 392 corrects the contrast so as to enhance the contrast of an image made from the brightness value Lc(nl)(p) which is suppressed by compressing the gray level of the brightness value, as described later with reference to FIG. 22. The contrast enhancing unit 392 outputs the brightness value Lu(nl)(p) with corrected contrast to the gray level correcting units 169-1 through 169-3.

Figure 14:
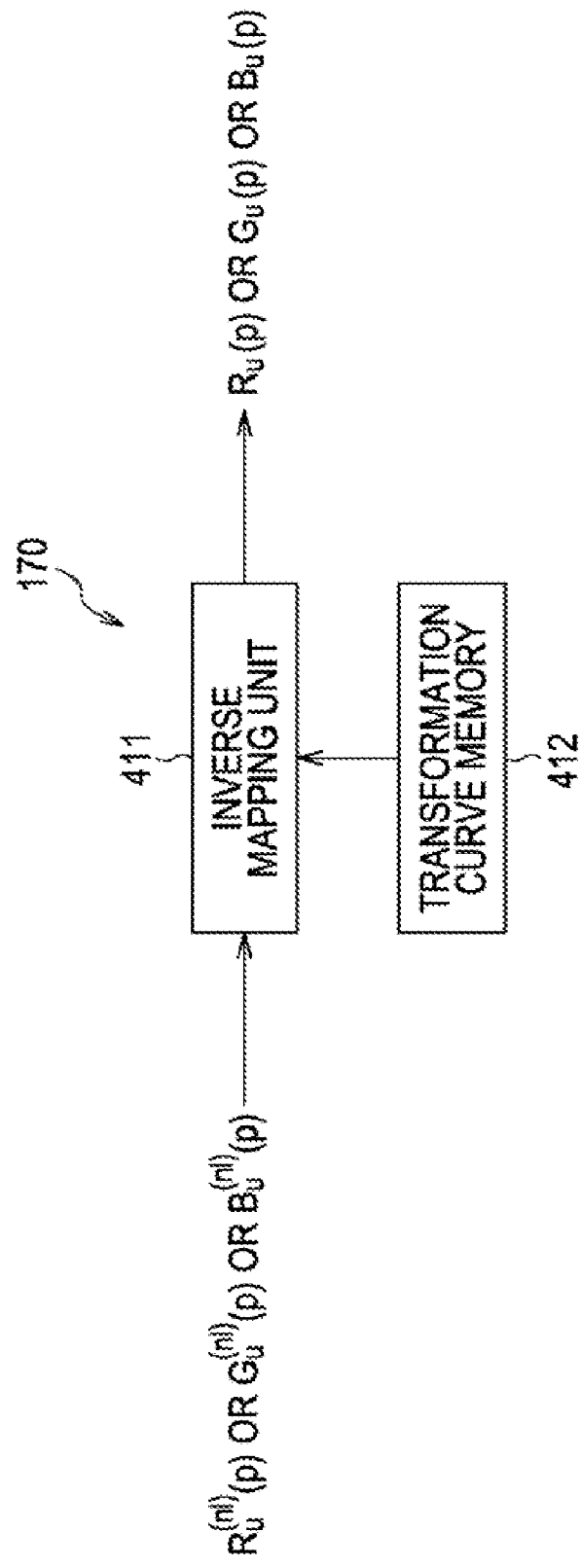
FIG. 14 is a block diagram, illustrating a configuration example of a nonlinear inverse transformer function in FIG. 4.

FIG. 14 is a block diagram showing a configuration example of the function of the nonlinear inverse transformer 170. The nonlinear inverse transformer 170 is configured so as to include an inverse mapping unit 411 and transformation curve memory 412.

The inverse mapping unit 411 performs nonlinear transforming inverse transformation serving as inverse transformation of the nonlinear transforming by the nonlinear transformer 162 as to the pixel value or brightness value input externally, based on the lookup table expressing a transformation curve stored in the transformation curve memory 412. The inverse mapping unit 411 externally outputs the pixel value or brightness value subjected to nonlinear inverse transforming.

Figure 15:
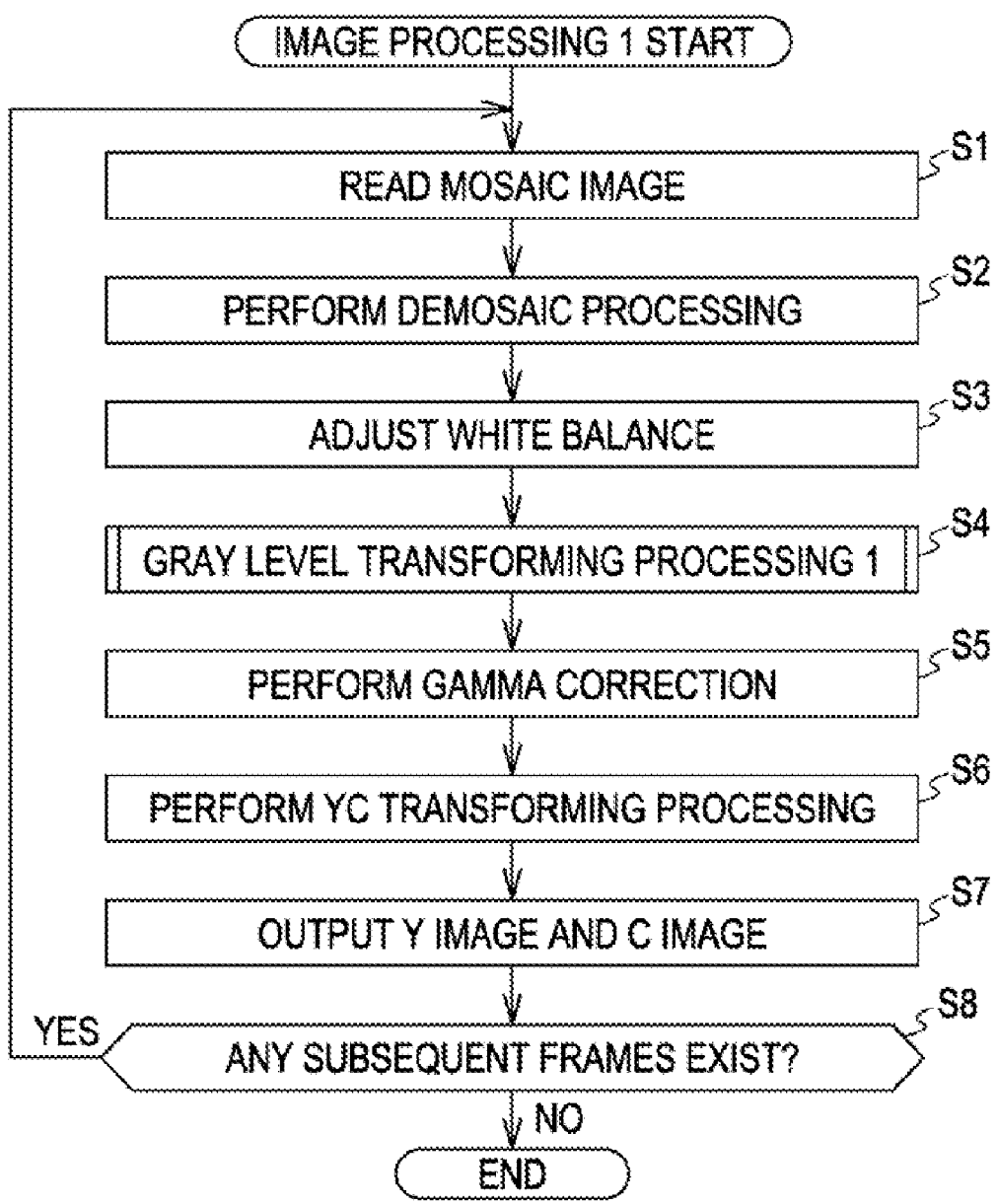
FIG. 15 is a flowchart to describe an image processing 1 which is executed with the DSP block in FIG. 2.

Next, the image processing 1 which is executed by the DSP 116 will be described with reference to the flowchart in FIG. 15. Note that this processing is started, for example, when shooting with a digital video camera 101 is started, and an image data (mosaic image) stream supply is started to the DSP 116 from the A/D converter 115. Note that the image data supplied to the DSP 116 is stored in the unshown internal memory of the next DSP 116.

In step S1, the demosaic unit 141 reads the mosaic image. Specifically, the demosaic unit 141 reads the mosaic image of the first frame stored in the unshown internal memory of the DSP 116.

In step S2, the demosaic unit 141 performs demosaic processing. Specifically, the demosaic unit 141 performs demosaic processing as to the read mosaic image, and generates an RGB image. The demosaic unit 141 supplies the generated RBG image to the white balance unit 142.

In step S3, the white balance unit 142 adjusts the white balance of the obtained RGB image. The white balance unit 142 supplies the RGB image with adjusted white balance to the gray level transformer 143.

In step S4, the gray level transformer 143 performs gray level transforming processing 1. The details of the gray level, transforming processing 1 is described, later with reference to FIGS. 16 and 17, but with this processing, the gray level of the RGB image is transformed, and the RGB image with transformed gray level is supplied to the gamma correcting unit 144.

In step S5, the gamma correcting unit 144 performs gamma correction as to the RGB image. The gamma correcting unit 144 supplies the RBG image subjected to gamma correction to the YC transformer 145.

In step S6, the YC transformer 145 performs YC transforming processing. Specifically, generates a Y-image and C-image from the RBG image, by performing YC matrix processing and restricting the bandwidth as to the chromatic components.

In step S7, the YC transformer 145 outputs the Y-image and C-image. Specifically, the YC transformer 145 outputs a Y-image or C-image to the LCD driver 118 or CODEC 120, as needed.

In step S8, the demosaic unit 141 determines whether there are any following frames. In the case that, a mosaic image is accumulated in the following frame of the unshown internal memory of the DSP 116, the demosaic unit 141 determines that there is a following frame, whereby the processing is returned to step S1.

In step S1, the mosaic image of the next frame is read, and processing is performed for step S2 and thereafter, as to the read mosaic image.

Thereafter, in step S3, the processing in steps S1 through S8 is repeatedly executed until determination is made that there are no following frame, and image processing is performed one frame at a time sequentially as to the mosaic image supplied from the A/D converter 115. In the case determination is made in step S8 that there is no following frame, the image processing is ended.

Next, the gray level transforming processing 1 in step S4 in FIG. 15 will be described in detail with reference to the flowchart in FIGS. 16 and 17.

In step S21, the gray level transformer 143 reads the reduced image, tone curve, and γ_comp from the memory. Specifically, the neighborhood selecting unit 371 (FIG. 12) of the interpolating unit 183 of the gray level transformer 143 reads the reduced image generated in the gray level transforming processing in the previous frame from the reduced image memory 182. The mapping units 131-1 and 191-2 read the lookup table expressing the tone curve computed with the gray level transforming processing in the previous frame from the tone curve memory 164. The gain value computing unit 391 (FIG. 13) of the contrast correcting unit 168 reads the γ_comp parameter computed with the gray level transforming processing in the previous frame from the γ_comp parameter memory 165.

In step S22, the tone curve computing unit 163 reads the noiseLevel and saturationLevel. Specifically, the saturated pixel excluding unit 242 (FIG. 7) of the brightness region computing unit 221 of the tone curve computing unit 163 and the saturated pixel excluding unit 281 (FIG. 8) of the average level computing unit 222 read the noiseLevel(nl) and saturationLevel(nl) from the unshown internal memory of the DSP 116.

In step S23, the gray level transformer 143 reads the RBG value of the pixel to be subjected to gray level transforming next. Specifically, the brightness computing unit 161 of the gray level transformer 143 and the nonlinear transformers 162-1 through 162-3 read the pixel value Rw(p), Gw(p), and Bw(p) of the pixel location p to be subjected to gray level transforming next from the unshown internal memory of the DSP 116.

In step S24, the brightness computing unit 161 computes the brightness value. Specifically, the brightness computing unit 161 computes the brightness value L(p) corresponding to the pixel location p with the Expression (1) below, for example.

$$L(p) = \frac{c_R \cdot R_w(p) + c_G \cdot G_w(p) + c_B \cdot B_w(p)}{c_R + c_G + c_B} \qquad (1)$$

Note that the coefficients cR, cG, cB in Expression (1) are coefficients for balancing the R, G, B components, and for example, have a value combination such as (cR, cR, cB)=(0.3, 0.6, 0.1) or (0.25, 0.5, 0.25).

Also, a method for computing the brightness value L(p) is not limited to the above-described method, but may be a value other than a linear sum of the R, G, B components, as in the Expression (2) below, for example.

$$L(p)=\max(Rw(p), Gw(p), Bw(p)) \qquad (2)$$

The brightness computing unit 161 outputs the computed brightness value L(p) to the nonlinear transformer 162-4.

In step S25, the nonlinear transformer 162-4 subjects the brightness value to nonlinear transforming. Specifically, the mapping unit 201 (FIG. 5) of the nonlinear transformer 162-4 reads a lookup table expressing the transformation curve from the transformation curve memory 202, and subjects the brightness value L(p) to nonlinear transformation (e.g. logarithmic conversion or gamma transforming), based on the lookup table.

Note that the nonlinear transforming processing in step S25 does not necessarily have to be performed, but in the case that the brightness value before nonlinear transforming is on the horizontal axis and the brightness value after nonlinear transforming is on the vertical axis, nonlinear transforming is performed employing a transformation curve to monotonically increase in a stairstep manner, whereby the shape of a brightness value histogram can be prevented from skewing dramatically to the dark brightness side or the bright brightness side, and the histogram can be readily analyzed. For example, the transformation curve employed for nonlinear transforming is an exponential curve often employed for gamma correction (where the exponent is a value smaller than 1), a logarithmic curve, or a curve expressed with an exponential function or a function based on a logarithm.

The mapping unit 201 outputs the brightness value L(nl)(p) subjected to nonlinear transforming to the tone curve computing unit 163, reduced image generating unit 181, mapping unit 191-1, and gray level correcting units 169-1 through 169-3.

In step S26, the tone curve computing unit 163 performs pixel processing for tone curve computing. The details of the pixel, processing for tone curve computing will be described later with reference to FIG. 18, but with this processing, the brightness value L(nl)(p) for computing the tone curve is sorted and the brightness total value of the entire image is computed.

In step S27, the reduced image generating unit 181 performs the pixel processing for reduced image generating. The details of the pixel processing for reduced image generating will be described later with reference to FIG. 19, but with this processing, calculations are performed for the brightness total value of the brightness value L(nl)(p) for each block, in order to generate the reduced image.

In step 328, the interpolating unit 183 performs overall brightness value computing processing. The details of the overall brightness value computing processing will be described later with reference to FIG. 20, but with this processing, the overall brightness value Ll(nl)(p) corresponding to the pixel location p is computed, In step S29, the gray level transformer 143 applies the tone curve for the brightness value and overall brightness value subjected to nonlinear transforming. Specifically, the mapping unit 191-1 of the gray level transformer 143 transforms the brightness value L(nl)(p) to the brightness value Lc(nl)(p), based on the tone curve computed with the gray level transforming processing in the previous frame, whereby the gray level of the brightness value L(nl)(p) is compressed. The mapping unit 191-1 outputs the brightness value Lc(nl)(p) to the contrast correcting unit 168. Also, the mapping unit 191-2 transforms the overall brightness value Ll(nl)(p) to the overall brightness value Lcl(nl)(p), based on the tone curve computed with the gray level transforming processing in the previous frame, whereby the gray level of the overall brightness value Ll(nl)(p) is compressed. The mapping unit 191-2 supplies the overall brightness value Lcl(nl)(p) to the contrast correcting unit 168.

In step 330, the contrast correcting unit 168 performs contrast correcting processing. The details of the contrast correcting processing is described later with reference to FIG. 22, but with this processing, the contrast of the image made up of the brightness value Lc(nl)(p) is corrected.

In step 831, the nonlinear transformers 162-1 through 162-3 subject the RBG values respectively to nonlinear transforming. Specifically, the mapping unit 201 (FIG. 5) of the nonlinear transformers 162-1 through 162-3 each read a lookup table expressing a transformation curve from the transformation curve memory 202, and subject the pixel values Rw(p), Gw(p), or Bw(p) read in step S23 to nonlinear transforming based on the lookup table. The mapping unit 201 of the nonlinear transformers 162-1 through 162-3 respectively outputs the pixel values R(nl)(p), G(nl)(p), or R(nl)(p) subjected to nonlinear transforming to the gray level correcting units 169-1 through 169-3.

Note that the lookup table employed by the nonlinear transformers 162-1 through 162-3 is the same as the lookup table employed by the nonlinear transformer unit 162-4 in step S25. That is to say, the pixel values Ew(p), Gw(p), and Bw(p) are subjected to linear transforming similar to that, of the brightness value L(p).

In step s32, the gray level correcting units 169-1 through 169-3 perform gray level correction for the RGB values subjected to nonlinear transforming. Specifically, the gray level correcting units 169-1 through 169-3 compute the pixel values Ru(nl)(p), Gu(nl)(p), or Bu(nl)(p) subjected to gray level correction from the pixel values R(nl)Cp), G(nl)(p), or B(nl)(p) with the Expressions (3) through (5) below.

$$Ru(nl)(p)=\text{chromagain} \cdot (R(nl)(p)-L(nl)(p))+Lu(nl)(p) \quad (3)$$

$$Gu(nl)(p)=\text{chromagain} \cdot (G(nl)(p)-L(nl)(p))+Lu(nl)(p) \quad (4)$$

$$Bu(nl)(p)=\text{chromagain} \cdot (B(nl)(p)-L(nl)(p))+Lu(nl)(p) \quad (5)$$

Note that chromagain is a coefficient of a predetermined value for adjusting the chroma of each R, G, B component.

That is to say, the pixel values Ru(nl)(p), Ga(nl)(p), or Bu(nl)(p) are pixel values of an image, obtained by chromagain being multiplied by the pixels values of a difference image which is the difference between an image made up of pixel values R(nl)(p), G(nl)(p), or B(nl)(p) and an image made up of the brightness value L(nl)(p) before gray level transforming, and further, the image made up of the brightness value Lu(nl)(p) after contrast correcting being added thereto. Thus, the brightness value after gray level transforming is reflected in the RGB values subjected to nonlinear transforming.

The gray level correcting units 169-1 through 169-3 supply the pixel values Ru(nl)(p), Gn(nl)(p), or Bu(nl)(p) subjected to gray level correction to the nonlinear inverse transformers 170-1 through 179-3, respectively.

In step S33, the nonlinear inverse transformers 170-1 through 170-3 subject the RGB values which are subjected to gray level correction, to nonlinear inverse transforming. Specifically, the inverse mapping unit 411 (FIG. 14) of the nonlinear inverse transformers 170-1 through 170-3 each read a lookup table expressing a transformation curve from the transformation curve memory 412, and based on the lookup tables, perform nonlinear inverse transforming as to the pixel values Eu(nl)(p), Gu(nl)(p), or Bu(nl)(p) serving as inverse transforming of the nonlinear transforming in step S31.

In step S34, the nonlinear inverse transformers 170-1 through 170-3 output the RBG values subjected to nonlinear inverse transforming. Specifically, the inverse mapping unit 411 of the nonlinear inverse transformers 170-1 through 170-3 outputs the pixel values Eu(p), Gn(p), or Bu(p) subjected to nonlinear inverse transforming, respectively, to the gamma correcting unit 144.

In step S35, the gray level transformer 143 determines whether or not all of the pixels within a frame are processed. In the case determination is made that not all pixels within the frame have been processed, the flow is returned to step S23, and the processing in steps S23 through S35 is repeatedly executed until determination is made in step S35 that ail of the pixels within the frame are processed. That is to say, all of the pixels within the frame currently being processed are subjected to gray level transforming one pixel at a time sequentially (e.g. in raster scan order).

In step 335, in the case determination is made that all pixels within the frame are processed, the flow is advanced to step S36.

In step S36, the tone curve computing unit 163 performs processing to compute the tone curve and v_comp. The details of the tone curve and v_comp computing processing will be described later with reference to FIG. 24, but with this processing, the tone curve and v_comp parameter with the frame subjected to gray level transforming this time are computed.

In step S37, the reduced image generating unit 181 performs reduced image generating processing, whereby the gray level transforming processing is ended. The details of the reduced image generating processing will be described later with reference to FIG. 26, but with this processing, the reduced image is generated.

Figure 18:
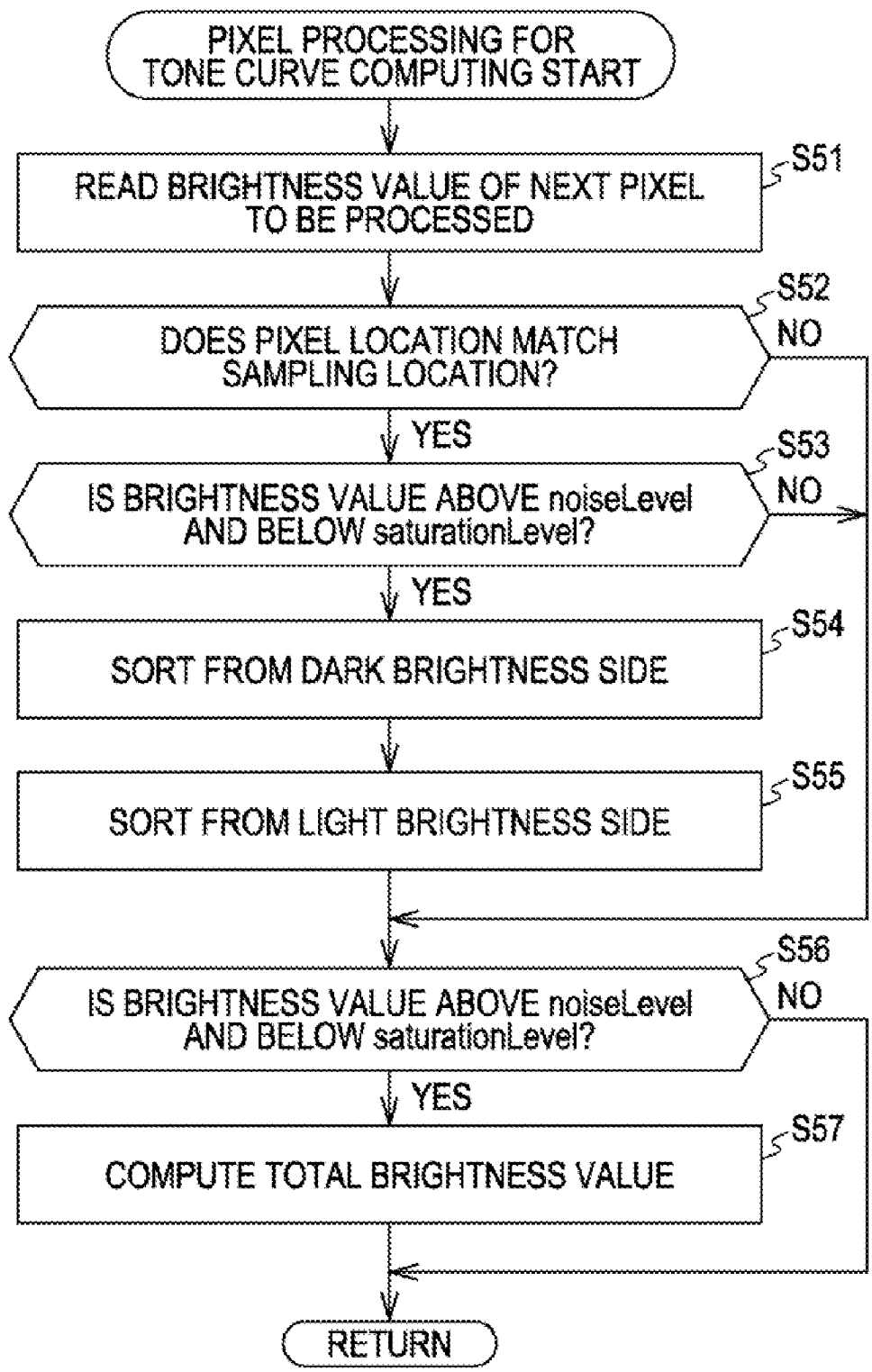
FIG. 18 is a flowchart to describe in detail the pixel processing for tone curve computing in step S26 of FIG. 16.

Next, the details of the pixel processing for tone curve computing in step S26 in FIG. 16 will be described with reference to the flowchart in FIG. 18.

In step S51, the tone curve computing unit 163 reads the brightness value of the pixel to be processed next. Specifically, the thinning unit 241 (FIG. 7) of the brightness region computing unit 221 of the tone curve computing unit 163 and the saturated pixel excluding unit 281 of the average level computing unit 222 of the tone curve computing unit 163 read the pixel brightness value L(nl)(p) of the pixel location p subjected to nonlinear transforming in step S25 in FIG. 16 described above from the nonlinear transforming unit 162-4.

In step S52, the thinning unit 241 determines whether or not the pixel location matches the sampling location. Specifically, in the case determination is made that the pixel location of the read brightness value L(nl)(p) matches the sampling location P provided every predetermined interval, the thinning unit 241 outputs the brightness value L(nl)(p) to the saturated pixel excluding unit 242.

In step S53, the saturated pixel excluding unit 242 determines whether or not the brightness value is above the noiseLevel and at or below the saturationLevel. In the case determination is made that the brightness value L(nl)(p) is above a predetermined noiseLevel(nl) and at or below the saturationLevel(nl), the saturated, pixel excluding unit 242 outputs the brightness value L(nl)(p) to the sorting unit 243 and sorting unit 244, and the flow is advanced to step 354.

In step S54, the sorting unit 243 performs dark brightness side sorting. Specifically, the comparison unit 251-1 of the sorting unit 243 compares the value stored in the register 252-1 with the brightness value L(nl)(p), and in the case that the brightness value L(nl)(p) is smaller than the register 252-1 value, the value stored in the register 252-1 is output in the comparison unit 251-2 downstream, and the brightness value L(nl)(p) is stored in the register 252-1. On the other hand, in the case the brightness value L(nl)(p) is at or greater than the register 252-1 value, the comparison unit 251-1 outputs the brightness value L(nl)(p) as it is to the comparison unit 251-2 downstream. The following comparison units 251-2 through 251-$k$ perform like processing. Consequently, of the brightness values L(nl)(p) of the pixels of the sampling location within the frame, the values from the smallest brightness value L(nl)(p) to the k'th from the smallest brightness value L(nl)(p) are ultimately stored in ascending order in the registers 252-1 through 252-$k$.

In step S55, the sorting unit 243 performs bright brightness side sorting. Specifically, the comparison unit 261-1 of the sorting unit 244 compares the value stored in the register 262-1 with the brightness value L(nl)(p), and in the case that, the brightness value L(nl)(p) is greater than the register 262-1 value, the value stored in the register 262-1 is output in the comparison unit 261-2 downstream, and the brightness value L(nl)(p) is stored in the register 262-1. On the other hand, in the case the brightness value L(nl)(p) is at or smaller than the register 252-1 value, the comparison unit 261-1 outputs the brightness value L(nl)(p) as is to the comparison unit 261-2 downstream. The following comparison units 261-2 through 261-$k$ perform like processing. Consequently, of the brightness values L(nl)(p) of the pixels of the sampling location within the frame, the values from the greatest brightness value L(nl)(p) to the k'th from the greatest brightness value L(nl)(p) are ultimately stored in descending order in the registers 262-1 through 262-$k$, In step S53, in the case determination is made that the brightness value L(nl)(p) is below the noiseLevel(nl) or exceeds the saturationLevel(nl), the processing in steps 354 and step S55, and the flow is advanced to step S56. That is to say, a brightness value L(nl)(p) below the noiseLevel(nl) or exceeding the saturationLevel(nl) is excluded from being subjected to dark brightness side sorting and bright brightness side sorting.

In step S52, in the case that determination is made that the pixel location does not match the sampling location, the processing in steps S53 through S55 is skipped, and the flow is advanced to step S56. Thus, the number of pixels subjected to dark brightness side sorting and bright brightness side sorting is limited.

In step S56, the saturated pixel excluding unit 281 (FIG. 8) of the average level computing unit 222 determines whether or not the brightness value is above the noiseLevel and at or below saturationLevel, similar to the processing by the saturated pixel excluding unit 242 of the brightness region computing unit 221 in step S53. In the case determination is made that, the brightness value L(nl)(p) is above the noiseLevel and at or below saturationLevel, the saturated pixel excluding unit 231 outputs the brightness value L(nl)(p) to the adding unit 291 and counter 293 of the average value computing unit 282, and the flow is advanced to step S57.

In step S57, the average level computing unit 222 computes the brightness total value, and the pixel processing for computing the tone curve is ended. Specifically, the adding unit 291 reads the brightness total value which is the total value of the brightness values stored in the register 292 up to this point, and adds the input brightness value L(nl)(p) thereto. The adding unit 291 stores the computed values in the register 292. Also, the counter 293 increments the counter value by 1. That is to say, the counter value of the counter 293 indicates the number of pixels wherein the brightness value L(nl)(p) is added to the brightness total value up to this point.

In step S56, in the case determination is made that the brightness value L(nl)(p) is below the noiseLevel(nl) or exceeds the saturationLevel(nl), the processing in step S57 is skipped, and the pixel processing for computing the tone curve is ended. That is to say, a brightness value L(nl)(p) below the noiseLevel(nl) or exceeding the saturationLevel(nl) is excluded from being subjected to brightness average value computing.

Figure 19:
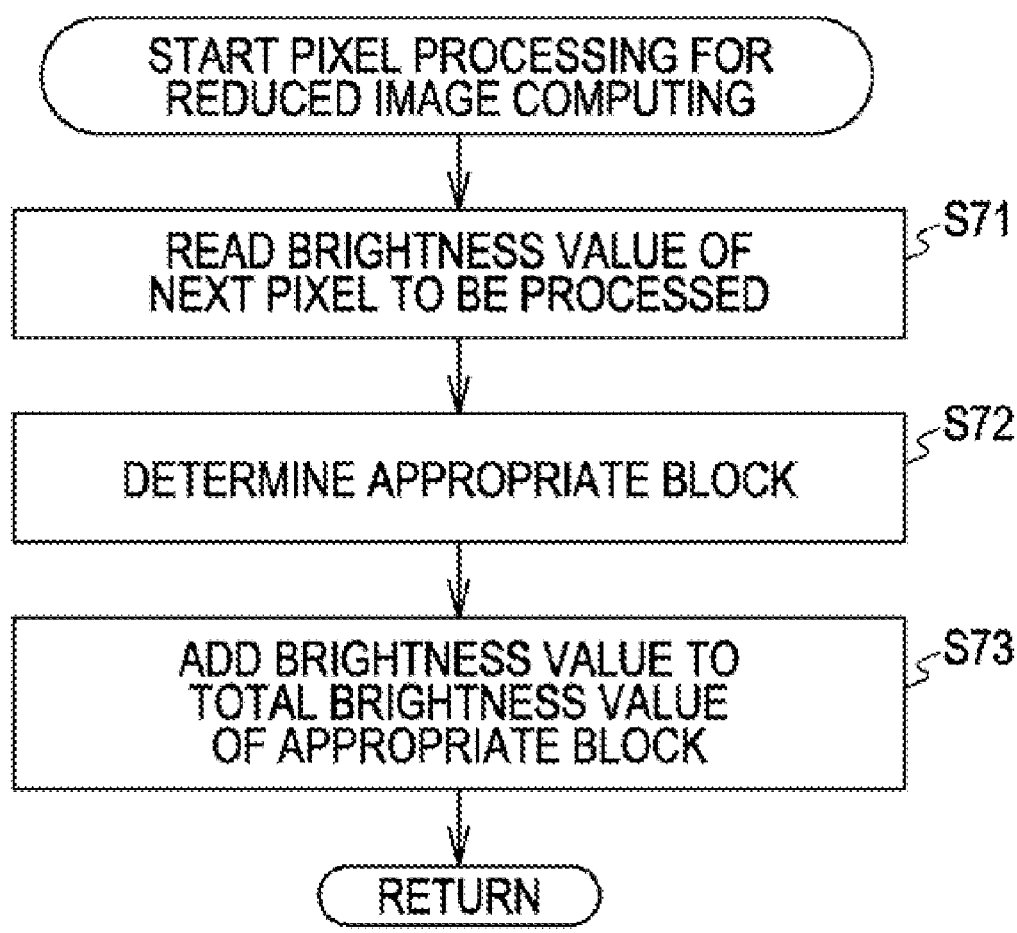
FIG. 19 is a flowchart to describe in detail the pixel processing for reduced image generating in step S27 of FIG. 16.

Next, the pixel processing for reduced image generating in step S27 in FIG. 16 will be described in detail with reference to the flowchart in FIG. 19.

In step S71, the sorting unit 351 (FIG. 11) of the reduced image generating unit 181 reads the brightness value of the pixel to be processed next. Specifically, the sorting unit 351 reads the brightness value L(nl)(p) of the pixel at the pixel location p subjected to nonlinear transforming in step 325 in FIG. 16 described above from the nonlinear transformer 162-4.

In step S72, the sorting unit 351 determines the appropriate blocks. Specifically, the sorting unit 351 determines in which predetermined block, wherein the image is divided into horizontal wr×vertical hr blocks, the pixel location p is included.

In step 373, the average value computing unit 352 adds the brightness value to the brightness total value of the appropriate block, and the pixel processing for reduced image generating is ended. Specifically, the sorting unit 351 outputs the brightness value L(nl)(p) to the average value computing unit 352 which computes the average value of the brightness values of the blocks which include the pixel location p. The average value computing unit 352 adds the brightness value L(nl)(p) to the brightness total value which is the total of the brightness values of the subject blocks.

Figure 16:
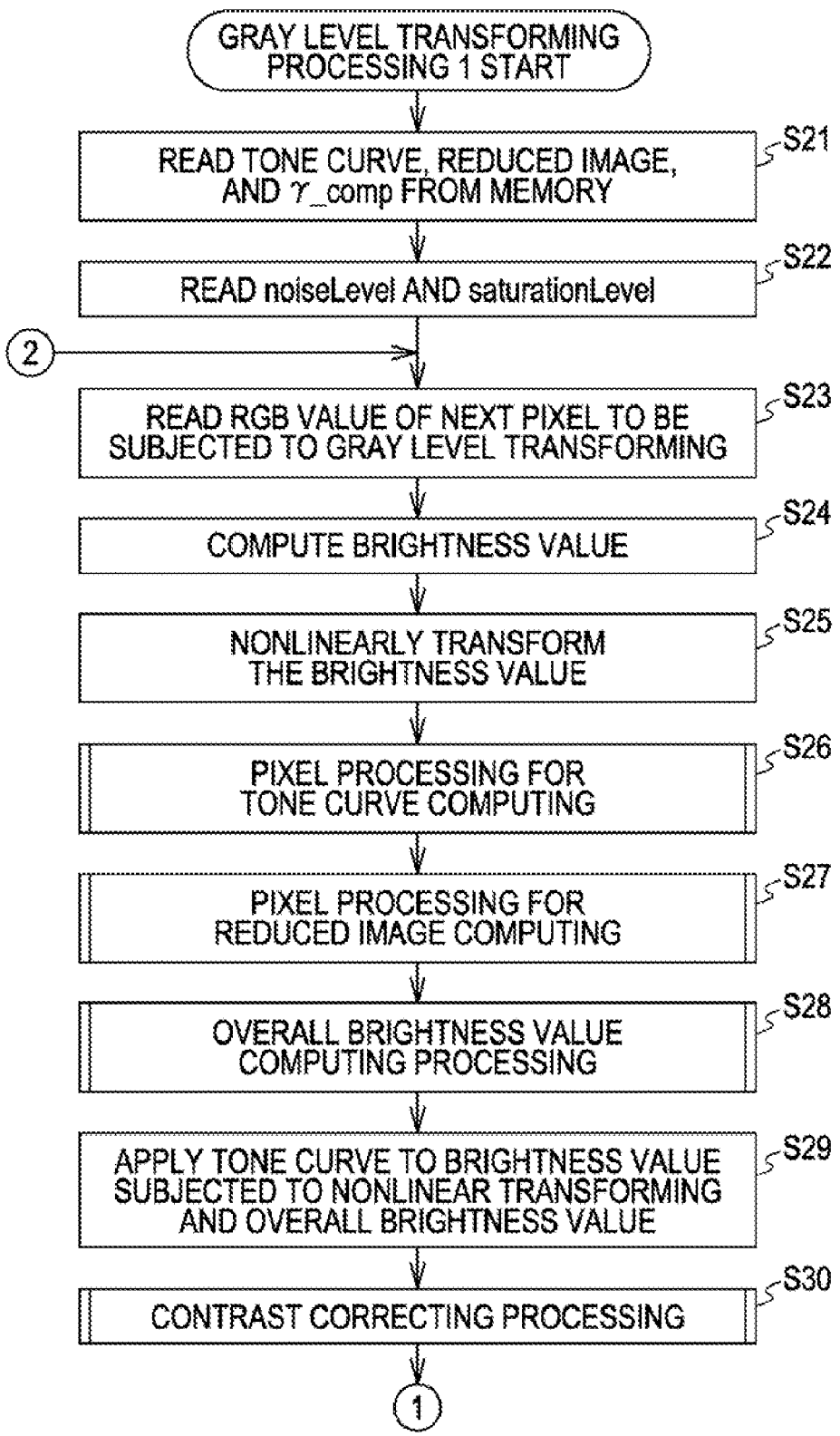
FIG. 16 is a flowchart to describe in detail a gray level transforming processing 1 in step 34 in FIG. 15.

Next, the overall brightness computing processing in step 326 in FIG. 16 is described next with reference to the flowchart in FIG. 20.

In step S91, the neighborhood selecting unit 371 (FIG. 12) of the interpolating unit 183 reads the pixel location of the pixel to be processed next. Specifically, the neighborhood selecting unit 371 reads the pixel location p of the pixel to be processed next from the nonlinear transformer 162-4.

In step S92, the neighborhood selecting unit 371 computes the position shifting amount of the neighboring pixel on the reduced image corresponding to the pixel to be processed next. Specifically, the neighborhood selecting unit 371 in the case that the number of pixels of the mosaic image is horizontal wm×vertical hm, and the number of pixels of the reduced image is horizontal wr×vertical hr, computes the position q=(qx,qy) on the reduced image corresponding to the pixel location p=(px,py) with the Expressions (6) through (8) below.

$$bx=wm/wr \qquad (6)$$

$$by=hm/hr \qquad (7)$$

$$q=(qx,qy)=(px/bx-0.5, py/by-0.5) \qquad (8)$$

Figure 21:
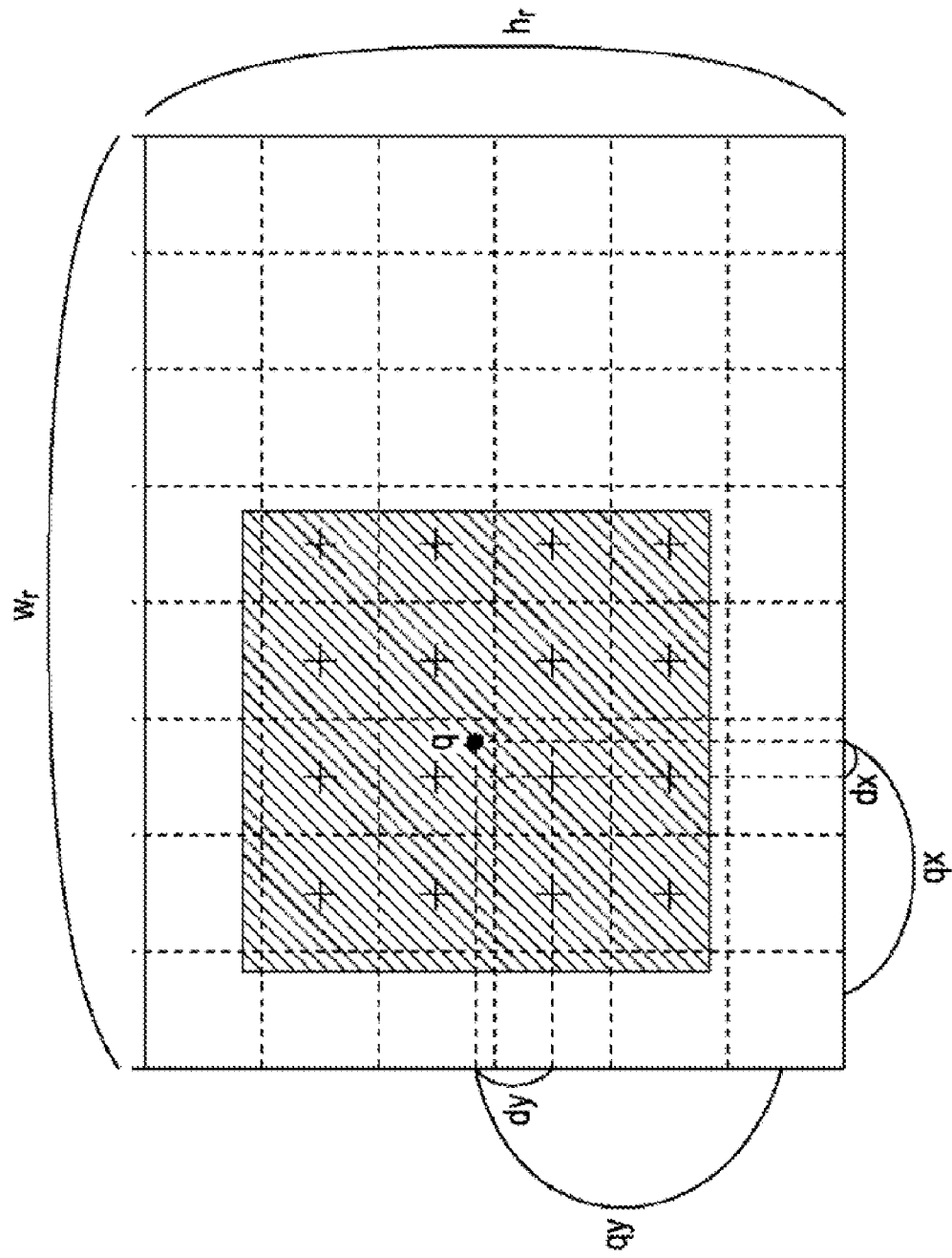
FIG. 21 is a diagram to describe processing of the Interpolating unit of FIG. 4.

Also, the neighborhood selecting unit 371 extracts neighboring pixels which are pixels within the range of four horizontal x four vertical pixels in the neighborhood of the location q. For example, in the case of the example shown in FIG. 21, pixels shown with a "+" mark positioned within the range qx−2<x<qx+2, qy−2<y<qy+2, which are indicated with diagonal lines in FIG. 21, are extracted as the neighboring pixels.

Further, the neighborhood selecting unit 371 computes a difference of a position shifting amount dx in the horizontal direction, and a position shifting amount dy in the vertical direction, of the neighboring pixel from the pixel location p in the reduced image as the difference between the location q and the pixel closest in the lower left direction to the location q. That is to say, the position shifting amount (dx, dy)= (fractional portion of qx, fractional portion of qy).

The neighborhood selecting unit 371 outputs the position shifting amount dx in the horizontal direction to the horizontal coefficient computing unit 372, outputs the position shifting amount dy in the vertical direction to the vertical coefficient computing unit 373, and outputs the pixel value a [i][j] (where 1≦i≦4, 1≦j≦4, where i, j are natural numbers) of the neighboring pixels to the sum of products unit 374.

In step S93, the horizontal coefficient computing unit 372 computes a cubic interpolating coefficient in the horizontal direction. Specifically, the horizontal coefficient computing unit 372 computes the cubic interpolating coefficient kx[i] (where 1≦i≦4, where i is a natural number) in the horizontal direction, based on the position shifting amount dx in the horizontal direction, with the Expressions (9) and (10) below.

$$z = |dx - i + 2| \quad (9)$$

$$k_x[i] = \begin{cases} (3z^3 - 6z^2 + 4)/6 & (z < 1) \\ (-z^3 + 6z^2 - 12z + 8)/6 & (1 <= z < 2) \\ 0 & \text{Other} \end{cases} \quad (10)$$

The horizontal coefficient computing unit 372 outputs the computed interpolating coefficient kx[i] to the sum of products unit 374.

In step S94, the vertical coefficient computing unit 383 computes a cubic interpolating coefficient in the vertical direction. Specifically, the vertical coefficient computing unit 373 computes the cubic interpolating coefficient ky[j] (where 1≦j≦4, where j is a natural number) in the vertical direction, based on the position shifting amount dy in the vertical direction, with the Expressions (11) and (12) below.

$$z = |dx - j + 2| \quad (11)$$

$$k_y[j] = \begin{cases} (3z^3 - 6z^2 + 4)/6 & (z < 1) \\ (-z^3 + 6z^2 - 12z + 8)/6 & (1 <= z < 2) \\ 0 & \text{Other} \end{cases} \quad (12)$$

The vertical coefficient computing unit 373 outputs the computed interpolating coefficient ky[j] to the sum of products unit 374.

Note that the Expressions (9) through (12) described above are examples of expressions used frequently for cubic interpolation, and the interpolation coefficients kx[i] and ky[j] may be computed based on other calculation expression within a range whereby sufficiently smooth interpolation can be obtained.

In step S95, the sum of products unit 374 computes the overall brightness value. Specifically, the sum of products 374 computes the overall brightness value Ll(nl)(p) of the pixel location P by performing sum-of-products calculations with the Expression (13) below as to the pixel value a[i][j] of the neighboring pixels, the interpolating coefficient kx[i] in the horizontal direction, and the interpolating coefficient ky[j] in the vertical direction.

$$L_l^{(nl)}(p) = \sum_{i=1}^{4} \sum_{j=1}^{4} a[i][j] \cdot k_x[i] \cdot k_y[j] \quad (13)$$

In step S96, the sum of products unit 374 outputs the overall brightness value Ll(nl)(p) to the mapping unit 191-2, and the overall brightness computing processing is ended.

Note that the overall brightness image made up of the overall brightness value Ll(nl)(p) is an image wherein the reduced image with horizontal wr×vertical hr pixels is expanded to the original size (number of pixels) by the cubic interpolation, and is an image extracting only the components of extremely low frequency region of the original image (the image made up of the brightness value L(nl)(p)).

Next, the contrast correcting processing in step S30 in FIG. 16 will be described with reference to the flowchart in FIG. 22.

In step S111, the contrast correcting unit 163 reads the brightness value and the overall brightness value with the gray level compressed of the pixel to be processed next. Specifically, the gain value computing unit 391 and contrast enhancing unit 392 (FIG. 13) of the contrast correcting unit 168 read the brightness value Lc(nl)(p), wherein the gray value is compressed by the tone curve in step S29 in FIG. 16 described above, from the mapping unit 191-1. Also, the contrast enhancing unit 392 reads the overall brightness value Lcl(nl)(p) wherein the gray value is compressed by the tone curve in step S29 in FIG. 16 described above, from the mapping unit 191-2.

In step S112, the gain value computing unit 391 computes the gain value, based on the brightness value with gray level compressed and the γ_comp parameter. Specifically, the gain value computing unit 391 computes the gain value g(p) with the Expressions (14) and (15) below, based on the brightness value Lc(nl)(p) wherein the gray level is compressed with the tone curve and the γ_comp parameter.

$$k(p) = \begin{cases} 1 & L_c^{(nl)}(p) > L_{max}^{(nl)} \\ \dfrac{L_c^{(nl)}(p) - L_{mid}^{(nl)}}{L_{max}^{(nl)} - L_{mid}^{(nl)}} & L_{mid}^{(nl)} \le L_c^{(nl)}(p) \le L_{max}^{(nl)} \\ \dfrac{L_c^{(nl)}(p) - L_{mid}^{(nl)}}{L_{min}^{(nl)} - L_{mid}^{(nl)}} & L_{min}^{(nl)} \le L_c^{(nl)}(p) < L_{mid}^{(nl)} \\ 1 & L_c^{(nl)}(p) < L_{min}^{(nl)} \end{cases} \quad (14)$$

$$g(p) = \left(\dfrac{contrastGain}{\gamma_{comp}} - 1\right) \cdot (1 - k(p)) \quad (15)$$

Note that the contrastGain in Expression (15) is a constant determined, beforehand.

The gain value computing unit 391 outputs the computed gain value g(p) to the contrast enhancing unit 392.

In step S113, the contrast enhancing unit 392 computes the brightness value and the overall brightness value with gray level compressed, and the brightness value with contrast corrected employing the gain value. Specifically, the contrast enhancing unit 392 computes the brightness value Lu(nl)(p) with contrast corrected, employing the brightness value Lc(nl)(p) and the overall brightness value Lcl(nl)(p) with gray level compressed, and the gain value g(p), with the Expression (16) below.

$$Lu(nl)(p) = g(p) \cdot (Lc(nl)(p) - Lcl(nl)(p)) + Lc(nl)(p) \quad (16)$$

Note that the image made up of the brightness value (Lc (nl)(p)−Lcl(nl)p)) is an image wherein the overall brightness image made up of extremely low frequent region components of an image made up of the brightness value Lc(nl)(p) is subtracted from an image made up of the brightness value Lc(nl)(p). Accordingly, the image made up of the brightness value Lu(nl)(p) becomes an image wherein the frequency components excluding the extremely low frequency region of an image made up of the brightness value Lc(nl)(p) is enhanced with the gain value g(p).

Also, the image wherein the gray level of the brightness value is compressed with the tone curve (an image made up of the brightness value Lc(nl)(p)) has suppressed contrast as compared with the original image (an image made up of the brightness value L(nl)(p)). Also, the degree to which the contrast is suppressed depends on the slope of the tone curve, and the degree of suppression is greater as the tone curve slope becomes gentler. Accordingly, in accordance with the inverse of the tone curve slope, if the contrast of the image wherein the gray level is compressed is corrected so as to foe enhanced, a contrast close to the image before gray level compression can be obtained. However, in the case the similar correction is performed for the pixel with the brightness value Lc(nl)(p) near the noiseLevel(nl) or saturationLevel(nl), clipping may occur wherein the brightness value after correction is below the noiseLevel(nl), or exceeds the saturationLevel (nl), whereby the image details are lost instead.

Figure 23:
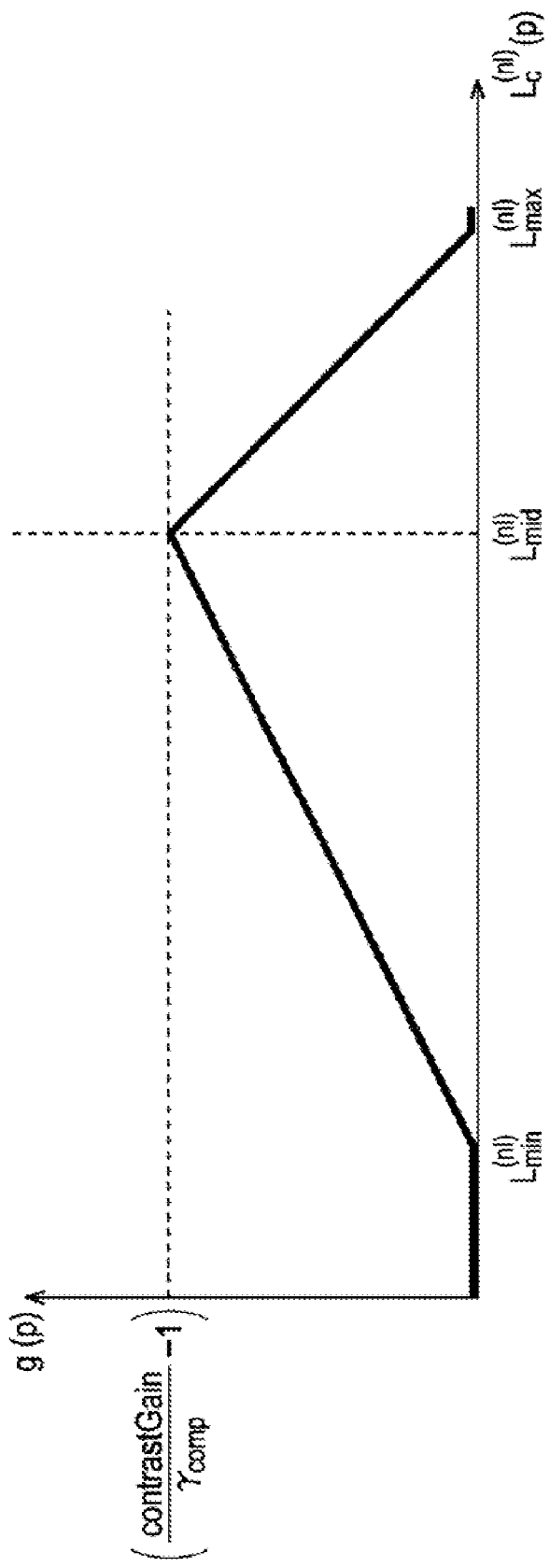
FIG. 23 is a graph showing the relation between the gain value g(p) and brightness value Lc(nl)(p)

FIG. 23 is a graph expressing the relation between the brightness value Lc(nl)(p) and the gain value g(p) computed with the Expressions (14) and (15). When the brightness value Lc(nl)(p) becomes a predetermined intermediate brightness level Lmid(nl), which is roughly in the center of a range which the brightness value Lc(nl)(p) can take, the gain value g(p) is greatest, and as the brightness value Lc(nl)(p) nears the minimum value Lmin(nl) or maximum value Lmax (nl) within a range which the brightness value lc(nl)(p) can take, the gain value g(p) deteriorates linearly, and with as range wherein the brightness value Lc(nl)(p) is less than the minimum value Lmin(nl) and exceeds the maximum value Lmax(nl), the gain value g(p) becomes 0, Accordingly, the contrast of the brightness components near the intermediate brightness level Lmid(nl) is enhanced as compared to the contrast of the brightness components near the minimum value Lmin(nl) or maximum value Lmax(nl). To state more specifically, the brightness components nearer the intermediate brightness level Lmid(nl) have the contrast thereof enhanced, and the brightness components near the minimum value Lmin(nl) or maximum value Lmax(nl) have virtually no contrast enhancing.

In step S114, the contrast enhancing unit 392 outputs the brightness value with contrast corrected, and the contrast correcting processing is ended. Specifically, the contrast enhancing unit 392 outputs the brightness value Lu(nl)(p) with contrast corrected to the gray level correcting unit 169-1 through 169-3.

Thus, with the contrast correcting unit 168, contrast is enhanced of components from a low-to-mid frequency range to a high frequency range, excluding the extremely low frequency range, of an image made up of the brightness value Lc(nl)(p). Accordingly, an image can be obtained with enhanced contrast which appears natural to the eye, without local overshooting of the edge portions which become apparent when contrast is enhanced only for the high frequency region components.

Also, the contrast is enhanced more as the brightness components near the intermediate brightness level Lmid(nl), and virtually no contrast correction is performed for the brightness components nearer the minimum value Lmin(nl) or the maximum value Lmax(nl), whereby a white-out or black-out rarely occurs in an image.

Next, the tone curve and γ_comp computing processing of step S36 in FIG. 17 will be described with reference to the flowchart in FIG. 24.

In step S131, the brightness region computing unit 221 (FIG. 6) of the tone curve computing unit 163 finds the dark/bright brightness side base values from the results of the dark/bright side sorting. Specifically, the sorting unit 243 (FIG. 7) of the brightness region computing unit 221 sets the brightness value stored in the register 252-$k$ to the base value Ldark(nl) of the dark brightness side. Also, the sorting unit 244 of the brightness region computing unit 221 sets the brightness value stored in the register 262-$k$ as the base value Lbrightn(nl) of the bright brightness side.

For example, in the case that the number of pixels to be sampled by the thinning unit 241 is 1200 for each frame, and the number of registers 252 of the sorting unit 243 is 6 (k=6), upon all of the pixels within one frame being processed, of the sampled pixels the brightness values L(nl)(p) of the pixels up to the sixth pixel from the dark side brightness are stored in the registers 252-1 through 252-6 (to be specific, the pixels wherein the brightness level L(nl)(p) is below the noiseLevel (nl) are excluded, so this is not necessarily the sixth pixel). Accordingly, the brightness value L(nl)(p) stored, in the registers 252-6 held in the number of pixels for the entire frame, i.e. the ratio of number of pixels with a brightness value at or below Ldark(nl) is estimated to be roughly 0.5% (=6/1200). Similarly, the brightness value L(nl)(p) stored in the registers 262-6 held in the number of pixels for the entire frame, i.e. the ratio of number of pixels with a brightness value above Lbright(nl) is estimated to be roughly 0.5% (=6/1200).

Note that the ratio of number of pixels employed for setting the base value Ldark(nl) or the base value Lbright(nl) may be a value other than the above-described 0.5%. Also, the number of registers of the sorting units 243 or 244 is set according to the ratio of number of pixels to be sampled, and number of pixels employed for setting the base value Ldark(nl) or the base value Lbright(nl).

The sorting unit 243 outputs the base value Ldark(nl) to the time smoothing unit 223-1, and the sorting unit 244 outputs the base value Lbright(nl) to the time smoothing unit 223-2.

In step S132, the average level computing unit 222 (FIG. 6) of the tone curve computing unit 163 computes the average level from the brightness total value. Specifically, the dividing unit 294(FIG. 8) of the average value computing unit 282 of the average level computing unit 222 reads the brightness total value stored in the register 292 and the counter value (number of pixels)in the counter 293. The dividing unit 294 computes the average level Laverage(nl) of the brightness value L(nl)(p) by dividing the brightness total value by the counter value of the counter 293. The dividing unit 294 outputs the average level Laverage(nl) to the time smoothing unit 223-3.

In step S133, the time smoothing unit 223 subjects the base values and average level to time smoothing. Specifically, the multiplying unit 311 (FIG. 9) of the time smoothing unit 223-1 multiplies the base value Ldark(nl) by a predetermined smoothing coefficient sc1, and outputs this to the adding unit 313. The multiplying unit 312 of the time smoothing unit 223-1 reads the base value Ldark-ts-pre(nl), which is subjected to time smoothing in the previous frame, from the register 314. The multiplying unit 312 multiplies the base value Ldark-ts-pre(nl) by a smoothing coefficient sc2, and outputs this to the adding unit 313. The adding unit 313 computes the base value Ldark-ts(nl) wherein the base value Ldark(nl) is subjected to time smoothing by adding the value output from the multiplying unit 311 and the value output from the multiplying unit 312. That in to say, the base value Ldark-ts(nl) is expressed with the Expression (17) below.

$$L\text{dark-}ts(nl)=sc1\cdot L\text{dark}(nl)+sc2\cdot L\text{dark-}ts\text{-pre}(nl) \quad (17)$$

That is to say, with the smoothing coefficients sc1 and sc2, smoothing is performed between the base value Ldark(nl) of the current frame and the base value Ldark-ts-pre(nl) of the previous frame.

The adding unit 313 outputs the base value Ldark-ts(nl) to the spline generating unit 224 while storing this in the register 314.

Similarly, the time smoothing unit 223-2 computes the base value Lbright-ts(nl) wherein the base value Lbright(nl) is subjected to time smoothing with the Expression (18) below, outputs the computed base value Lbright-ts(nl) to the spline generating unit 224 while storing this in the register 314.

$$L\text{bright-}ts(nl)=sc1\cdot L\text{bright}(nl)sc2\cdot L\text{bright-}ts\text{-pre}(nl) \quad (18)$$

Now, let us say that Lbright-ts-pre(nl) is the base value Lbright-ts(nl) subjected to time smoothing in the previous frame.

Also, similarly, the time smoothing unit 223-3 computes the average level Laverage-ts(nl) wherein the average level Laverage(nl) is subjected to time smoothing with the Expression (19) below, outputs the computed average level Leverage-ts(nl) to the spline generating unit 224, and stores this in the register 314.

$$L\text{average-}ts(nl)=sc1\cdot L\text{average}(nl)+sc2\cdot L\text{average-}ts\text{-pre}(nl) \quad (19)$$

Now, let us say that Laverage-ts-pre(nl) is the average level Laverage-ts(nl) subjected to time smoothing in the previous frame.

Thus, the base values and the value of the average level are prevented from suddenly changing between frames or vibrating.

Figure 25:
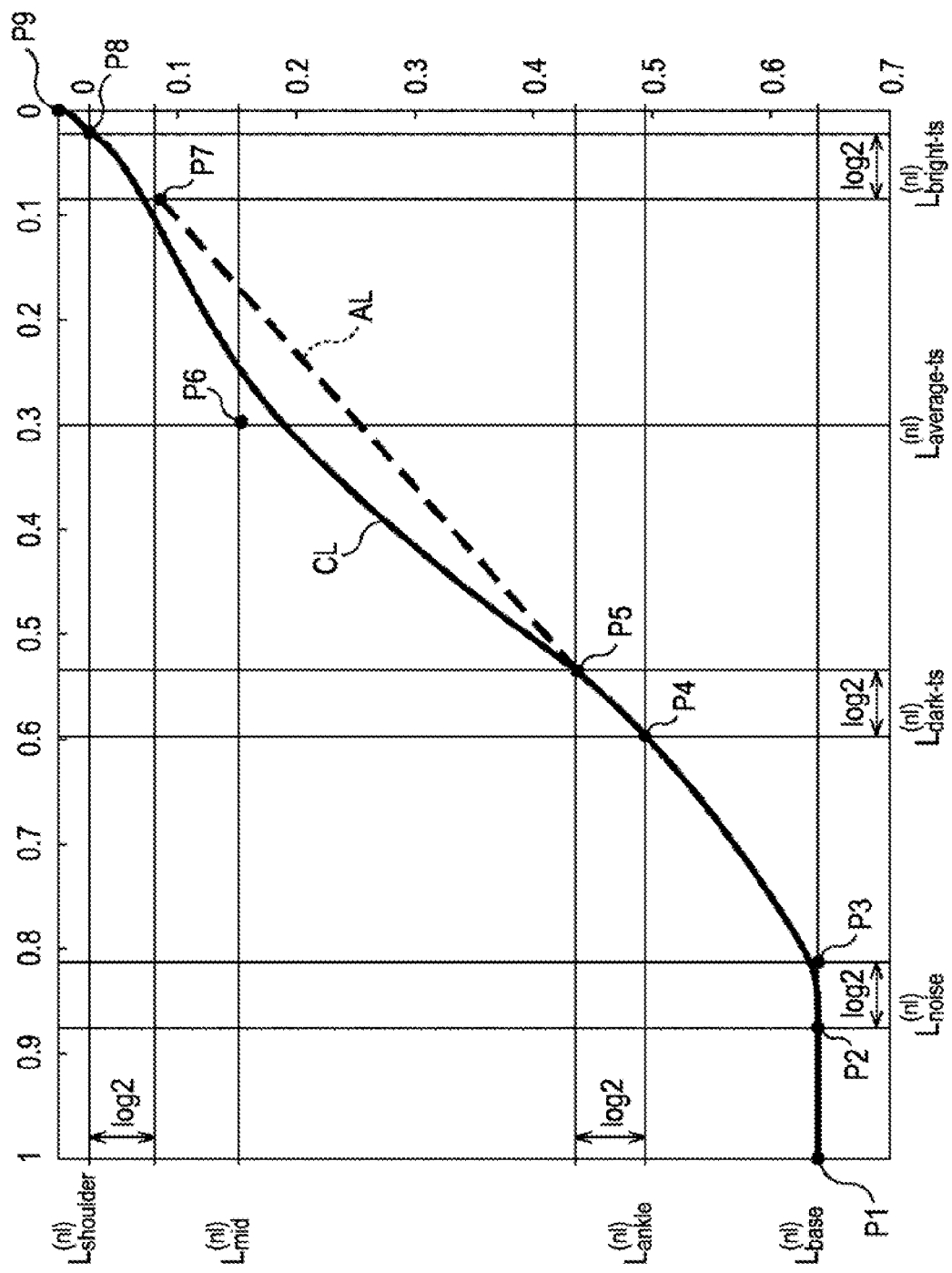
FIG. 25 is a graph showing an example of a tone curve.

In step S134, the spline generating unit 224 generates a tone curve. The generating method of the tone curve will be described below with reference to FIG. 25. FIG. 25 shows a example of a tone curve generated with the spline generating unit 224. Note that the horizontal axis direction of the graph in FIG. 25 expresses logarithmic values of the input brightness before gray level correction, and the vertical axis direction expresses logarithmic values of the output brightness after gray level correction by the tone curve CL.

First, the control point setting unit 331 (FIG. 10) of the spline generating unit 224 sets nine control points P1 through P9. The control point P1 is set to be a point such that the input brightness thereof is a predetermined minimum level, and the output brightness thereof is a predetermined minimum level Lbase(nl). The control point P2 is set to be a point such that the input brightness is a predetermined noise level Lnoise(nl) which is a brightness which can be seen as a noise level, and the output brightness is a minimum level Lbase(nl). The control point P3 is set to be a point such that the input brightness is double the brightness value of the noise level Lnoise(nl), and the output brightness is a minimum level Lbase(nl), The control point P4 is set to be a point such that the input brightness is the base value Ldark-ts(nl) on the dark brightness side, and the output brightness is the brightness value Lankle(nl) which is a brightness value of almost a black level. The control point P5 is set to be a point such that the input brightness is double the brightness value of the base value Ldark-ts(nl), and the output brightness is double the brightness value of the brightness value Lankle(nl). The control point P6 is set to be a point such that the input brightness is the average level Laverage-ts(nl) of the input brightness, and the output brightness is an intermediate brightness level Lmid(nl) of a predetermined roughly mid-point within a brightness range of the output brightness. The control point P7 is set to be a point such that the input brightness is half of the brightness value of the base value Lbright-ts(nl) on the bright brightness side, and the output brightness is half or the brightness value of the brightness value Lshoulder(nl) which is roughly a white level brightness value. The control point P8 is set to be a point such that the input brightness is the base value Lbright-ts(nl) and the output brightness is the brightness value Lshoulder(nl). The control point P9 is set to be a point such that the input brightness is a maximum value of the predetermined input brightness, and the output brightness is the maximum value of the predetermined output brightness.

The control point setting unit 331 supplies a control point set indicating the locations of the set control points P1 through P9 to a curve drawing unit 332 and v computing unit 333. The curve drawing unit 332 computes the coordinates on a cubic spline curve which interpolates between each of the nine points of the control points P1 through P9, thereby generating a lookup table for the tone curve CL.

Note that, by setting the control point P3 as an auxiliary point, the tons curve CL will definitely pass through the control point P2 or nearby the root. That is to say, in the case that the input brightness is almost noise level Lnoise(nl), this is subjected to gray level transforming to a value roughly equal to the minimum level Lbase(nl) of the output brightness. Also, by setting the control point P5 as an auxiliary point, the elope of the tone curve CL is prevented from becoming extremely steep or gentle in the vicinity (near the control point P4) wherein the input brightness becomes almost the base value Ldark-ts(nl) and the output brightness becomes an almost black level brightness value Lankle(nl). Also, by setting the control point P7 as an auxiliary point, the slope of the tone curve CL is prevented from, becoming extremely steep or gentle in the vicinity (near the control point P8) wherein the input brightness becomes almost the base value Ldark-ts(nl) and the output brightness becomes an almost white level brightness value Lshoulder(nl).

Accordingly, the slope of the tone curve CL becomes gentle near the control point P6, and becomes a monotonically increasing curve in a reverse S-shape wherein the slope nears 1 near the control points P4 and P8. That is to say, in the vicinity wherein the output brightness is an intermediate level Lmid(nl), the gray level compression rate is increased, and the gray level compression rate is decreased as the output brightness becomes high (great) or low (small). The reason for this is that, upon compressing the gray level employing the tone curve CL, when performing contrast correction, as described, above, the contrast is enhanced for the brightness components closer to the intermediate brightness level Lmid (nl), whereby a contrast can be obtained closer to the image before compressing the gray level, while on the other hand, in order to prevent clipping of the brightness value, there is virtually no contrast correction for the brightness components near the minimum value Lmin(nl) or maximum value Lmax(nl).

Accordingly, by combining the gray level compression by the tone curve CL and the contrast correction in step S30, a black-out or white-out can virtually be avoided while retaining the image detail, and gray level compression of the image can be performed.

Also, the tone curve CL is generated for each image based on the base value Ldark-ts(nl), base value Lbright-ts(nl), and average level Laverage-ts(nl) computed, from the input image data, whereby the gray level of the image can be appropriately compressed according to the distribution of the pixel values (brightness value) of the input image data.

In step S135, the ν computing unit 333 computes a γ_comp parameter with the tone curve shape. Specifically, in order to obtain a value close to the slope of the tone curve CL in the vicinity of the control point P6, the ν computing unit 333 computes the slope of a line segment AL connecting the control points P5 and P7, and sets the computed slope as the γ_comp parameter.

In step S136, the tone curve computing unit 163 stores the tone curve and the γ_comp parameter in memory, and the tone curve and γ_comp computing processing is ended. Specifically, the curve drawing unit 332 stores a lookup table expressing the generated tone curve in the tone curve memory 164. Also, the γ computing unit 333 stores the γ_comp parameter in the γ_comp parameter memory 165.

Next, the details of the reduced image generating processing in step 337 in FIG. 17 will be described with reference to the flowchart in FIG. 26.

In step S151, the reduced image generating unit 181 computes the average value of the brightness of the pixels within the block. Specifically, for example, the average value computing unit 352-1 (FIG. 11) of the reduced image generating unit 181 computes the average value of the brightness of a first block held by itself by dividing the brightness total value of the pixels within the first block by the number of pixels within the block.

In step S152, the reduced image generating unit 181 stores the average value of the brightness of the block in a pixel location corresponding to that of the memory. Specifically, for example, the average value computing unit 352-1 stores the computed average value of the brightness of the first block in a pixel (e.g. pixel at the farmost upper left) location corresponding to that of the reduced image memory 182.

In step S153, the reduced image generating unit 181 determines whether or not all of the blocks are processed. In the case determination is made that not all blocks have been processed yet, the flow is returned to step S151, and the processing in steps S151 through S153 is repeatedly executed until determination is made in step S153 that all blocks have been processed. That is to say, the average value of brightness is similarly computed for the second block and thereafter in sequence, and the computed average values are stored in the locations of the pixels corresponding to those of the reduced image memory 182.

In step S153, in the case that processing is ended for all blocks, the reduced image generating processing is ended.

Thus, a reduced image is generated of horizontal wr×vertical hr pixels, wherein the average value of the brightness value L(nl)(p) for each divided block is arrayed in block sequence, wherein the image made up of the brightness value L(nl)(p) is divided into multiple blocks of horizontal wr×vertical hr blocks.

Thus, gray level compression of an image can foe performed while retaining most of the image detail, with virtually no black-out or white-out occurring. Also, the gray level of the image can be appropriately compressed according to the distribution of the pixel values (brightness values) of the input image data.

Further, by performing gray level transforming by employing the reduced image, tone curve, and γ_comp parameter generated or computed in the processing in the previous frame, compared to a case wherein gray level transforming is performed by employing the reduced image, tone curve, and γ_comp parameter generated or computed in the processing within the same frame, there is virtually no delay time in processing to generate the reduced image and compute the tone curve and γ_comp parameter, whereby processing time can be shortened. Also, there is no need to hold one frame worth of image, for example, in order to await the ending of the reduced image generating or the tone curve and γ_comp parameter computing, whereby memory use amount can foe reduced.

Note that the reduced image, tone curve, and γ_comp parameter are each information not depending on the image details, whereby time shifting by using information from the previous frame is almost never a problem. For example, if the information includes high frequency components such as edge information of a subject, position shifting of the subject between frames can occur in a moving picture, thereby necessitating processing to compensate position shifting, but such problems do not occur for a reduced image, tone curve, and γ_comp parameter.

Also, in the case of gray level transforming employing the reduced image, tone curve, and γ_comp parameter which are generated or computed within the same frame, the generating of the reduced image and the computing of the tone curve and γ_comp parameter can be performed concurrently, thereby shortening processing time, Next, another embodiment according to the present invention will be described, which differs from the above-described embodiment.

Figure 27:
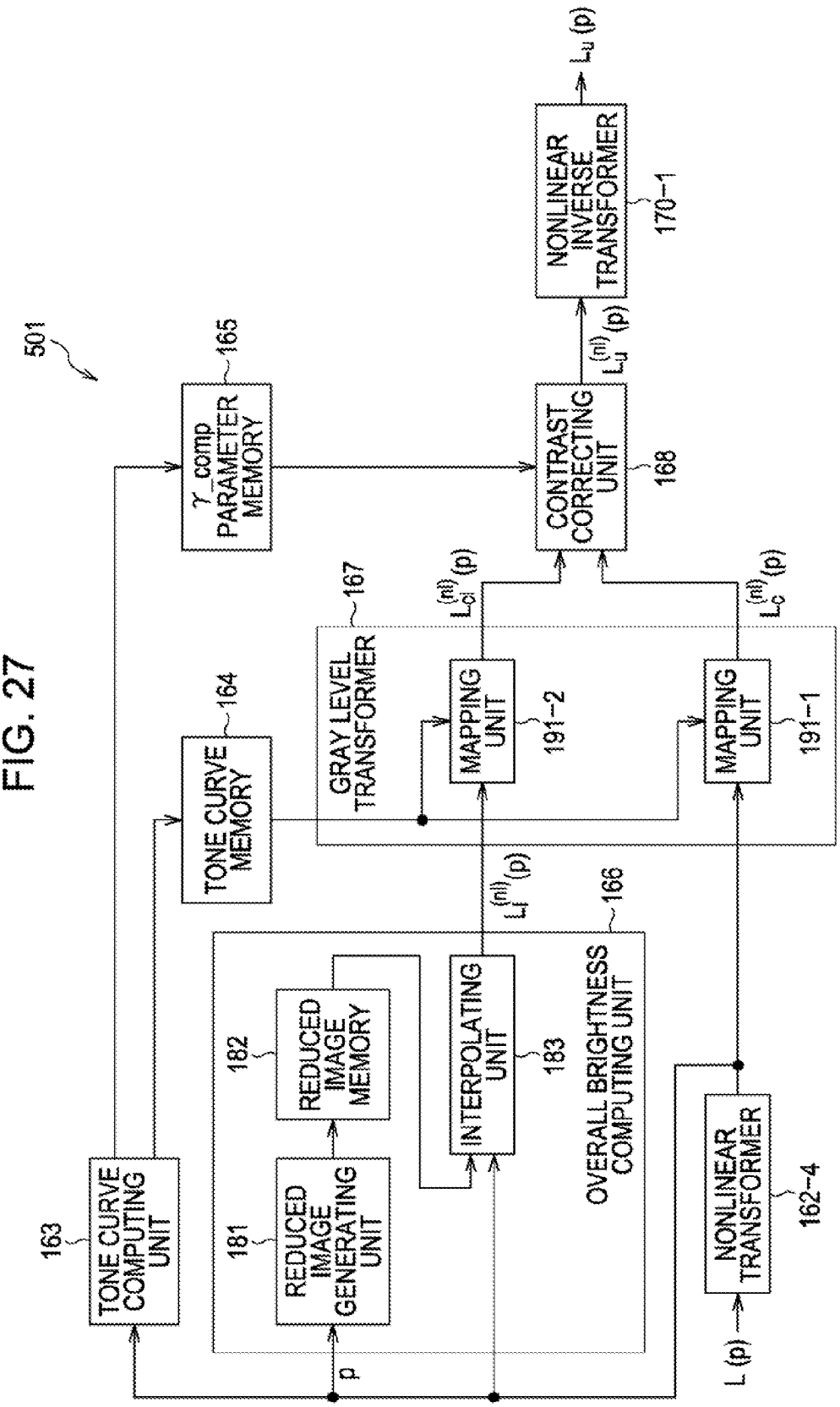
FIG. 27 is a block diagram illustrating another embodiment of the gray level transformer employing to which an embodiment of the present invention has been applied.

FIG. 27 is a block diagram, showing a configuration example of the function of the gray level transformer in the case of processing a black-and-white image. Compared to the gray level transformer 143 in FIG. 4, the gray level transformer 501 is similar in including a nonlinear transformer 162-4, tone curve computing unit 163, tone curve memory 164, ν_comp parameter memory 165, overall brightness computing unit 166, gray level transformer 167, contrast correcting unit 168, and nonlinear inverse transformer 170-1, and differs in not including a brightness computing units 161, nonlinear transformer 162-1 through 162-3, gray level correcting units 169-1 through 169-3, and nonlinear inverse transformers 170-2 and 170-3.

That is to say, since there is no need to process the color components (R, G, B components) of the various pixels, the gray level transformer 501 is configured such that the portion to process the brightness components of the gray level transformer 143 is extracted. Note that the nonlinear inverse transformer 170-1 of the gray level transformer 501 differs from the nonlinear inverse transformer 170-1 of the gray level transformer 143, and externally outputs the brightness value Lu(p) as the output value of the gray level transformer 501 wherein the brightness value Lu(nl)(p) with contrast corrected is subjected to nonlinear transforming.

Also, if the nonlinear transforming processing of the nonlinear transformers 162-1 through 162-4 is substituted with gamma correction processing which is generally performed with camera signal processing, the configuration of the gray level transformer can be simplified.

Figure 28:
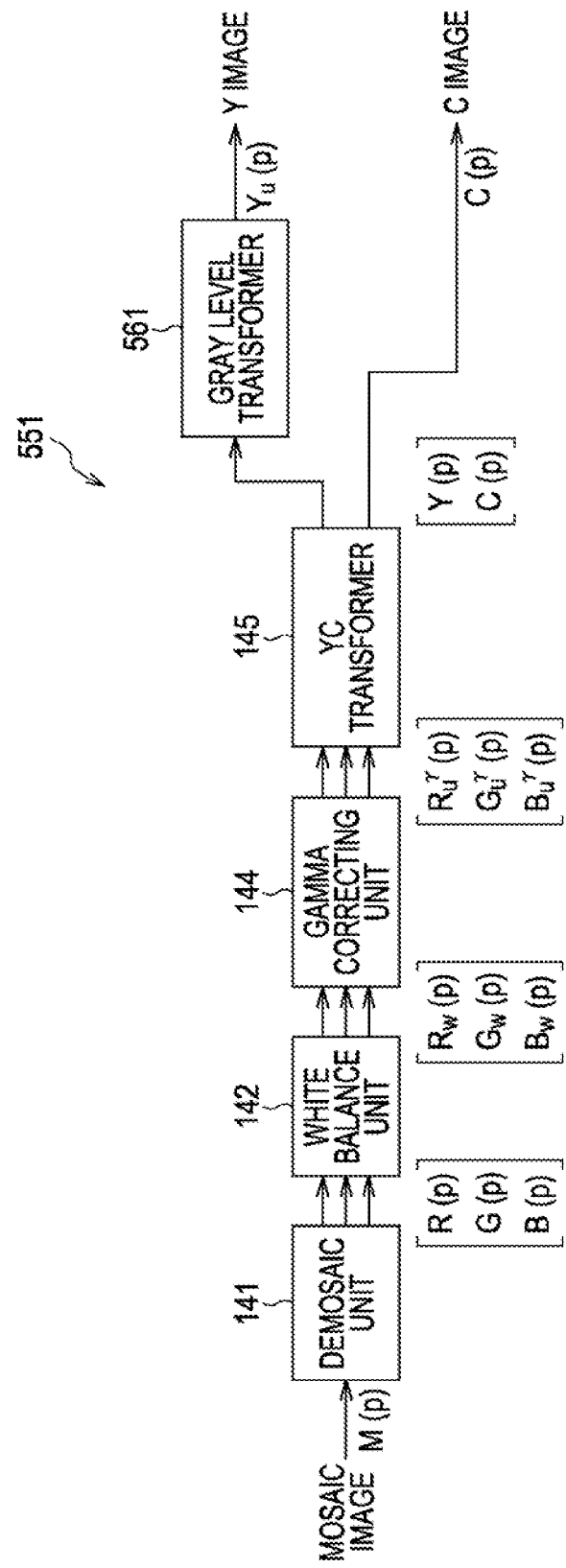
FIG. 28 is a block diagram illustrating another embodiment of the DSP block to which an embodiment of the present invention has been applied.

FIG. 28 is a diagram showing a configuration example of the function of a DSP block in the case of substituting the nonlinear transforming processing with the gamma correcting processing of a camera. Compared to the DSP 116 in FIG. 3, the DSP 551 is similar in that a demosaic unit 141, white balance unit 142, gamma correcting unit 144, and YC transformer 145 are included, and differs in that a gray level transformer 561 is included instead of the gray level transformer 143.

Also, the DSP 551 differs from the DSP 116 in that the gamma correcting unit 144 performs gamma correction to the pixel values [Rw(p), Gw(p), Bw(p)] wherein the white balance is adjusted with the white balance unit 142, and outputs the pixel values [Ruγ(p), Guγ(p), Buγ(p)] subjected to gamma correcting to the YC transformer 145. Further, the YC transformer 145 outputs the brightness value Y(p) of the Y-image after YC transforming to the gray level transformer 561, and outputs the color difference value C(p) of the C-image externally. Also, the gray level transformer 561 subjects the brightness value Y(p) after gamma correction with the gamma correcting unit 144 to gray level transforming, and outputs this externally.

Figure 29:
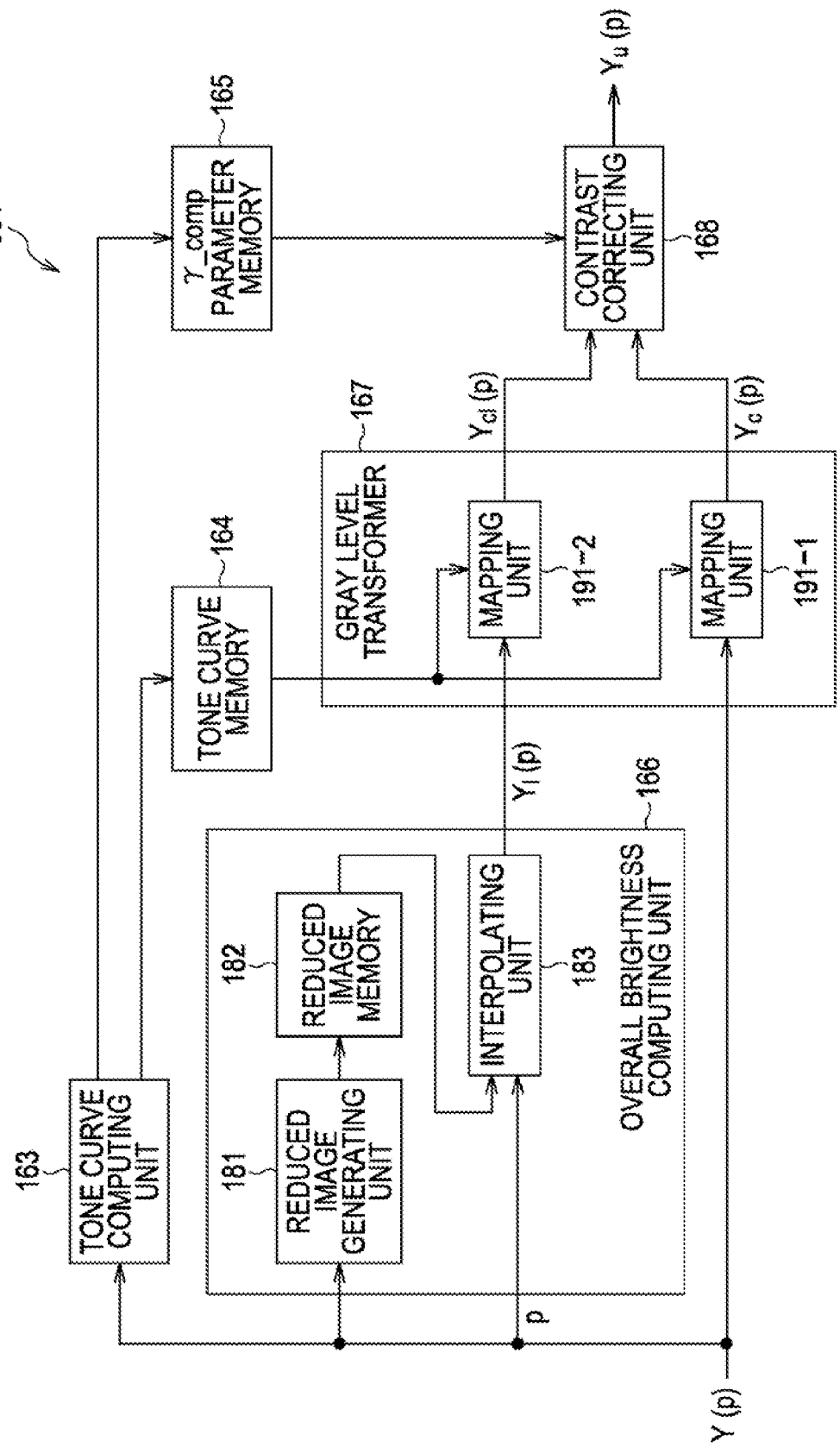
FIG. 29 is a block diagram illustrating a configuration example of a gray level transformer function in FIG. 28.

FIG. 29 is a block diagram showing a configuration example of the function of the gray level transformer 561 in FIG. 28. Compared to the gray level transformer 501 in FIG. 27, the gray level transformer 561 is similar in that a tone curve computing unit 163, tone curve memory 164, γ_comp parameter memory 165, overall brightness value computing unit 166, gray level transformer 167, and contrast correcting unit 168 are included, and differ in that a nonlinear transformer 162-4 and nonlinear inverse transformer 170-1 are not included. That is to say, the brightness value Y(p) input in the gray level transformer 561 is already subjected to gamma correction, which is a type of nonlinear transforming, with the gamma correcting unit 144, whereby with the gray level transformer 561, a configuration to perform nonlinear trails forming processing and nonlinear inverse transforming processing can be omitted.

Thus, in a case wherein, based on the distribution of input brightness which is the brightness of the input image, a transformation curve employed for compression of the brightness gray level is computed, based on the transformation curve, the gray level of the input brightness and gray level of the overall brightness is compressed, and based on the slope of the transformation curve and the overall brightness wherein gray level is compressed, the contrast is corrected for a gray level compression input image made up of the input brightness gray level, the brightness of the image or the gray level of the color value can be compressed. Also, appropriate gray level compression of the brightness or color value according to each image can be executed at a high speed without losing image contrast.

The input brightness which is the brightness for each pixel in an input image is computed based on the color value which is the value of the color components of the input image, a transformation curve employed for compressing the gray level of the brightness is computed based on the distribution of the input brightness, the overall brightness, which is the overall brightness image made up of low frequency components of the brightness image made up of input brightness, is computed, and based on the transformation curve, the gray level of the input brightness and the gray level of the overall brightness are compressed, and based on the slope of the transformation curve and the overall brightness with compressed gray level, the contrast of the gray level compression brightness image made up of input brightness having compressed gray level is corrected, the various pixel values of the difference image which is the difference between the input image and the brightness image is multiplied by a predetermined coefficient, and further, a gray level compression brightness image with corrected contrast is added thereto, whereby, in the case of transforming the gray level of the color value of the input image, the brightness of the image or the gray level of the color value can be compressed. Also, appropriate gray level compression of the brightness or color value according to each image can be executed at a high speed without losing image contrast.

Note that the sequence of processing described above with reference to the flowchart is an example thereof, and within the scope of retaining the primary intent of the present invention, the sequence of processing may foe interchanged, or multiple processes may be performed concurrently. For example, the brightness value may be computed after subjecting the R, G, B components of the input image to nonlinear transforming. Also, the reduced image can be generated before performing nonlinear transforming. Further, the base values and average level of a brightness value histogram may be obtained from the brightness value before nonlinear transforming, and then be subjected to nonlinear transforming.

Also, a configuration may be arranged wherein a similar processes are joined or shared. For example, the mapping units 191-1 and 191-2, the mapping unit 201 of the nonlinear transformer 162, and the inverse mapping unit 411 of the nonlinear inverse transformer 170 can be executed employing shared circuits.

Further, with the above description, the average level of the brightness value necessary for generating a tone curve is an average value of the brightness value of the entire image, but for example, this may be an average value of the brightness value of the reduced image. Thus, the computing time for the average level can be shortened. Also, for example, the lightness of the entire image or a portion thereof can be measured by an AE (Auto Exposure) control system by employing an AE control mechanism provided on many camera control, systems, or the lightness of the subject region which the AE control system determines to foe the primary subject is measured, whereby the brightness value based on the measured lightness can be the average level. Further, a desired region within the image can be specified by the user, and by computing the average level, with emphasis on the specified region, a tone curve can be generated which is closer to that which is desired by the user.

The above-described, processing is featured, by a separation of the overall, brightness components and contrast components within the image by employing a low frequency filter, which is realized by combining the image reducing processing by the reduced image generating unit 181, and the image interpolating processing by the interpolating unit 183. The contrast components separated with this configuration is not only the high frequency components of the image, but also includes the low frequency components, whereby natural contrast correction can be performed without detail only being unnecessarily enhanced. Also, by realizing a huge two-dimensional operator, divided into an image reducing process and an image interpolating process, which is necessary for separating the contrast components including the low frequency components, there is the advantage of realizing an extremely compact circuit configuration wherein a huge delay line or frame memory is not necessary, Now, in the field of digital still cameras, functions such as image sensor output, before performing signal processing (hereafter called RAW data), or outputting mosaic image data corresponding thereto as camera output image data, have become generally used. Accordingly, signal processing for the RAW data which currently has been necessary only within the camera device, or for the mosaic image data corresponding thereto, has recently become employed with an image processing program operated externally to the camera, e.g. on a personal computer.

However, the gray level transforming technique used with the digital, video camera 101 described with reference to FIG. 2 operates on the premise that an input image has image data with complete color information for all three color REG pixels, whereby outputting mosaic image data after gray level transforming such as that to correspond to the RAW data has been difficult to output to an external device.

Also, the gray level transforming technique used with the digital video camera 101 described with reference to FIG. 2 operates on the premise that, an input image has image data with complete color information for pixels of all three colors of RBG. Therefore, in order to output an RGB image subjected to gray level transforming, concurrently processing the pixel values of the color information for the three R, G, and B has been necessary. Thus, as shown in FIG. 4, the nonlinear transformers 162-1 through 162-3, gray level correcting units 169-1 through 169-3, and nonlinear inverse transformers 170-1 through 170-3, which process each of the color information for the three R, G, B has been necessary, thus preventing the circuit configuration from being made further compact.

The mosaic pixel value only has one color information according to the pixel thereof, but the gray level correcting processing of the pixel value which is executed with the gray level transformer 143 is basically computation not dependent on the color of the pixel value. Accordingly, with the gray level correcting processing of the pixel value, in actuality there is no need to distinguish which color pixel the pixel of interest corresponds to.

Thus, computations differing by color do not need to be arranged concurrently, and for example, gray level correcting can be performed, by transforming each of the pixel values which make up a mosaic image so as to save the color ratio or color difference as to the gray value before and after gray level transforming.

Figure 30:
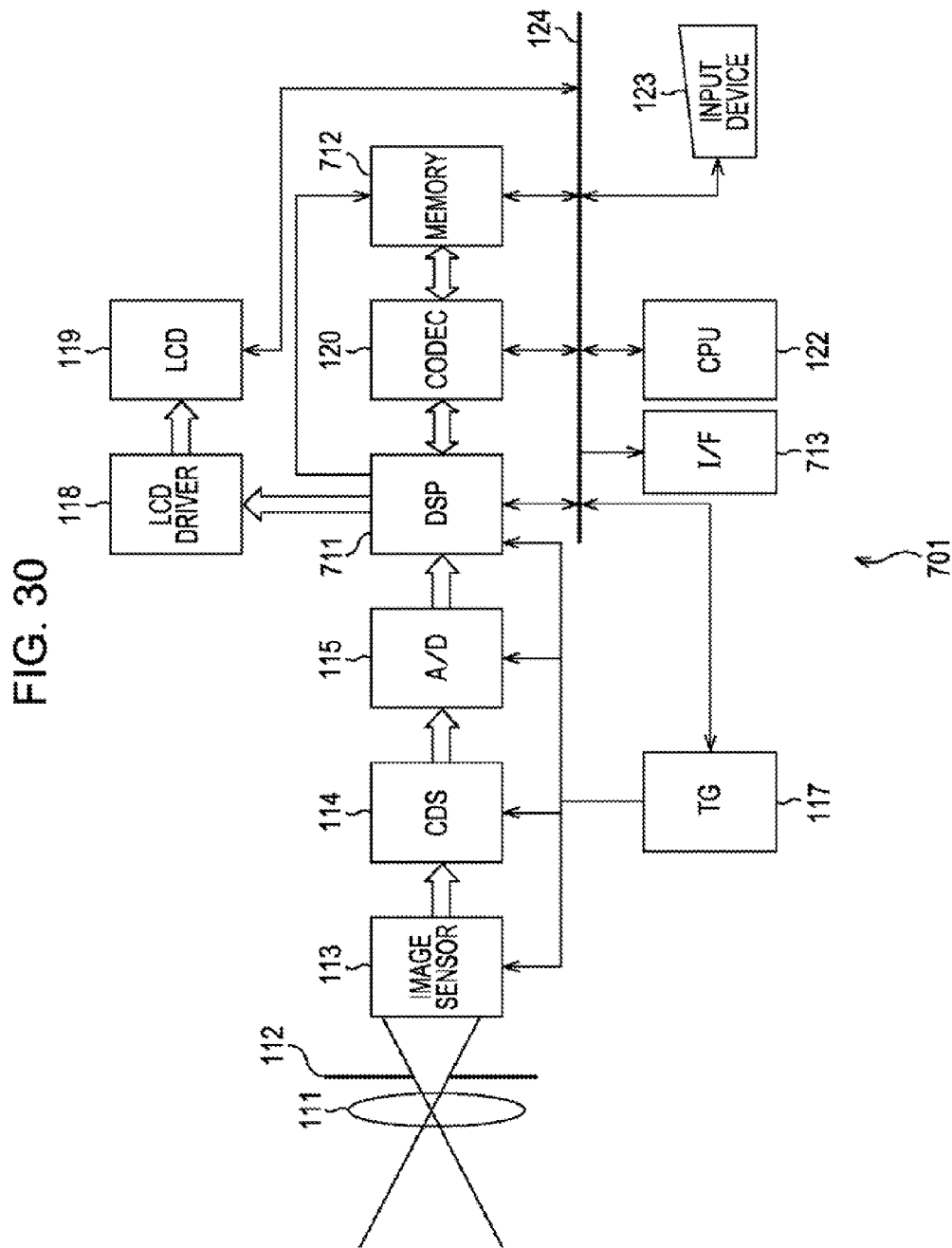
FIG. 30 is a block diagram illustrating an embodiment of a digital video camera to which an embodiment of the present invention has been applied.

FIG. 30 is a block diagram showing an embodiment in the case of having a configuration of a digital video camera to which the present invention has been applied, which is different from the case described with reference to FIG. 2.

Note that the portions corresponding to the case described with reference to FIG. 2 are denoted with the same reference numerals, and the descriptions thereof are omitted as appropriate.

That is to say, the digital video camera 701 shown in FIG. 30 basically has similar configuration as the digital video camera 101 described with reference to FIG. 2, except that a DSP block 711 is provided instead of the DSP 116, memory 712 is provided instead of the memory 121, and an external interface 713 is newly provided. Note that the DSP block 711 hereafter will be simply referred to as "DSP 711".

The DSP 711 either supplies the image data subjected to image processing, after the image data is subjected, to the image processing described later, to the LCD driver 118 or CODEC 120 as necessary, such that the dynamic range of the image data becomes a dynamic range wherein the LCD 119 is capable of display, for example, or supplies the mosaic image data wherein a portion of the executable image processing is subjected, to demosaic processing, in the case that output of the mosaic image data before demosaic processing is performed is requested.

The memory 712 is configured with a semiconductor, magnetic recording medium, magneto-optical recording medium, optical recording medium, or the like, and records the image data encoded by the CODEC 120, while receiving the supply of, and recording, the mosaic image data wherein a portion of the image processing executable by the DSP 711 is performed, in the case that, output of mosaic image data before the demosaic processing is performed is requested, the recorded mosaic image is supplied to the interface 713.

The interface 713 is an interface between an external network and a device, whereby in the case that output of mosaic image data before the demosaic processing is performed is requested, the mosaic mage data before demosaic processing is performed which is supplied from the memory 712 is output to a predetermined device.

Figure 31:
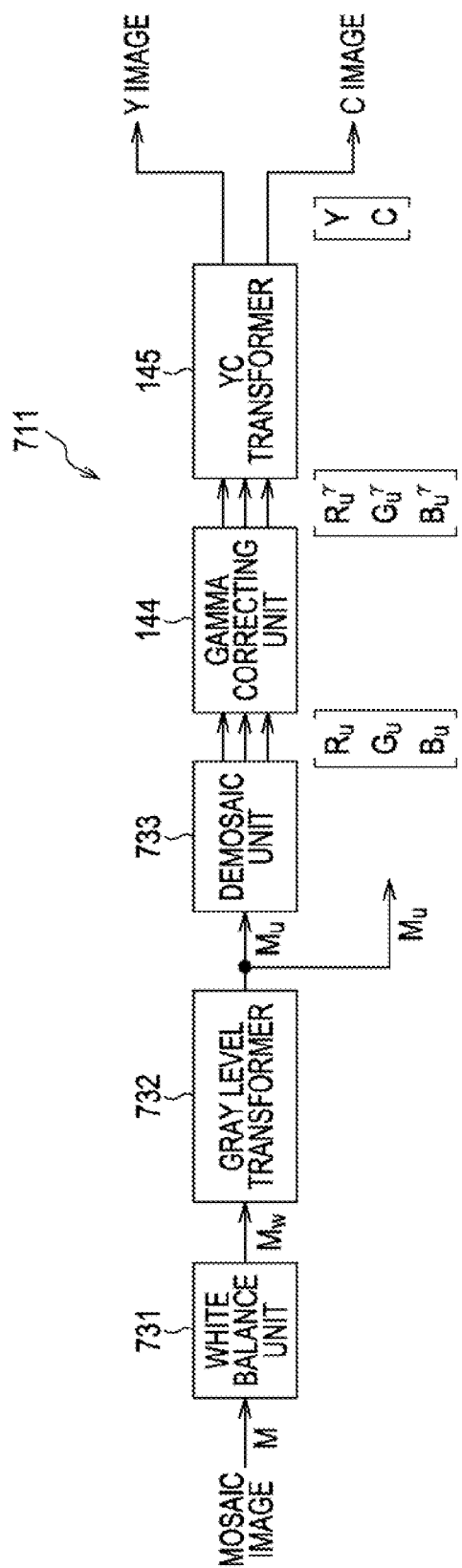
FIG. 31 is a block diagram illustrating a configuration example of a DSP function in FIG. 30.

Next, FIG. 31 is a block diagram showing a configuration example of a function realized by a predetermined program executed by a processor (computing unit) within the DSP 711. By the processor within the DSP 711 executing the predetermined program, the functions of the white balance unit 731, gray level transformer 732, and demosaic unit 733 are realized, while the functions of the gamma correcting unit 144 and YC transformer 145, which are portions of the function of the DSP 116 described with reference to FIG. 3, are realized.

The white balance unit 731 obtains the mosaic image which is image data subjected to A/D conversion with the A/D converter 115. The mosaic image is an image wherein data corresponding to the color component of one of R, G, and B is stored in one pixel, and for example is an image wherein the various pixels are positioned according to a color array called the Bayer array. The white balance unit 731 adjusts the white balance of the mosaic image such that the color balance of the achromatic portion of the subject actually becomes achromatic, by applying an appropriate coefficient to each pixel value of the RBG of the mosaic image. The white balance unit 731 supplies the mosaic image with adjusted white balance to the gray level transformer 732. Hereafter, let us say that the pixel value at the pixel location p of the mosaic image data with adjusted white balance is Mw(p).

As described later with reference to FIG. 33 and so forth, the gray level transformer 732 performs gray level transforming processing as to the mosaic image with adjusted white balance. The gray level, transformer 732 supplies the image subjected to gray level transforming to the demosaic unit 733, or in the case that the output of the mosaic image data before demosaic processing is performed is requested, supplies the mosaic image data, wherein a portion of the executable image processing is performed, to the memory 712. Hereafter, let us say that the pixel value at the pixel location p of the image data subjected to gray level transforming processing is Mu(p).

The demosaic unit 733 receives input of the mosaic image subjected to white balance adjusting and gray level transforming, and subjects the mosaic image to demosaic processing such that one pixel has all of the R, G, B components. Thus, three image data of an R-image, G-image, and B-image corresponding to the three color components R, G, B is generated. The demosaic unit 733 supplies the three image data of the generated R-image, G-image, and B-image to the gamma correcting unit 144. Hereafter, let us say that the pixel value at the pixel location p of the demosaic image data subjected to white balance adjusting and gray level transforming is [Ru(p), Gu(p), Bu(p)]. Note that Ru(p) is a pixel value of the R component, Gu(p) is a pixel value of the G component, and Bu(p) is a pixel value of the B component.

Note that the functions of the gamma correcting unit 114 and YC transformer 145 are similar to the case of the DSP 116 described with reference to FIG. 3, so the detailed description thereof will be omitted.

Figure 32:
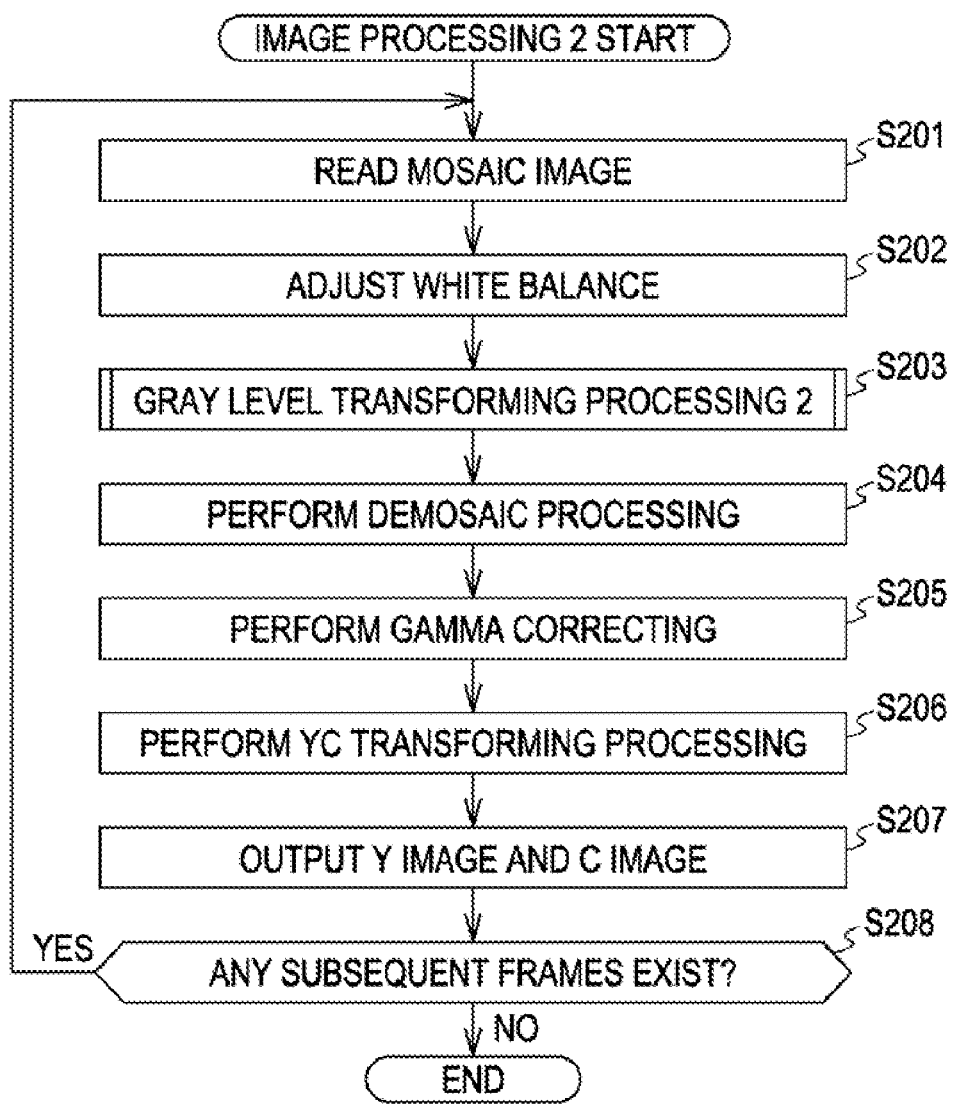
FIG. 32 is a flowchart to describe image processing 2 which is executed with the DSP in FIG. 31.

Next, the image processing 2 executed with the DSP 711 will be described with reference to the flowchart in FIG. 32. Note that this processing is started when shooting with the digital video camera 701 is started and the image data (mosaic image) stream supply from the A/D converter 115 to the DSP 711 is started, for example. Note that the image data supplied to the DSP 711 is stored successively in an unshown internal memory of the next DSP 711.

In step S201, the white balance unit 731 reads the mosaic image. Specifically, the white balance unit 731 reads the mosaic image of the first frame stored in the unshown internal memory of the next DSP 711.

In step S202, the white balance unit 731 adjusts the white balance of the obtained mosaic image. The white balance unit 731 supplies the mosaic image with adjusted white balance to the gray level transformer 732.

In step 3203, the gray level transformer 732 performs gray level transforming processing 2. The details of the gray level transforming processing 2 will be described later with reference to FIGS. 37 and 38, but with this processing, the gray level of the mosaic image is transformed, and the mosaic image with transformed gray level is supplied to the demosaic unit 733.

In step S204, the demosaic unit 733 performs demosaic processing. Specifically, the demosaic unit 733 subjects the read mosaic image to demosaic processing, thereby generating an RBG image. The demosaic unit 733 supplies the generated RGB image to the gamma correcting unit 144.

In step 8205, the gamma correcting unit 144 subjects the RBG image to gamma correcting. The gamma correcting unit 144 supplies the RBG image subjected to gamma correcting to the YC transformer 145.

In step S206, the YC transformer 145 performs YC transforming processing. Specifically, by performing YC matrix processing and bandwidth limitation as to the color components, a Y-image and C-image are generated from the RBG image.

In step S207, the YC transformer 145 outputs the Y-image and C-image. Specifically, the YC transformer 145 outputs the Y-image and C-image to the LCD driver 118 or CODEC 120 as necessary.

In step S208, the white balance unit 731 determines whether or not there are any following frames. In the case determination is made that a mosaic image of a following frame is accumulated in the unshown internal memory of the DSP 711, the white balance unit 731 determines that there is a following frame, whereby the flow is returned to step 3201.

In step S201, the mosaic image of the next frame is read, and the processing in step S202 and thereafter is performed as to the read mosaic image.

After this, the processing in steps S201 through S208 is repeatedly executed until determination is made in step S208 that there are no following frames, and image processing is performed sequentially, one frame at a time, as to the mosaic image supplied from the A/D converter 115. In the case determination is made in step S20S that there are no following frames, the image processing is ended.

With such processing, image processing is executed with the DSP 711. That is to say, with the image processing 2 executed with the DSP 711, the white balance adjusting and the gray level transforming processing are performed before the demosaic processing, as compared to the image processing 1 described with reference to FIG. 15. That is to say, the white balance adjusting and the gray level transforming processing are performed as to the mosaic image.

Note that description is given here as the gray level of the mosaic image being transformed and the mosaic image subjected to gray level transforming being supplied to the demosaic unit 733, but as described above, there are cases wherein the mosaic image subjected to gray level transforming is supplied to the memory 712, and output externally via the interface 713.

Figure 33:
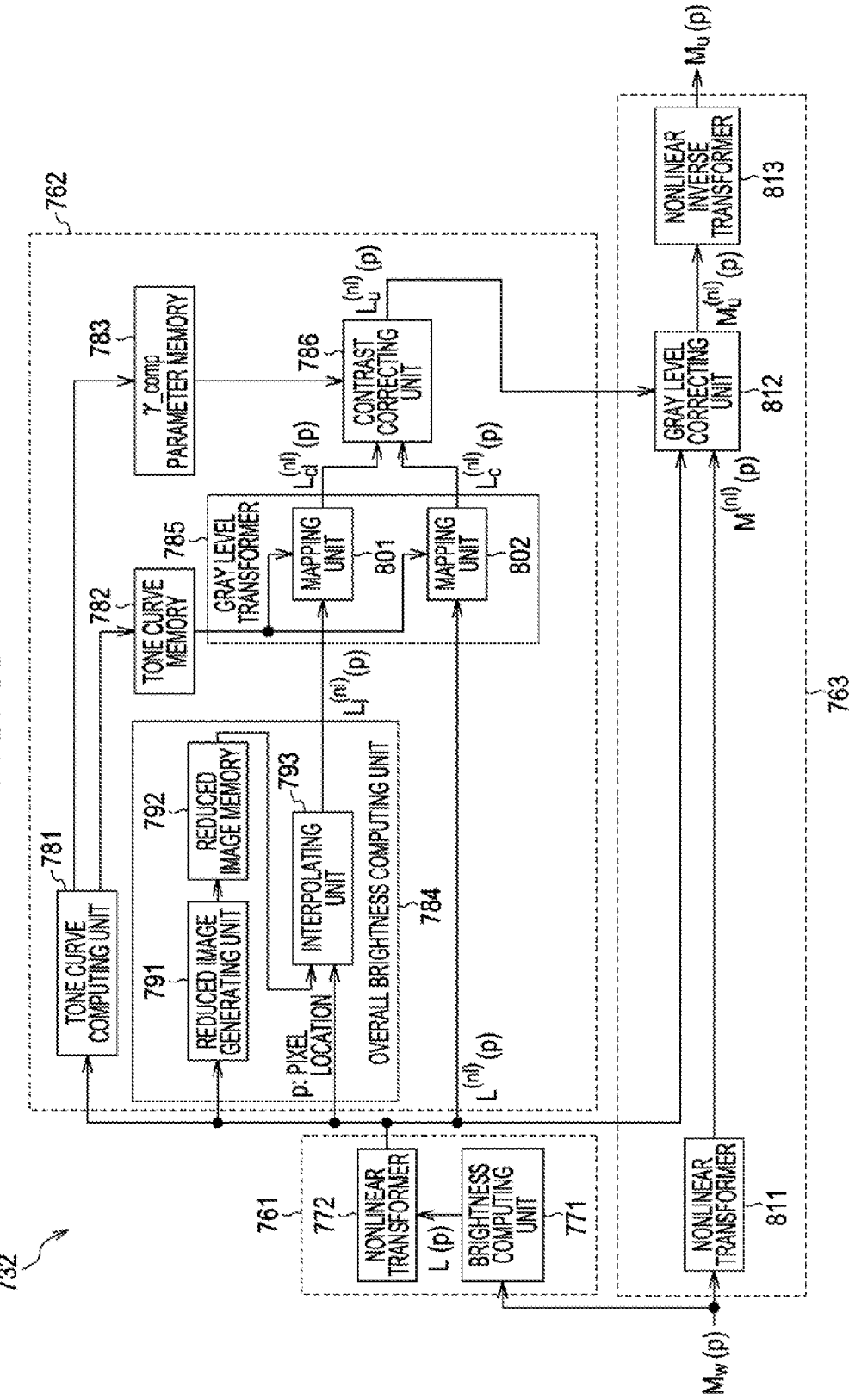
FIG. 33 is a function block, diagram illustrating a configuration of a function which the gray level transformer in FIG. 31 has.

Next, FIG. 33 is a function block diagram showing a configuration example of the functions of the gray level transformer 732 of the DSP 711 in FIG. 31.

The gray level transformer 732 can be described divided info three portions. The first portion is a gray value computing unit 761, the second portion is a gray value gray level transforming unit 762, and the third portion is a mosaic pixel value gray level transforming unit 763.

The gray value computing unit 761 is made up of a brightness computing unit 771 and nonlinear transformer 772, the gray value gray level transforming unit 762 is made up of a tone curve computing unit 781, tone curve memory 782, γ_comp parameter memory 783, overall brightness computing unit 784, gray level transformer 735, and contrast correcting unit 786, and the mosaic pixel value gray level transforming unit 763 is made up of a nonlinear transformer 811, gray level correcting unit 812, and nonlinear inverse transformer 813.

The nonlinear transformer 772 performs nonlinear transforming processing as to the brightness value, and the nonlinear transformer 811 performs nonlinear transforming processing as to each of the pixel values of the mosaic image. Also, the gray level correcting unit 812 performs gray level correcting as to each of the pixel values of the mosaic image.

Also, the overall brightness computing unit 784 is configured to include a reduced image generating unit 791, reduced image memory 792, and interpolating unit 793, and the gray level transformer 785 is configured to include a mapping unit 801 to perform processing as to the brightness, and a mapping unit 802 to perform processing as to the overall brightness.

Next, the function of each unit will be described. The gray value computing unit 761 computes a gray value at the pixel location which is current a focus point. The brightness computing unit 771 of the gray value computing unit 761 obtains the mosaic image, and focusing on one of the pixels thereof, i.e. a pixel corresponding to either R, G, or B, as the pixel of interest, computes the brightness value at the pixel of interest location employing the nine pixels surrounding the pixel of interest location which exists in a 3×3 pixel range with the pixel of interest location $m_{22}$ as the center thereof, for example, as shown in FIG. 34.

If the Bayer array is used, which is a typical color filter array, the three colors R, G, B which configure the color information are all present, by viewing the 3×3 pixel range with the pixel of interest location $m_{22}$ as the center. The brightness computing unit 771 employs the following Expressions (20) through (23) to compute four color interpolating values $C_1$, $C_2$, $C_3$, $C_4$ from the surrounding nine pixels.

$$C_1 = m_{22} \tag{20}$$

$$C_2 = (m_{21} + m_{23})/2 \tag{21}$$

$$C_3 = (m_{12} + m_{23})/2 \tag{22}$$

$$C_3 = (m_{11} + m_{13} m_{31} + m_{33})/4 \tag{23}$$

The computed four color interpolating values are each interpolating values corresponding to one of the R, G, or B near the pixel of interest location, wherein two of the four are interpolating values corresponding to G, and the remaining are interpolating values corresponding to either R or B. Which of the four interpolating values will correspond to which color can be determined by the color array of the sensor device employed for imaging of the image and the pixel of interest being at which location of the image.

The brightness computing unit 771 computes the brightness value of the pixel of interest location with a linear sum of the four color interpolating values, as shown in the following Expression (24).

$$L = k_R \cdot R + k_G \cdot (G_1 + G_2)/2 + k_B \cdot B \tag{24}$$

Here, the interpolating values after determination is expressed as R, $G_1$, $G_2$, and B. $k_R$, $k_G$, and $k_B$ are coefficients of a linear sum. Specific values of the linear sum coefficients should be values thought to be desirable experientially or experimentally, but as an example of a possible value, for example $[k_R, k_G, k_B] = [0.2126, 0.7152, 0.07228]$ may be used.

The brightness computing unit 771 outputs the computed brightness value L(p) to the nonlinear transformer 772.

The nonlinear transformer 772 has basically the same function as the nonlinear transformer 162 described with reference to FIG. 5, and modulates the brightness value L(p) supplied from the brightness computing unit 771 with a nonlinear property.

The image sensor employing a solid-state imaging device such as CCD or CMOS has a linear output feature as to the normal incident light intensity, so the gray level feature of the RAW data (mosaic image) is linear to light intensity. With the gray level feature which is linear to light intensity, the distribution of the brightness value is skewed towards the dark side, so gray level transforming processing with this situation can be difficult. Thus, transforming processing to the gray value is performed with nonlinear transforming, which alleviates the skewing of the distribution towards dark values.

In order to alleviate the skewing of the distribution, a smooth monotonically increasing feature having a stairstep feature on top is suitable. With the nonlinear transformer 772 also, similar to the case of the nonlinear transformer 162 described with reference to FIG. 5, a logarithmic feature or an exponential feature wherein the exponent often used for gamma correction is smaller than 1 (applicable to the lookup table held in the transformation curve memory 202) is most suitable.

The gray value gray level transformer 762 executes processing for gray level transforming of the gray value in the each pixel location computed by the gray value computing unit 761, as well as processing to compute intermediate data used for gray level transforming at the next frame and hold the data until the processing for the next frame, and is configured with a tone curve computing unit 781 through contrast correcting unit 786, which have basically similar functions as the tone curve computing unit 163 through contrast correcting unit 168.

The intermediate data is specifically data stored in the tone curve memory 782 of the gray value gray level transformer 762, the γ_comp parameter memory 763, and the reduced image memory 792 of the overall brightness computing unit 784. As described above, in order to compute this data, employing ail pixel information within one frame is necessary. Thus, computing of the intermediate data is executed concurrently with the gray level transforming processing for each pixel, and the computed intermediate data is employed for the gray level transforming processing for the next frame.

Of the gray value gray level transformer 762, that which correlates to the intermediate data computing is the reduced image generating unit 791 of the tone curve computing unit 731 and overall brightness computing unit 784. The tone curve computing unit 731 computes the tone curve for performing gray level compression for the gray value of each pixel location, and the γ_comp parameter which is slope information about such a tone curve, and supplies this to each of the tone curve memory 782 and the γ_comp parameter memory 783. The reduced image generating unit 791 computes the reduced image with reduced gray value in order to compute the overall brightness components of the gray value for each pixel location, and supplies this to the reduced image memory 792.

While such processing is executed with the reduced image generating unit 791 of the tone curve computing unit 781 and overall brightness computing unit 784, computation is made as to the previous frame thereof with the reduced image generating unit 791 of the tone curve computing unit 781 and overall brightness computing unit 784, and gray level transforming processing is executed in each of the other units by employing the data stored in the tone curve memory 782, γ_comp parameter memory 783, and the reduced image memory 792 of the overall brightness computing unit 784.

The tone curve computing unit 781 through contrast correcting unit 786 have basically similar functions to the tone curve computing unit 163 through contrast correcting unit 168 in FIG. 4, other than the gray value for each pixel location which the gray value computing unit 761 has computed, so the detailed description thereof will be omitted.

The mosaic pixel value gray level transformer 763 is configured to include the nonlinear transformers 162-1 through 162-4, gray level, correcting units 169-1 through 169-3, and nonlinear inverse transformers 170-1 through 170-3, shown in FIG. 4, and the nonlinear transformer 811, gray level correcting unit 812, and nonlinear inverse transformer 813, having basically the same functions other than the handled image data being mosaic image data instead of data corresponding to an image of one of the color components of the demosaic image.

The nonlinear transformer 811 performs nonlinear transforming with the same transforming feature as the nonlinear transformer 772 of the gray value computing unit 761. That is to say, the transformation curve held, in the transformation curve memory 202 of the nonlinear transformer 811 is the same as the transformation curve held in the transformation curve memory 202 of the nonlinear transformer 772. The various pixels of the input mosaic image are supplied to the gray level correcting unit 812 after being transformed to the same gray level feature as the gray value of the corresponding pixel location with the nonlinear trans former 811.

The gray level correcting unit 812 executes gray level transforming based on the gray value of the corresponding pixel location and the gray value thereof subjected, to gray level transforming, and supplies the mosaic pixel value after gray level transforming to the nonlinear inverse transforming 813.

As described above, the mosaic pixel value only has information for one color according to the pixel thereof, but the processing performed with the gray level correcting unit 812 is computing which does not depend on the color of the pixel value. Accordingly, in the case of performing gray level correcting, the gray level correcting unit 812 does not need to distinguish which color the pixel value of the pixel corresponds to, and there is no need to concurrently prepare computation differing by each of the RGB.

For example, the gray level correcting unit 812 is configured such as that shown in FIG. 35. The gray level correcting unit 812 having the configuration in FIG. 35 is most suitable when employed in the case of performing gray level feature transforming by the nonlinear transformer employing an exponent, transformation such as a gamma curve. The dividing unit 891 divides the pixel value of each pixel after the gray level feature transforming supplied from the nonlinear transformer 811 by the brightness value of each pixel after the gray level feature transforming supplied from the nonlinear transforming unit 772 of the gray value computing unit 761. The multiplying unit 892 multiplies the division results by the brightness value subjected to contrast correcting which is supplied from the contrast correcting unit 786. The gray level correcting unit 812 having the configuration in FIG. 35, i.e. as shown in Expression (25), the mosaic pixel value is transformed so as to save the color ratio as to the gray value before and after gray level transforming.

$$M_u^{(nl)}(p) = \left(\frac{M^{(nl)}(p)}{L^{(nl)}(p)}\right) \cdot L_u^{(nl)}(p) \qquad (25)$$

Also, for example, the gray level correcting unit 812 can be configured such as that shown in FIG. 36. The gray level correcting unit 812 having the configuration in FIG. 36 is suitable employed in the case wherein gray level feature transforming by the nonlinear transforming is performed employing logarithm transforming. The subtracting unit 693 subtracts the brightness value of each pixels after gray level feature transforming supplied from the nonlinear transformer 772 of the gray value computing unit 761, from the pixel values of each pixel after the gray level feature transformer supplied from the nonlinear transformer 811. The adding unit 894 adds the subtraction results to the brightness value subjected to contrast correction supplied from the contrast correcting unit 736. The gray level correcting unit 812 having the configuration in FIG. 36, i.e. as shown in Expression (26), can transform the mosaic image pixel value so as to save the color difference as to the gray value before and after gray level transforming.

$$M_u^{(nl)}(p) = (M^{(nl)}(p) - L^{(nl)}(p)) + L_u^{(nl)}(p) \qquad (26)$$

For example, in the event that logarithmic transforming is employed as the nonlinear transforming, the computation for saving color difference is the same as saving the color ratio with a linear gray level, and compared to the computing which saves the color ratio, is easier to compute since the multiplying/dividing is replaced with adding/subtracting unit. Accordingly, in the case that logarithmic transforming serving as nonlinear transforming is employed, configuring the gray level correcting unit 812 with the method of color difference saving is suitable, as shown in FIG. 36. Note that in the case of exponential transforming, the method of color ratio saving is more suitable in principle, but if the exponent is smaller the color difference saving method can also be used without problem.

The nonlinear inverse transformer 813 has basically the same functions as the nonlinear inverse transformer 170 described with reference to FIG. 14, and employing the transformation curve for subjecting the nonlinear transforming to inverse transforming by the nonlinear transformer 811, which is held in the transformation curve memory 412, returns the pixel values subjected to nonlinear transforming and gray level correcting to the original gray level and outputs this.

Figure 37:
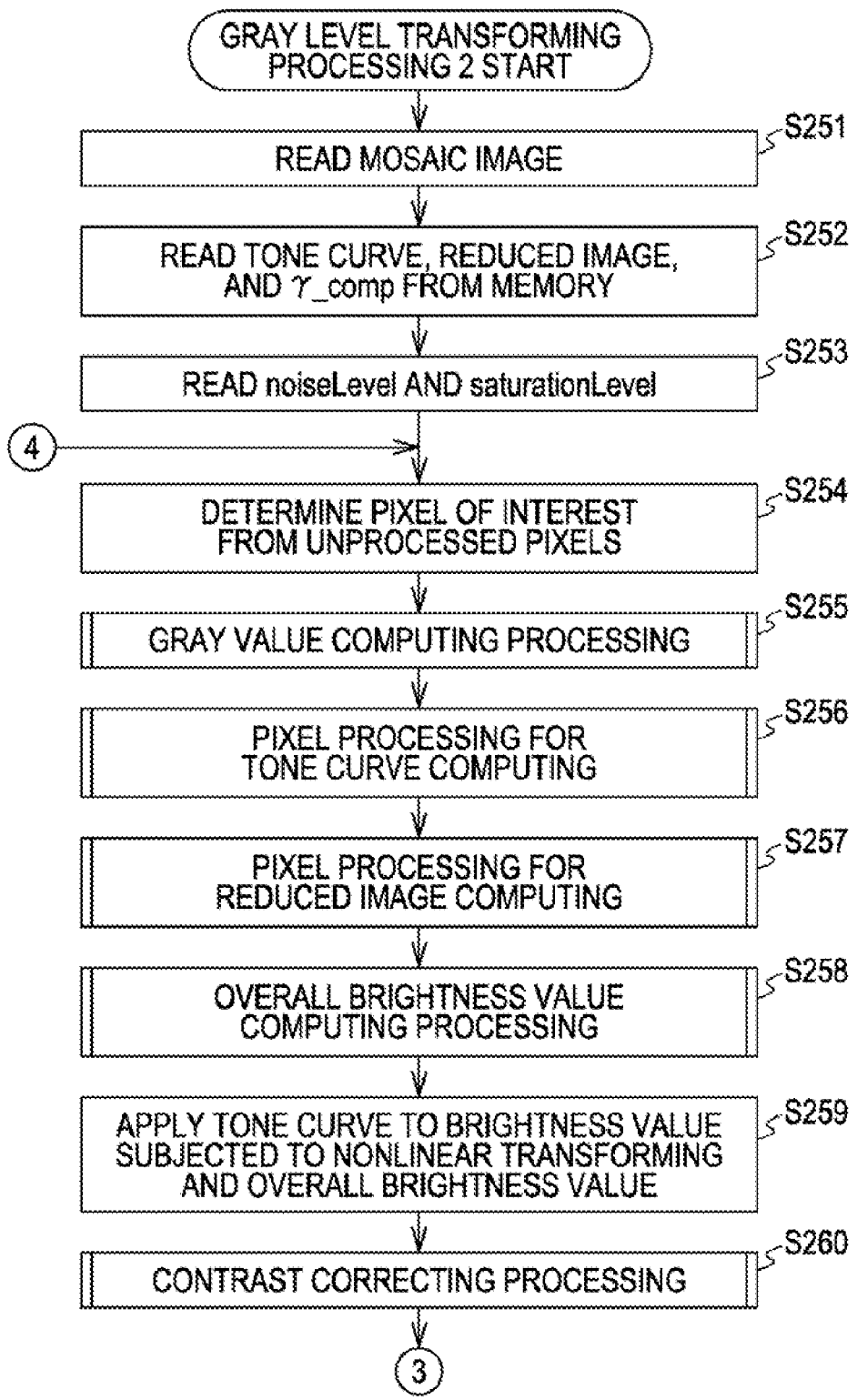
FIG. 37 is a flowchart to describe gray level transforming processing 2.
Figure 38:
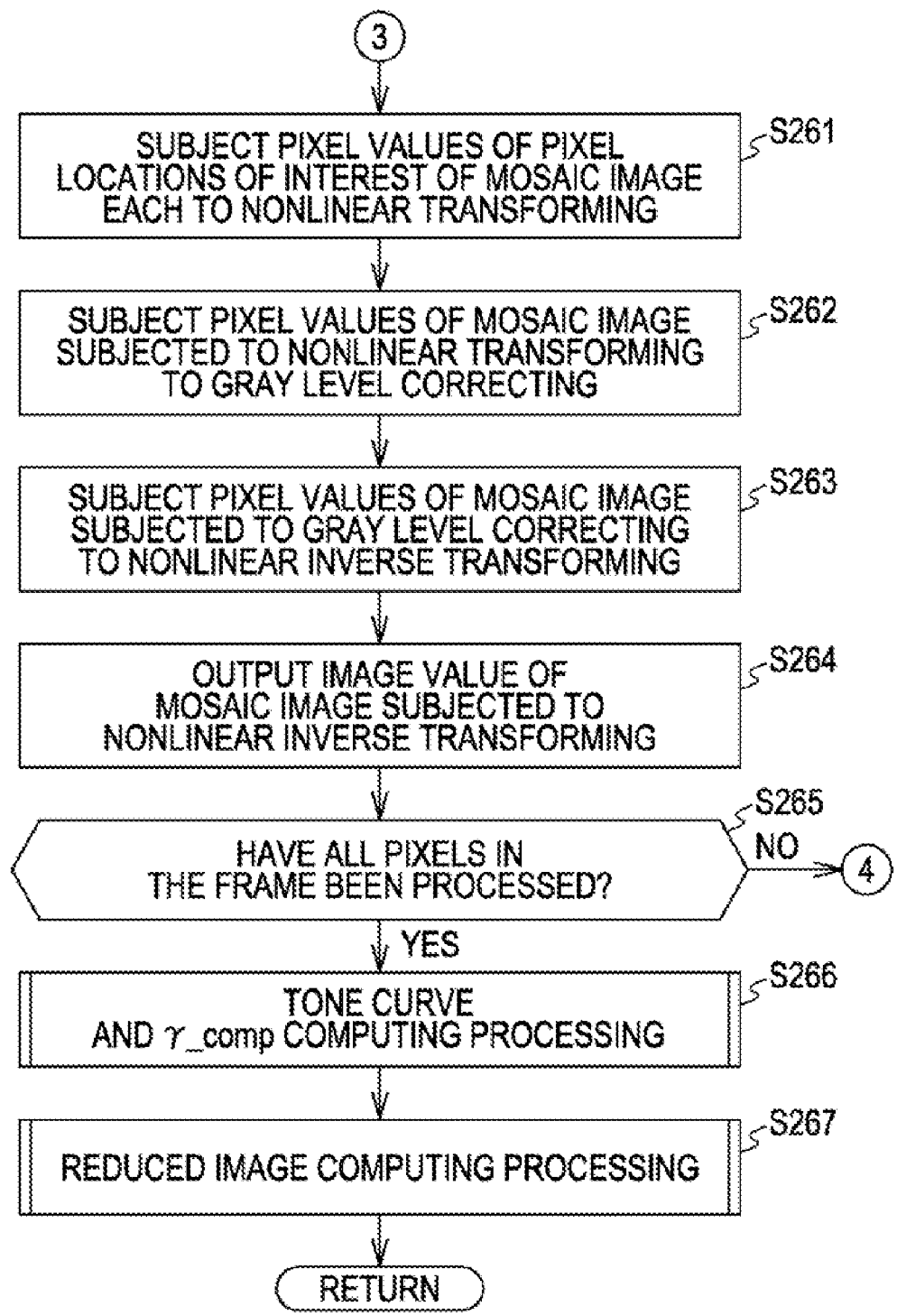
FIG. 38 is a flowchart to describe the gray level transforming processing 2.

Next, the gray level transforming processing 2 executed in step S203 in FIG. 32 will be described with reference to the flowcharts in FIGS. 37 and 38.

In step S251, the gray level transformer 732 reads the mosaic image with the white balance thereof adjusted with the white balance unit 731. The read mosaic image is supplied to the brightness computing unit 771 of the gray value computing unit 761 and the nonlinear transformer 811 of the mosaic pixel value gray level transformer 763.

In step S252, the gray level transformer 732 reads the reduced image, tone curve, and γ_comp from the memory. Specifically, the neighborhood selecting unit 371 (FIG. 12) of the interpolating unit 793 of the gray level transformer 732 reads the reduced image generated with the gray level-transforming processing of the previous frame from the reduced image memory 792. The mapping units 801-1 and 801-2 read lookup tables expressing the tone curve computed with the gray level transforming processing of the previous frame from the tone curve memory 782. The gain value computing unit 391 (FIG. 13) of the contrast correcting unit 786 reads the γ_comp parameter computed with the gray level transforming processing of the previous frame from the γ_comp parameter memory 763.

In step S253, the tone curve computing unit 781 reads the noiseLevel and saturationLevel. Specifically, the saturated pixel excluding unit 242 (FIG. 7) of the brightness region computing unit 221 of the tone curve computing unit 731 and the saturated pixel excluding unit 281 (FIG. 8) of the average level computing unit 222 read the noiseLevel(nl) and saturationLevel(nl) from the unshown infernal memory of the DSP 711.

In step S254, the brightness computing unit 771 determines the pixel of interest from the unprocessed, pixels of the supplied mosaic image.

In step S255, the gray value computing processing described later with reference to FIG. 30 is executed.

In steps S256 through S260, processing similar to that in steps S26 through S30 in FIG. 16 is executed.

That is to say, with the tone curve computing unit 781, processing is executed with is basically similar to the pixel processing for computing the tone curve which is described with reference to FIG. 18, with the reduced image generating unit 791. Processing is executed which is basically similar to the pixel processing for computing the reduced image which is described with reference to FIG. 19, and with the overall brightness computing unit 784, processing is executed with is basically similar to the overall brightness value computing processing described with reference to FIG. 20.

The gray level transformer 785 applies the tone curve to the brightness value and overall brightness value subjected to nonlinear transforming, and with the contrast correcting unit 786, processing is executed with is basically similar to the contrast correcting processing described with reference to FIG. 22.

In step S261, the nonlinear transformer 811 subjects each of the pixel values of the pixel of interest location in the supplied mosaic image to nonlinear transforming. Specifically, the mapping unit 201 (FIG. 5) of the nonlinear transformer 811 reads a lookup table expressing the transformation curve from the transformation curve memory 202, and based on the lookup table, subjects the pixel value Mw(p) of the pixel of interest to nonlinear transforming, and outputs the pixel value $M^{(nl)}(p)$ subjected to nonlinear transforming to the gray level correcting unit 812.

Note that the lookup table employed by the nonlinear transformer 811 is the same lookup table employed by the nonlinear transformer 772 with the gray value computing processing (details to be described later) executed in step S255. That is to say, the pixel value Mw(p) is subjected to the same nonlinear transforming as is the brightness value L(p).

In step S262, the gray level correcting unit 812 subjects each of the pixel values of the pixels of interest in the mosaic image subjected to nonlinear transforming to gray level correcting. Specifically, the gray level correcting unit 812 employs the above-described Expressions (25) and (26) to execute the gray level correcting processing, and supplies the pixel value $M_u^{(nl)}(p)$ with gray level correction to the nonlinear inverse transformer 813.

In step S263, the nonlinear inverse transformer 813 subjects the pixel values of the pixels of interest in the mosaic image with gray level correction to nonlinear inverse transforming. Specifically, the inverse mapping units 411 (FIG. 14) of the nonlinear inverse transformer 813 each read a lookup table expressing the transformation curve from the transformation curve memory 412, and based on the lookup tables, performs nonlinear inverse transforming, which is inverse transforming of the nonlinear transforming in step S261, as to the pixel value $M_u^{(nl)}(p)R$.

In step S264, the nonlinear inverse transformer 813 outputs the pixel values of the pixel of interest subjected to nonlinear inverse transforming in the mosaic image to the demosaic unit 733 or the memory 712.

In step S265, the gray level transformer 732 determines whether or not all of the pixels within the frame are processed. In the case determination is made that not yet all pixels within the frame are processed, the flow is returned to step S254, and the processing in steps S254 through S265 is repeatedly executed until determination is made in step S265 that all pixels within the frame are processed. That is to say, all of the pixels within the frame currently being processed are subjected to gray level transforming, one pixel at a time in sequence (e.g. in raster scan order).

Figure 24:
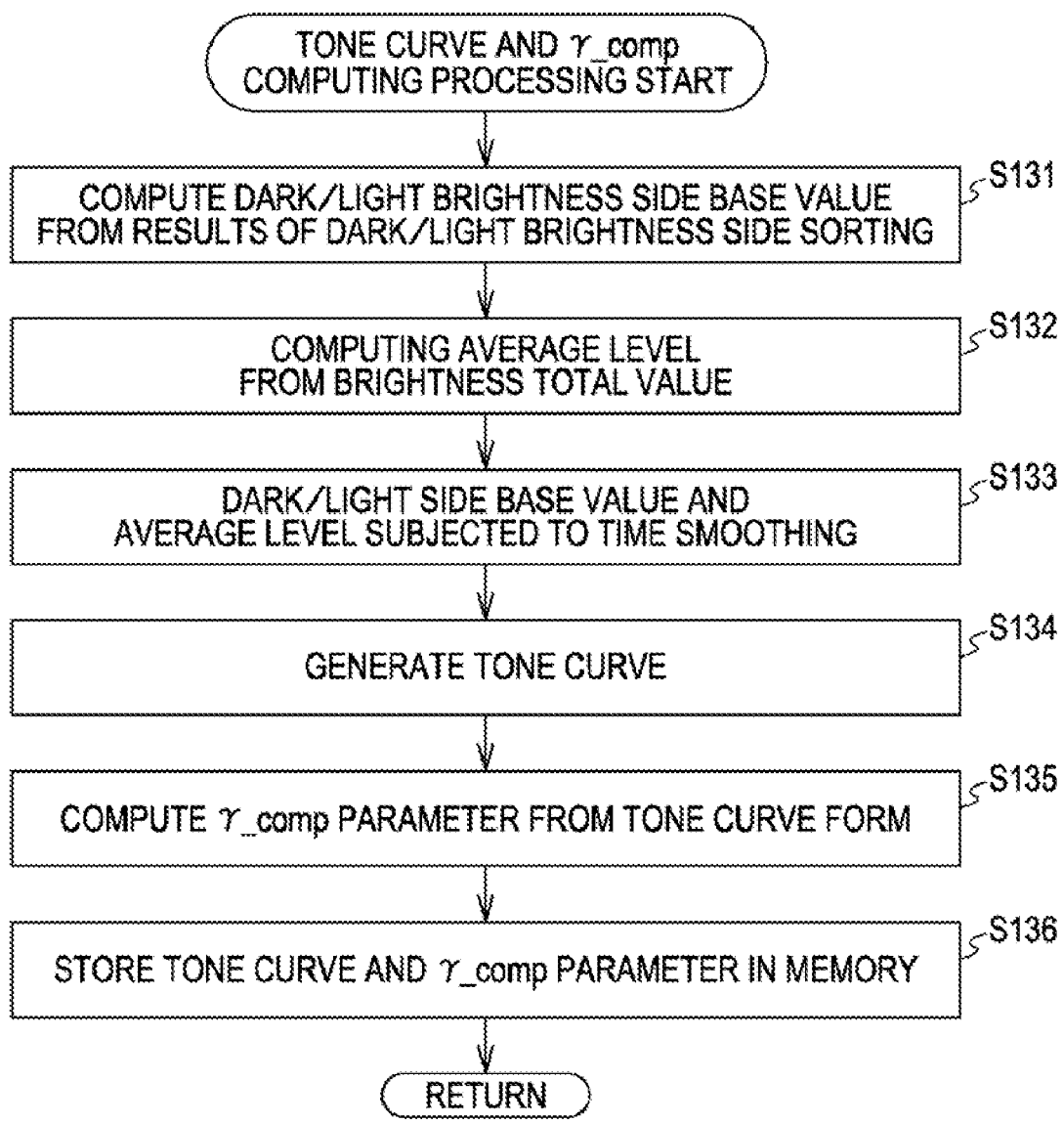
FIG. 24 is a flowchart to describe in detail the tone curve and γ_comp computing processing in step S36 of FIG. 17.

In the case determination is made in step S265 that all pixels within the frame are processed, the tone curve and γ_comp computing processing described with reference to FIG. 24 are executed in step S266.

Figure 26:
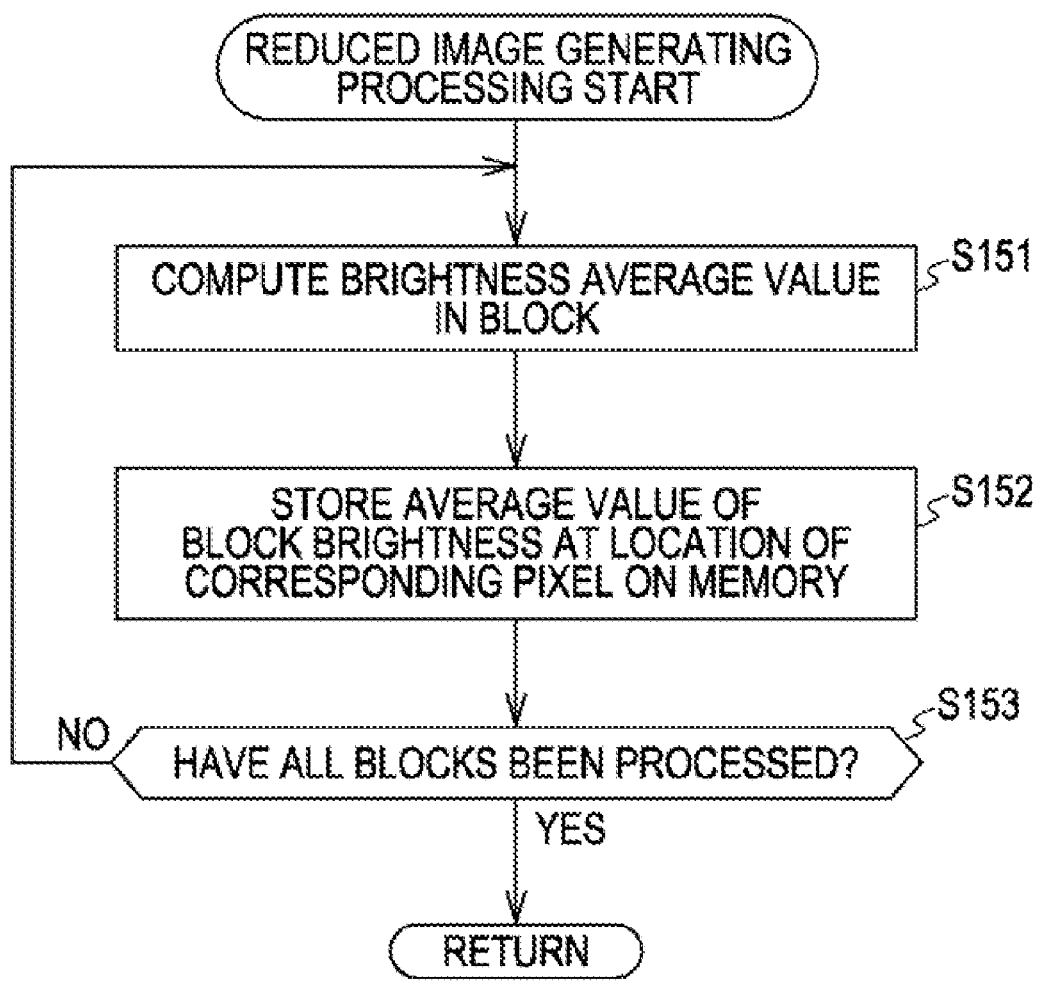
FIG. 26 is a flowchart to describe in detail the reduced image generating processing in step S37 of FIG. 17.

In step S267, the reduced image generating processing described with reference to FIG. 26 is executed, and the flow is returned to step S203 in FIG. 32 and advanced to step S204. With this processing, gray level transforming processing is performed as to the mosaic image.

Note that description has been given here as the sequence of processing described in the flowchart as being executed, but the sequence of processing described above with reference to the flowchart is an example thereof, and it goes without saying that, within the scope of retaining the primary intent of the present invention, the sequence of processing may be interchanged, or multiple processes may be performed concurrently.

Specifically, with the gray level transformer 732, as described above, while intermediate data computing processing is executed with the reduced image generating unit 791 of the tone curve computing unit 781 and overall brightness computing unit 784, computation is made concurrently as to the previous frame thereof with the reduced image generating unit 791 of the tone curve computing unit 781 and overall brightness computing unit 784, and gray level transforming processing is executed, in each of the other units by employing the intermediate data stored in the tone curve memory 782, γ_comp parameter memory 783, and the reduced image memory 792 of the overall brightness computing unit 784.

The mosaic image subjected to gray level transforming processing is supplied to the memory 712, held as RAW data subjected to gray level transforming, and externally output as needed, or alternatively is subjected to demosaic processing with the demosaic unit 733, and is subjected to YC separation with the YC transformer 145 after being subjected to gamma correction with the gamma correcting unit 144.

Figure 39:
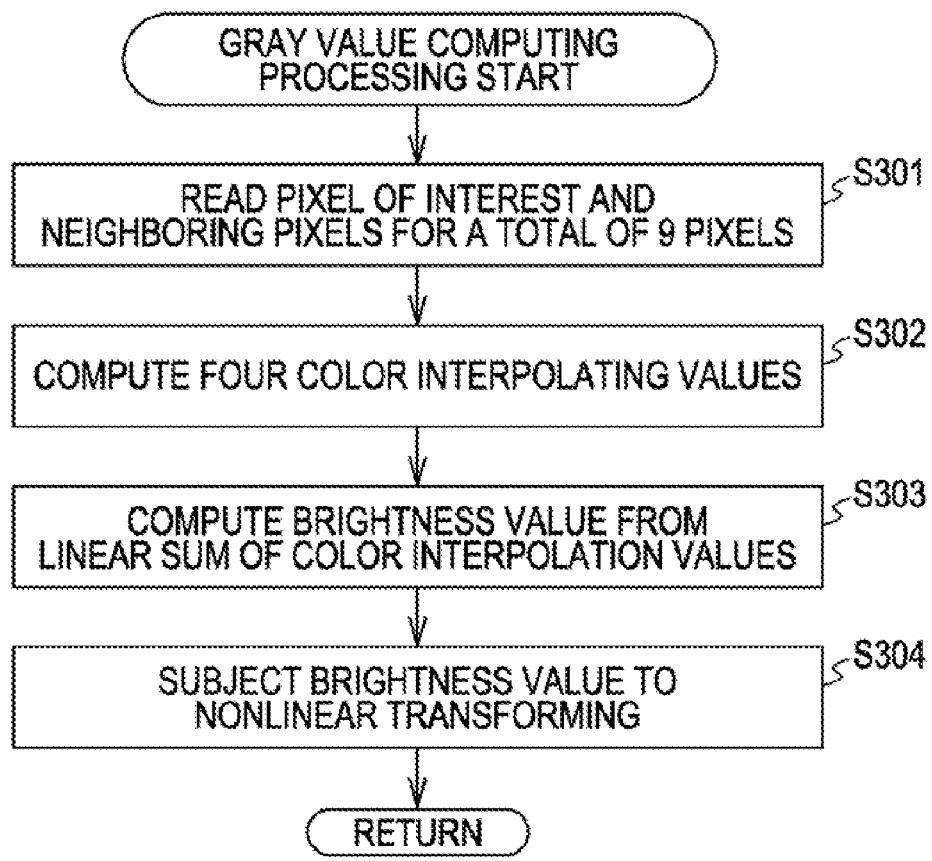
FIG. 39 is a flowchart to describe gray value computing processing.

Next, the gray value computing processing which is executed in step S255 in FIG. 37 will be described with reference to the flowchart in FIG. 39.

In step S301, the brightness computing unit 771 of the gray value computing unit 761 reads the surrounding nine pixels of the pixel of interest location, which exist, in a 3×8 pixel range with the pixel of interest location $m_{22}$ as the center thereof, as shown in FIG. 34, for example.

In Step S302, the brightness computing unit 771 computes the four color interpolating values C1, C2, C3, C4 by employing the pixel values of the surrounding nine pixels read in step S301, by using the above-described Expressions (20) through (23).

The computed four color interpolating values are each interpolating values corresponding to one of the R, G, or B near the pixel of interest location, wherein two of the four are interpolating values corresponding to G, and the remaining are interpolating values corresponding to either R or B. Which of the four interpolating values will correspond to which color can be determined by the color array of the sensor device employed for imaging of the image and the pixel of interest being at which location of the image.

In step S303, as shown with the above-described Expression (24), the brightness computing unit 771 computes the brightness value of the pixel of interest location with the linear sum of the four color interpolating values.

In step S304, the nonlinear transformer 772 of the gray value computing unit 761 modulates the brightness value L(p) supplied from the brightness computing unit 771 with nonlinear features, basically similar to the case described with reference to FIG. 5, and the flow is returned to step S255 in FIG. 37 and is advanced to step S256.

With such processing, the supply of the mosaic image can be received, the gray value of the pixel of interest can be computed, and supplied to the gray value gray level transformer 762.

Note that the sequence of processing described as above with reference to the flowchart is but one example, and it goes without saying that the sequence of processing may be interchanged, or multiple processes may be performed concurrently, within the scope of the intent of the present invention. Also, configurations to perform similar processes may be joined or shared.

Inputting a color image (demosaic image) with all colors for each pixel has been the premise for the gray level transforming processing with the digital video camera 101 described with reference to FIG. 2, and thus has been unable to avoid the existence of concurrent processing for the number of colors, whereas the digital video camera 701 described with reference to FIG. 30 has a processing configuration such that gray level transforming is performed as to the RAW data, and mosaic image data corresponding to the RAW data is output, whereby concurrent processing for the number of colors is not performed. That is to say, the gray level transforming which inputs RAW data and outputs corresponding mosaic image data, which is executed with the gray level transformer 732 of the DSP 711 of the digital video camera 701, is configured to enable computing a gray value according to the brightness at the pixel of interest location of the input RAW data, performing gray level transforming as to the gray value thereof, and modulating the various pixel values of the mosaic image data at the pixel of interest location according to the amount the gray value has been changed by the gray level transforming.

Thus, with the digital video camera 701 described with reference to FIG. 30, the circuit configuration can be made further compact as compared to the digital video camera 101 described with reference to FIG. 2.

Also, with the gray level transformer 732 of the DSP 711 of the digital video camera 701, in order to compute a gray value according to the brightness of the input mosaic image, a gray value equivalent to the brightness value can be obtained by using the pixels surrounding the pixel of interest to obtain complete compounded color information at the pixel of interest location. Also, in the case that the gray level of the mosaic image data with linear features as to the incident light intensity is used as is, the brightness value is skewed toward the dark side, so by applying suitable nonlinear transforming such that the dark portion is raised up, applying the gray level transforming can be readily performed. Further, by employing logarithmic transforming or gamma correction (exponential transforming) serving as nonlinear transforming, the operation to modulate the pixel values of the mosaic image data at the pixel of interest location according to the amount the gray value has been changed by the gray level transforming becomes easier so is more desirable.

Further, with the gray level transformer 732 of the DSP 711 of the digital video camera 701, as a method to modulate the pixel values at the pixel of interest location of the mosaic image according to the amount the gray value has been changed by the gray level transforming, one method of a method to determine the values so as to save the ratio of the input pixel values of the pixel of interest as to the gray value of the brightness, and a method to determine the values so as to save the difference as to the gray value of the brightness, may be used. These methods can both be computed if the values before and after gray level transforming of the gray value and the input pixel values of the pixel of interest are known, and since input pixel values other than the pixels of interest are not needed, this is suitable for image processing of a mosaic image. In particular, the method for saving color difference can obtain a favorable result by employing a combination with the nonlinear transforming processing.

Further, with the gray level transformer 732 of the DSP 711 of the digital video camera 701, similar to the case with the digital video camera 101 described with reference to FIG. 2, as a gray level transforming method of the gray value, a method using tone curve correcting or a method combining the tone curve correcting and the contrast correcting can be used. The tone curve can also have an optimal shape for the image thereof calculated from the distribution of the entire image of the computed gray value.

With such a configuration, a gray level transformation which is natural and also has greater effect, can be realized with a simpler configuration.

Note that, the present invention can be applied to a device wherein the gray level of the color value (pixel value) or the brightness of the image can be compressed (e.g. image playback device, image recording device, image display device, and so forth), other than to the above-described digital video camera.

The above-described series of processing can be executed with hardware or can be executed with software. In the case of executing the series of processing with software, a program configuring such software is built into a computer with dedicated hardware, or is installed from a network or recording medium into a general-use personal computer, for example, which can execute various types of functions by installing various types of programs.

Figure 40:
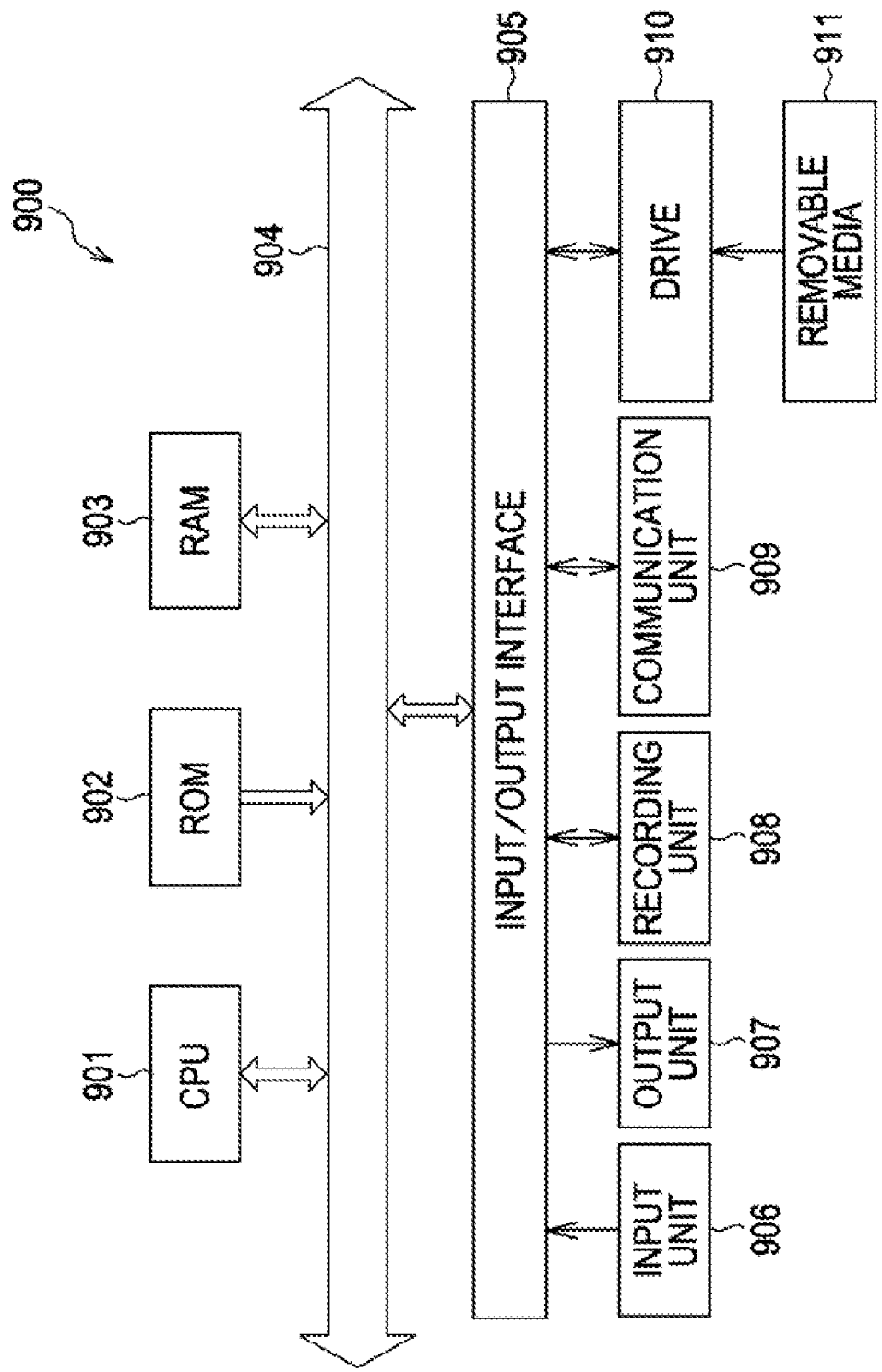
FIG. 40 is a block diagram showing a configuration example of a personal computer.

FIG. 40 is a diagram showing an internal configuration example of a general-use personal computer 900. A CPU (Central Processing Unit) 901 executes various types of processing in accordance with a program stored in ROM (Read Only Memory) 902 or a program loaded from a recording unit 908 to RAM (Random Access Memory) 903. Necessary data for the CPU 901 to execute various processing is also stored in the RAM 903 as appropriate.

The CPU 901, ROM 902, and RAM 903 are mutually connected via a bus 904. This bus 904 is also connected to an input/output interface 905.

The input/output interface 905 is connected to an input unit 906 made up of buttons, switches, keyboard, mouse, or the like, a display such as a CRT (Cathode Ray Tube) or LCD (Liquid Crystal Display) or the like, an output unit 907 made up of speakers or the like, a recording unit 908 configured of a hard disk or the like, and a communication unit 90 made up of a modem or terminal adaptor or the like. The communication unit 909 performs communication processing via a network to include the Internet.

The input/output interface 905 is also connected as necessary to a drive 910, whereupon is mounted a removable media 911 such as a magnetic disk, optical disk, magneto-optical disk, or semiconductor memory or the like, whereby a computer program read therefrom is installed in the recording unit 908.

The recording medium to record a program which is installed on a computer so as to be executable by the computer may be configured, not only of a removable media 911 which is separate from the device main unit, such as a magnetic disk (including a flexible disk), optical disk (including CD-ROM (Compact Disc-Read Only Memory) and DVD (Digital Versatile Disc)), magneto-optical disk (including MD (Mini-Disc) (registered trademark)) or semiconductor memory or the like, wherein the program is recorded so as to be distributed to provide the program to the user, as shown in FIG. 40, but may also be configured of ROM 902 or a hard disk included in the recording unit 908, wherein the program is recorded so as to provide the program to the user in a state already built in to the device main unit.

Note that with the present specification, the steps describing the program stored in the program recording medium include processing which is performed along the described sequence in a time-series manner, but also includes processing which is not necessarily in a time-series manner but processing which is executed concurrently or independently.

Further, embodiments of the present invention are not limited to the embodiments described, above; and rather may include various modifications within the scope and intent of the present, invention. It should be understood by those skilled in the art that various modifications, combinations, sub-combinations and alterations may occur depending on design requirements and other factors insofar as they are within the scope of the appended claims or the equivalents thereof.

What is claimed is:

1. An image processing device configured to process image data configured of a plurality of pixels which are imaged by a color image sensor to measure one color from a plurality of color information for configuring compounded color information, said image processing device comprising:

gray level transforming processing means configured to
receive input of said image data,
perform gray level transforming, and
output image data having all said plurality of color information by each pixel being configured by one of said plurality of color information for configuring compounded color information;

said gray level transforming processing means further including
first gray value computing means configured to compute a first gray value according to the brightness of a pixel of interest which exists in a pixel location of interest;
second gray value computing means configured to compute a second gray value by performing gray value transforming as to said first gray value which is computed with said first gray value computing means; and pixel value gray level transforming means configured to compute a pixel value subjected to gray level transforming of said pixel of interest, based on said first gray value computed by said first gray value computing means, said second gray value computed by said second gray value computing means, and the pixel value of said pixel of interest.

2. The image processing device according to claim 1, wherein said first gray value computing means further comprises:

brightness computing means configured to compute a value equivalent to the brightness of said pixel of interest employing the pixel values of a plurality of pixels neighboring said pixel of interest.

3. The image processing device according to claim 2, said first gray value computing means further comprising:

first nonlinear transforming means configured to subject a value equivalent to the brightness of said pixel of interest computed by said brightness computing means to nonlinear transforming;

said pixel value gray level transforming means including second nonlinear transforming means configured to subject the pixel value of said pixel of interest to nonlinear transforming.

4. The image processing device according to claim 3, wherein said first nonlinear transforming means and said second nonlinear transforming means both execute nonlinear transforming with logarithmic transformation.

5. The image processing device according to claim 3, wherein said first nonlinear transforming means and said second nonlinear transforming means both execute nonlinear transforming with gamma correction.

6. The image processing device according to claim 1, said pixel value gray level transforming means further comprising:

ratio computing means configured to compute the ratio of the pixel value of said pixel of interest as to said first gray value; and multiplying means configured to multiply said ratio computed with said ratio computing means by said second gray value.

7. The image processing device according to claim 1, said pixel value gray level transforming means further comprising:

difference computing means configured to compute the difference of the pixel value of said pixel of interest as to said first gray value; and adding means configured to add said difference computed with said difference computing means to said second gray value.

8. The image processing device according to claim 1, said second gray value computing means including first tone curve correcting means configured to transform the gray level of said first gray value with a tone curve.

9. The image processing device according to claim 8, said second gray value computing means further including tone curve computing means configured to compute said tone curve which is employed with said first tone curve correcting means based on the distribution of said first gray value with all pixels configuration said image data.

10. The image processing device according to claim 9, wherein said tone curve computing means compute said tone curve based on an average brightness value which is an average value of said first gray value, a first boundary value wherein the ratio of the number of pixels of a brightness at or below said first boundary value within the number of pixels in said pixel data is roughly a predetermined first value, and a second boundary value wherein the ratio of the number of pixels of a brightness at or below said second boundary value within the number of pixel of said pixel data is roughly a predetermined second value.

11. The image processing device according to claim 10, wherein said tone curve computing means compute said monotonically increasing tone curve as said tone curve slope becomes shallow as said first gray value approaches said average brightness value, and said tone curve slope nears almost 1 as said first gray value approaches said first boundary value and said second boundary value.

12. The image processing device according to claim 10, wherein said average brightness value is an average brightness value of the brightness of the region specified by a user within a frame configuring said image data.

13. The image processing device according to claim 10, said tone curve computing means further comprising:

time smoothing means configured to subject said average brightness value, said first boundary value, and said second boundary value to time smoothing between the current frame of said image data and the previous frame;

wherein said tone curve computing means compute said tone curve based on said average brightness value subjected to time smoothing, said first boundary subjected to time smoothing, and said second boundary value subjected to time smoothing by said time smoothing means.

14. The image processing device according to claim 8, said second gray value computing means further comprising:

overall brightness computing means configured to compute overall brightness value which is the brightness value of the overall brightness image made with low-frequency components of said first gray level;

second tone curve correcting means configured to correct the gray level of said overall brightness value based on said tone curve; and contrast correcting means configured to correct the contrast of said first gray value wherein gray level is subjected to correction, based on the slope of said tone curve and on said overall brightness value wherein the gray level is subjected to correction.

15. The image processing device according to claim 14, said overall brightness computing means comprising:

reduced image generating means configured to generate a reduced image wherein a predetermined frame configuring said image data is reduced; and interpolating means configured to compute said overall brightness value by interpolating said reduced image so that said overall brightness image has the same number of pixels as the image data of said predetermined frame.

16. The image processing device according to claim 15, wherein said reduced image generating means divide said frame into a predetermined number of blocks, and generate said reduced image by arraying the block average brightness values which are average values of the brightness of pixels included in each of said blocks in sequence of said blocks.

17. The image processing device according to claim 15, wherein said interpolating means compute said overall brightness value by interpolating said reduced image corresponding to the frame which is one frame before the frame currently in process.

18. The image processing device according to claim 14, wherein said first tone curve correcting means corrects the gray level of the brightness of said pixel of interest, based on said tone curve according to the distribution of said first gray value of one frame prior; and wherein said second tone curve correcting means corrects the gray level of said overall brightness value, based on said tone curve according to the distribution of said first gray value of one frame prior.

19. The image processing device according to claim 14, wherein said contrast correcting means corrects the contrast of said first gray value wherein the gray level is corrected, based on said tone curve slope wherein said first gray value is approaching said average brightness value.

20. The image processing device according to claim 14, wherein said contrast correcting means corrects the contrast of said first gray value wherein the gray level is corrected, such that the contrast near the brightness value of a predetermined intermediate level of said first gray value wherein the gray level is corrected is emphasized as compared to the contrast near the minimum value and maximum value of the brightness that said first gray value wherein the gray level is corrected can be taken.

21. The image processing device according to claim 14, wherein said contrast correcting means corrects the contrast of the frequency components excluding the frequency components included in said overall brightness image wherein the gray level is corrected, out of the frequency components of said first gray value wherein the gray level is corrected.

22. The image processing device according to claim 1 comprising:
 white balance adjusting means configured to receive input of said image data and adjust the white balance; and
 output means configured to output information externally;
 wherein said gray level transforming processing means perform gray level transforming of said image data where the white balance is adjusted by said white balance adjusting means; and
 wherein said output means externally output said image data which is generated by said gray level transforming processing means, with each pixel being configured of a plurality of said color information making up compounded color information.

23. The image processing device according to claim 1 comprising:
 white balance adjusting means configured to receive input of said image data and adjust the white balance; and
 image data transforming means configured to transform image data, having all of the plurality of said color information whereby each pixel is configured by one of the plurality of said color information making up compounded color information, into a plurality of single color image data wherein all pixels are configured with the same said color information;
 wherein said gray level transforming processing means perform gray level transforming of said image data where the white balance is adjusted by said white balance adjusting means; and
 wherein said data transforming means transform said image data, which is generated by said gray level transforming processing means, and which has all of the plurality of said color information whereby each pixel is configured of one of the plurality of said color information making up compounded color information, into a plurality of single color image data wherein all pixels are configured with the same said color information.

24. An image processing method for an image processing device configured to process image data configured of a plurality of pixels imaged by a color image sensor which measures one color out of a plurality of color information to configure compounded color information, comprising the steps of:
 receiving input of said image data;
 performing gray level transforming; and
 outputting image data having a plurality of said color information wherein each pixel is configured by one of a plurality of said color information to configure compounded color information;
 at which time a first gray value according to the brightness of a pixel of interest existing in a pixel location of interest is computed;
 a second gray value is computed by performing gray level transforming as to said computed first gray value; and
 a pixel value is computed wherein said pixel of interest is subjected to gray level transforming, based on said first gray value, said second gray value, and the pixel value of said pixel of interest.

25. A tangible, non-transitory computer-readable medium storing instructions that, when executed by a processor, perform an image processing method for image processing of image data, the image data comprising a plurality of pixels imaged by a color image sensor, the color image sensor measuring a color associated with color information to configure compounded color information, the method comprising:
 receiving an input of the image data;
 performing a gray level transformation of the image data to output transformed image data, the transformed image data comprising a plurality of the color information, wherein pixels of the transformed image data are configured by corresponding ones of the plurality of color information to configure compounded color information;
 computing a first gray value according to brightness of a pixel of interest existing in a pixel location of interest;
 performing the gray level transformation of the first gray value to generate a second gray value; and
 computing a pixel value associated with the pixel of interest, wherein the pixel of interest is subjected to the gray level transformation based on the first gray value, the second gray value, and the pixel value of the pixel of interest.

26. An image processing device configured to process image data, the image data comprising a plurality of pixels which are imaged by a color image sensor, the color image sensor measuring a color associated with of color information for configuring color information, said image processing device comprising:
 a processor;
 a gray level transforming processing unit configured to use the processor to:
  receive an input of the image data;
  performing a gray level transformation of the image data to output transformed image data, the transformed image data comprising a plurality of the color information wherein pixels of the transformed image data are configured by corresponding ones of the plurality of color information for configuring the color information;
 the gray level transforming processing unit further comprising:
  a first gray value computing unit configured to compute a first gray value according to the brightness of a pixel of interest which exists in a pixel location of interest;
  a second gray value computing unit configured to compute a second gray value by performing the gray value transformation of the first gray value; and
  a pixel value gray level transforming unit configured to compute a pixel value subjected to the gray level transformation of the pixel of interest, based on the first gray value the second gray value, and the pixel value of the pixel of interest.

* * * * *